United States Patent [19]

Plamondon

[11] Patent Number: 5,101,437

[45] Date of Patent: Mar. 31, 1992

[54] METHOD AND APPARATUS FOR COMPARING A TEST HANDWRITTEN SIGNATURE WITH A REFERENCE SIGNATURE BY USING INFORMATION RELATIVE TO CURVILINEAR AND ANGULAR VELOCITIES OF THE SIGNATURE

[75] Inventor: Réjean Plamondon, Ste-Julie, Canada

[73] Assignee: Ecole Polytechnique, Montreal, Canada

[21] Appl. No.: 653,656

[22] Filed: Feb. 11, 1991

[51] Int. Cl.$^5$ .............................................. G06K 9/00
[52] U.S. Cl. .......................................... 382/3; 382/13
[58] Field of Search ...................................... 382/3, 13

[56] References Cited

U.S. PATENT DOCUMENTS

| | | | |
|---|---|---|---|
| 3,699,517 | 10/1972 | Dyche | 382/3 |
| 3,955,178 | 5/1976 | Warfel | 382/3 |
| 3,962,679 | 6/1976 | Engelbrecht | 382/3 |
| 4,028,674 | 6/1977 | Chuang | 382/3 |
| 4,040,010 | 8/1977 | Crane et al. | 382/3 |
| 4,078,226 | 3/1978 | EerNisse | 382/3 |
| 4,128,829 | 12/1978 | Herbst | 382/3 |
| 4,156,911 | 5/1979 | Crane et al. | 382/3 |
| 4,190,820 | 2/1980 | Crane | 382/3 |
| 4,286,255 | 8/1981 | Siy | 382/3 |
| 4,475,235 | 10/1984 | Graham | 382/3 |
| 4,495,644 | 1/1985 | Parks | 382/3 |
| 4,553,258 | 11/1985 | Chainer et al. | 382/3 |
| 4,562,592 | 12/1985 | Chainer et al. | 383/3 |
| 4,597,101 | 6/1986 | Kishimoto et al. | 382/3 |
| 4,703,511 | 10/1987 | Conoval | 382/3 |
| 4,736,445 | 4/1988 | Gundersen | 382/3 |
| 4,789,934 | 12/1988 | Gundersen et al. | 382/3 |
| 4,856,077 | 8/1989 | Rothfjell | 383/3 |

Primary Examiner—Leo H. Boudreau
Assistant Examiner—Barry Stellrecht
Attorney, Agent, or Firm—Collard, Roe & Galgano

[57] ABSTRACT

Apparatus and method for comparing a test handwriting signature with a reference signature where each of the test and reference signatures have been acquired by generating three electrical digital position signals characterizing a trajectory of a handwriting signature. The apparatus comprises a device for calculating variations of simple dynamic parameters of the test signature with respect to the simple dynamic parameters of the reference signature, by calculating a first evaluating function C1; a device for comparing C1 with a first threshold value, and rejecting said test signature if C1 passes the first threshold value; a device for calculating local intrinsic correlations of $V_\sigma$ and $V_\theta$ values of the test and reference signatures for each pair of characteristic segments, by calculating a second evaluating function C2; a device for comparing C2 with a third threshold value, and rejecting the test signature if C2 passes the third threshold value; a device for calculating a classifying function $C_b$; and a device for comparing the classifying function $C_b$ with a fourth threshold value, and rejecting the test signature if $C_b$ passes the fourth threshold value.

26 Claims, 20 Drawing Sheets

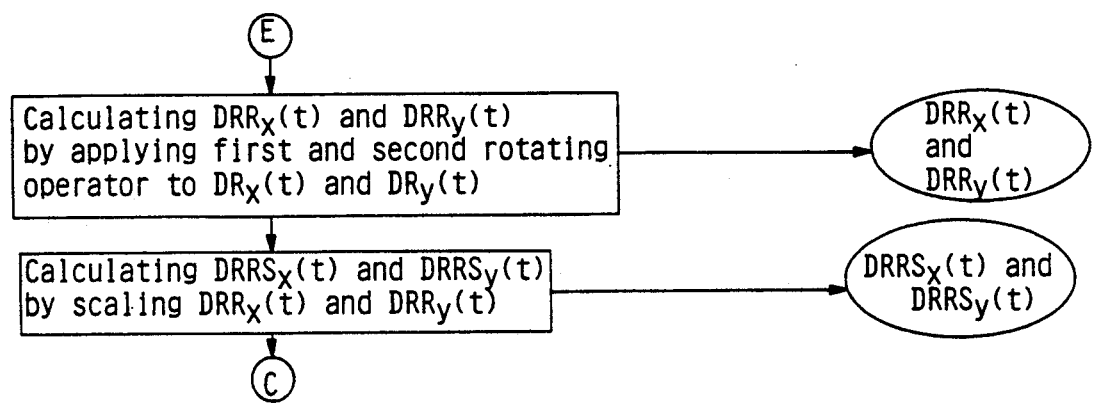
FIG.ID

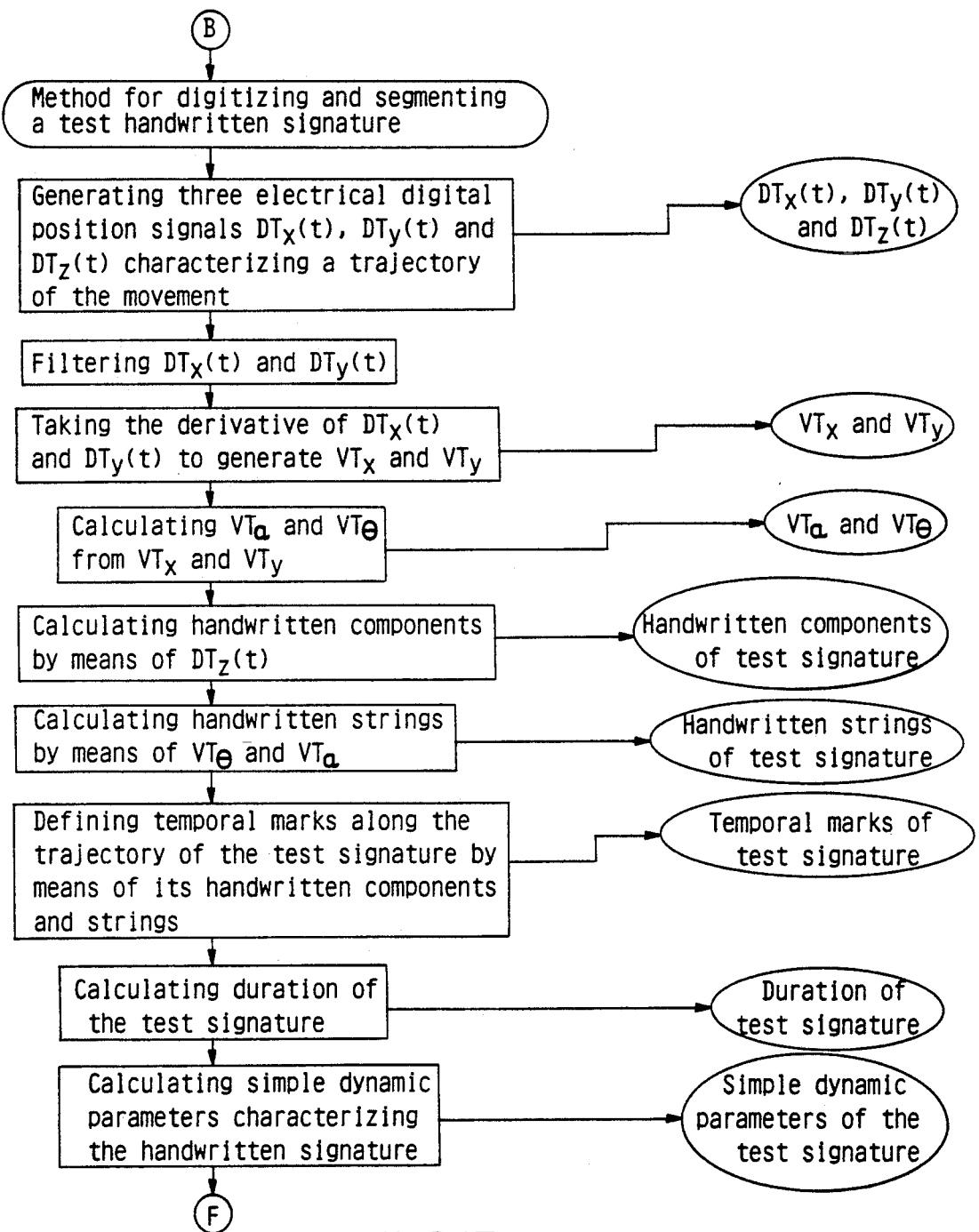
FIG.IE

| TYPE OF TABLET | SUMMA MM1201 | PENCEPT 300 |
|---|---|---|
| - PROXIMITY (INCH)<br>- PRECISION (INCH)<br>- NOISE (INCH)<br>- CONSTANCY (INCH) | 0.5<br>± 0.025<br>± 0.005<br>± 0.010 | 1.0<br>± 0.005<br>± 0.001<br>± 0.001 |
| Transmission<br>- LENGTH OF A WORD (bit)<br>- STOP BITS (bit)<br>- PARITY<br>- SPEED (bauds) | 8<br>1<br><br>9600 | 8<br>1<br><br>9600 |
| ACQUISITION MODE | PROXIMITY ||
| Resolution (1/INCH) | 1000 ||
| SAMPLING FREQUENCY (Hz) | 100 | 100 |

FIG.3

| Bit | 7 | 6 | 5 | 4 | 3 | 2 | 1 | 0 |
|---|---|---|---|---|---|---|---|---|
| Octet 1 | 1 | Prx | T | 1 | 1 | X | Sid | Dwn |
| Octet 2 | 0 | X6 | X5 | X4 | X3 | X2 | X1 | X0 |
| Octet 3 | 0 | X13 | X12 | X11 | X10 | X9 | X9 | X8 |
| Octet 4 | 0 | Y6 | Y5 | Y4 | Y3 | Y2 | Y1 | Y0 |
| Octet 5 | 0 | Y6 | Y12 | Y11 | Y10 | Y9 | Y8 | Y7 |

FIG.4

| Bit | 7 | 6 | 5 | 4 | 3 | 2 | 1 | 0 |
|---|---|---|---|---|---|---|---|---|
| Octet 1 | 1 | 1 | 0 | 1 | 1 | Dwn | Sid | Prx |
| Octet 2 | X6 | 0 | X5 | X4 | X3 | X2 | X1 | X0 |
| Octet 3 | X13 | 0 | X12 | X11 | X10 | X9 | X8 | X7 |
| Octet 4 | Y6 | 0 | Y5 | Y4 | Y3 | Y2 | Y1 | Y0 |
| Octet 5 | Y13 | 0 | Y12 | Y11 | Y10 | Y9 | Y8 | Y7 |
| Octet 6 | Ax6 | 0 | Ax5 | Ax4 | Ax3 | Ax2 | Ax1 | Ax0 |
| Octet 7 | Ay6 | 0 | Ay5 | Ay4 | Ay3 | Ay2 | Ay1 | Ay0 |
| Octet 8 | 0 | 0 | Ay9 | Ay8 | Ay7 | Ax9 | Ax8 | Ax7 |

FIG.5

| AVERAGE VALUES OF $P_1$, $P_2$, $P_3$ and $P_4$ |
|---|
| $P_1$ : 1.28 S |
| $P_2$ : 3.7 % |
| $P_3$ : 5.9 % |
| $P_4$ : 38.2 % |

| VARIATIONS OF THE PARAMETERS | | | | | | | |
|---|---|---|---|---|---|---|---|
| LEVEL | 1 | 1 | 1 | 1 | 2 | 2 | 3 |
| #Perm | $RCI1_1$ (%) | $RCI2_2$ (%) | $RCI3_3$ (%) | $RCI4_4$ (%) | $RC21_1$ (%) | $RC22_2$ (%) | RC3 |
| 1 | 1.6 | 1.5 | 0.6 | 3.0 | 87 | 77 | 9 |
| 2 | 3.9 | 2.3 | 0.2 | 0.6 | 86 | 50 | 11 |
| 3 | 1.5 | 1.5 | 0.6 | 3.0 | 89 | 78 | 8 |
| 4 | 2.3 | 0.7 | 0.8 | 2.3 | 91 | 53 | 9 |
| 5 | 3.8 | 2.3 | 0.2 | 0.6 | 88 | 50 | 10 |
| 6 | 2.3 | 0.7 | 0.8 | 2.3 | 91 | 53 | 9 |

| PERSONALIZED THRESHOLD VALUES | | | | | | | |
|---|---|---|---|---|---|---|---|
| LEVEL | 1 | 1 | 1 | 1 | 2 | 2 | 3 |
| | $SPI1_1$ (%) | $SPI2_2$ (%) | $SPI3_3$ (%) | $SPI4_4$ (%) | $SP21_1$ (%) | $SP22_2$ (%) | SP3 |
| | 3.9 | 2.3 | 0.8 | 3.0 | 86 | 50 | 11 |

FIG.20

| LEVEL | PARAM | p | $N_1$ | $N_2$ | $SC_R$ | $SC_A$ | $SC_E$ | a |
|---|---|---|---|---|---|---|---|---|
| 1 | $P_1$ | 25% | 1 | X | 25% | 0% | max(10%, 4 $SPI_1$) | |
| 1 | $P_2$ | 25% | 1 | X | 20% | 0% | max(5%, $SPI_2$) | |
| 1 | $P_3$ | 25% | 1 | X | 20% | 0% | max(5%, $SPI_3$) | 10% |
| 1 | $P_4$ | 25% | 1 | X | 20% | 0% | max(5%, $SPI_4$) | |
| 2 | $RC2_1$ | 85% | 1 | 4 | 35% | 95% | $SP2_1$ | |
| 2 | $RC2_2$ | 15% | 1 | 4 | 20% | 90% | $SP2_2$ | 60% |
| 3 | $RC3$ | 100% | 1 | 4 | 50 | 5 | $SP3$ | 30% |

WHERE:
LEVEL     : LEVEL OF VERIFICATION
PARAM    : IDENTIFICATION OF PARAMETER
p              : WEIGHT GIVEN TO A PARAMETER
$N_1$          : FIRST GROWTH FACTOR
$N_2$          : SECOND GROWTH FACTOR
$SC_R$      : REJECTION THRESHOLD
$SC_A$      : ACCEPTATION THRESHOLD
$SC_E$      : EQUILIBRIUM THRESHOLD
a              : WEIGHT GIVEN TO A LEVEL OF VERIFICATION

REJ : REJECTION THRESHOLD OF THE VERIFICATION = 0.25
UNC : UNCERTAINTY THRESHOLD OF THE VERIFICATION = 0.10

FIG.21

| GROUPE: IM | | | | SIGNERS | | | | | TOTAL |
|---|---|---|---|---|---|---|---|---|---|
| | 1 | 2 | 3 | 4 | 5 | 6 | 7 | 8 | G |
| Acceptation (%) | 0.0 | 0.0 | 0.0 | 0.0 | 0.0 | 0.0 | 4.2 | 0.0 | 0.5 |
| REJECTION (%) | 100.0 | 100.0 | 100.0 | 100.0 | 100.0 | 100.0 | 95.8 | 100.0 | 99.5 |
| - LEVEL 1 | 66.7 | 70.8 | 95.8 | 58.3 | 100.0 | 100.0 | 87.5 | 37.5 | 77.1 |
| - LEVEL 2 | 33.3 | 25.0 | 4.2 | 41.7 | 0.0 | 0.0 | 8.3 | 62.5 | 21.9 |
| - LEVEL 3 | 0.0 | 4.2 | 0.0 | 0.0 | 0.0 | 0.0 | 0.0 | 0.0 | 0.5 |
| UNCERTAINTY (%) | 0.0 | 0.0 | 0.0 | 0.0 | 0.0 | 0.0 | 0.0 | 0.0 | 0.0 |

FIG.22

| GROUPE: IN | SIGNERS | | | | | | | | TOTAL |
|---|---|---|---|---|---|---|---|---|---|
| | 1 | 2 | 3 | 4 | 5 | 6 | 7 | 8 | G |
| Acceptation (%) | 100.0 | 100.0 | 100.0 | 100.0 | 100.0 | 100.0 | -- | -- | 100.0 |
| REJECTION (%) | | | | | | | | | |
| - LEVEL 1 | 0.0 | 0.0 | 0.0 | 0.0 | 0.0 | 0.0 | -- | -- | 0.0 |
| - LEVEL 2 | 0.0 | 0.0 | 0.0 | 0.0 | 0.0 | 0.0 | -- | -- | 0.0 |
| - LEVEL 3 | 0.0 | 0.0 | 0.0 | 0.0 | 0.0 | 0.0 | -- | -- | 0.0 |
| UNCERTAINTY (%) | 0.0 | 0.0 | 0.0 | 0.0 | 0.0 | 0.0 | -- | -- | 0.0 |

FIG. 23

METHOD AND APPARATUS FOR COMPARING A TEST HANDWRITTEN SIGNATURE WITH A REFERENCE SIGNATURE BY USING INFORMATION RELATIVE TO CURVILINEAR AND ANGULAR VELOCITIES OF THE SIGNATURE

FIELD OF THE INVENTION

The present invention is concerned with an apparatus and a method for comparing a test handwriting signature with a reference signature to verify a signature.

BACKGROUND OF THE INVENTION

Known in the art, there is the U.S. Pat. No. 3,699,517 of James W. Dyche granted on Oct. 17, 1972, and the U.S. Pat. No. 4,028,674 of Ping-Chien Chuang, granted on June 7, 1977, in which there are described the basic principle for verifying a signature.

Also known in the art, there is the U.S. Pat. No. 4,190,820 of Hewitt D. Crane et al., granted on Feb. 26, 1980, in which there is described a method for verifying a signature. This method consists in breaking into segments test and reference signatures according to landmarks. A series of correlation calculations is made between the analogue segments of each signature in order to verify said test signature. It can be noted that the segments of each signature are normalized before the correlation calculations.

Also known in the art, there are the following U.S. Patents that describe different apparatuses and methods for verifying a signature: U.S. Pat. Nos. 3,955,178; 3,962,679; 4,040,010; 4,078,226; 4,128,829; 4,286,255; 4,475,235; 4,495,644; 4,553,258; 4,703,511; 4,736,445; 4,789,934; and 4,856,077.

An object of the present invention is to provide an apparatus and method for verifying a signature with more precision than the apparatuses and methods known in the art.

SUMMARY OF THE INVENTION

According to the present invention, there is provided an apparatus for comparing a test, handwritten signature with a reference signature where each of said test and reference signatures have been acquired by: generating three electrical digital position signals characterizing a trajectory of a handwritten signature by means of a pencil provided with a point and an analogue-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

low-pass filtering said $D_x(t)$ and $D_x(t)$ electrical signals;

taking the derivative of said $D_x(t)$ and $D_y(t)$ electrical signals for generating $V_x$ and $V_y$ electrical components which represent respectively speeds of said point according to X and Y axes of a cartesian reference;

calculating $V_\sigma$ and $V_\theta$ values from $V_x$ and $V_y$ components where:

$$V_\sigma = \sqrt{\|V_x\|^2 + \|V_y\|^2}, \text{ and}$$

$$V_\theta = \pm \cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and where said $V_\sigma$ value is lower than a predetermined curvilinear speed value, said handwritten strings and components having beginnings and ends defining temporal marks along said trajectory by which duration of said handwritten signature is determined;

calculating simple dynamic parameters characterizing said test and reference signatures;

applying respectively a first predetermined rotating operator and a second predetermined rotating operator to said $D_x(t)$ and $D_y(t)$ signals for correcting inclination of said trajectory and aligning a base line of said trajectory with a horizontal base line; and scaling said $D_x(t)$ signal according to said X cartesian axis, and scaling said $D_y(t)$ according to said Y cartesian axis;

said apparatus comprises:

means for calculating variations of said simple dynamic parameters of said test signature with respect to said simple dynamic parameters of said reference signature, by calculating a first evaluating function C1 where:

$$C1 = \sum_{i=1}^{4} p_i FC1_i (RC1_i) \in [0,1]$$

where $FC1_i(RC1_i)$ is a function representative of the variations of a particular dynamic parameter where i indicates the parameter in question, and $p_i$ is a weight given to a particular parameter of said simple dynamic parameters;

means for comparing C1 with a first threshold value, and rejecting said test signature if C1 passes said first threshold value;

means for calculating a classifying function $C_a$ where:

$$C_a = a1.C1$$

where a1 is a weight given to said first evaluating function C1;

means for comparing said classifying function $C_a$ with a second threshold value, and rejecting said test signature if $C_a$ passes said second threshold value;

first means for comparing durations of said test and reference signatures, and effectuating temporal expansion of the temporal marks of the signature having the shortest duration so that its duration matches the duration of the other signature;

second means for comparing sequences of said temporal marks of said test and reference signatures and for coupling temporal marks of said test and reference signatures if and only if two corresponding temporal marks have between them a minimal temporal distance which is reciprocally the shortest between the sequences in question, and said minimal distance is shorter than a predetermined distance so that coupled temporal marks form a pair of characteristic segments of said test and reference signatures;

means for processing in an iterative manner remaining temporal marks, that have not been coupled, of said test and reference signatures by means of said first and second means for comparing until no characteristic segment is coupled; means for calculating local intrinsic correlations of $V_\sigma$ and $V_\theta$ values of said test and reference signatures for each of said pairs of characteristic segments, by calculating a second evaluating function C2 where:

$$C2 = \sum_{i=1}^{2} p_i FC2_i (RC2_i), \epsilon [-1,1]$$

where $FC2_i(RC2_i)$ is a function representative of the local intrinsic correlation of either said $V_\sigma$ or $V_\theta$ values for said pairs of characteristic segments where i indicates the component in question, and $p_i$ is a weight given to the particular component in question;

means for comparing C2 with a third threshold value, and rejecting said test signature if C2 passes said third threshold value;

means for calculating a classifying function $C_b$ where:

$$C_b = a_1 C1 + a_2 C2$$

where $a_2$ is a weight given to said second evaluating function C2; and means for comparing said classifying function $C_b$ with a fourth threshold value, and rejecting said test signature if $C_b$ passes said fourth threshold value.

The symbol "$\epsilon$" means that the result of the precedent sum to the following interval defined by the numbers in square brackets. When either of the square brackets are turned toward the inside of the interval, it means the limit adjacent to the bracket is included in that interval. A square bracket turned away from the inside of the interval means the limit adjacent to the bracket is not included in that interval. For example, [0,1[ indicates an interval of 0 to 1, inclusive of zero and exclusive of one.

Also according to the present invention, there is provided a method for comparing a test handwritten signature with a reference signature where each of said test and reference signatures have been acquired by:

generating three electrical digital position signals characterizing a trajectory of a handwritten signature by means of a pencil provided with a point and an analogue-to-digital tablet, said three signals being $D_x(t)$, $D_x(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

low-pass filtering said $D_x(t)$ and $D_y(t)$ electrical signals;

taking the derivative of said $D_x(t)$ and $D_y(t)$ electrical signals for generating $V_x$ and $V_y$ electrical components which represent respectively speeds of said point according to X and Y axes of a cartesian reference;

calculating $V_\sigma$ and $V_\theta$ values from $V_x$ and $V_y$ components where:

$$V_\sigma = \sqrt{\|V_x\|^2 + \|V_y\|^2}, \text{ and}$$

$$V_\theta = \pm \cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and where said $V_\sigma$ value is lower than a predetermined curvilinear speed value, said handwritten strings and components having beginnings and ends defining temporal marks along said trajectory by which duration of said handwritten signature is determined;

calculating simple dynamic parameters characterizing said test and reference signatures;

applying respectively a first predetermined rotating operator and a second predetermined rotating operator to said $D_x(t)$ and $D_y(t)$ signals for correcting inclination of said trajectory and aligning a base line of said trajectory with a horizontal base line; and scaling said $D_x(t)$ signal according to said X cartesian axis, and scaling said $D_y(t)$ according to said Y cartesian axis;

said method comprises steps of:

calculating variations of said simple dynamic parameters of said test signature with respect to said simple dynamic parameters of said reference signature, by calculating a first evaluating function C1 where:

$$C1 = \sum_{i=1}^{4} p_i FC1_i (RC1_i) \epsilon [0,1]$$

where $FC1_i(RC1_i)$ is a function representative of the variations of a particular dynamic parameter where i indicates the parameter in question, and $p_i$ is a weight given to a particular parameter of said simple dynamic parameters;

comparing C1 with a first threshold value, and rejecting said test signature if C1 passes said first threshold value;

calculating a classifying function $C_a$ where:

$$C_a = a1. C1$$

where a1 is a weight given to said first evaluating function C1;

comparing said classifying function $C_a$ with a second threshold value, and rejecting said test signature if $C_a$ passes said second threshold value;

comparing durations of said test and reference signatures, and effectuating temporal expansion of the temporal marks of the signature having the shortest duration so that its duration matches the duration of the other signature;

comparing sequences of said temporal marks of said test and reference signatures and coupling temporal marks of said test and reference signatures if and only if two corresponding temporal marks have between them a minimal temporal distance which is reciprocally the shortest between the sequences in question, and said minimal distance is shorter than a predetermined distance so that coupled temporal marks form a pair of characteristic segments of said test and reference signatures;

processing in an iterative manner remaining temporal marks, that have not been coupled, of said test and reference signatures by repeating said steps of comparing durations and comparing sequences until no characteristic segment is coupled;

calculating local intrinsic correlations of said $V_\sigma$ and $V_\theta$ values of said test and reference signatures for each of said pairs of characteristic segments, by calculating a second evaluating function C2 where:

$$C2 = \sum_{i=1}^{2} p_i FC2_i (RC2_i), \epsilon [-1,1]$$

where $FC2_i(RC2_i)$ is a function representative of the local intrinsic correlation of either said $V_\sigma$ or $V_\theta$ values for said pairs of characteristic segments where i indicates the component in question, and $p_i$ is a weight given to the particular component in question;

comparing C2 with a third threshold value, and rejecting said test signature if C2 passes said third threshold value;

calculating a classifying function $C_b$ where:

$$C_b = a_1 C1 \; a_2 C2$$

where $a_2$ is a weight given to said second evaluating function C2; and comparing said classifying function $C_b$ with a fourth threshold value, and rejecting said test signature if $C_b$ passes said fourth threshold value.

The objects, advantages and other features of the present invention will become more apparent upon reading of the following non restrictive description of preferred embodiments thereof, given for the purpose of examplification only with reference to the accompanying drawings.

DESCRIPTION OF THE DRAWINGS

FIGS. 1A through 1F are a flowchart showing the various steps according to the invention.

FIG. 3 is a table illustrating the characteristics of two analogue-to-digital tablets that can be used with the present invention;

FIG. 4 is a table illustrating the transmission format of the output of one of the analogue-to-digital tablet presented in FIG. 3;

FIG. 5 is a table illustrating the transmission format of the output of the other analogue-to-digital tablet presented in FIG. 3;

FIG. 20 is three tables illustrating how personalized threshold values are determined from three reference signatures;

FIG. 21 is a table illustrating the parameters of the function FC(RC) that have been found preferable for a particular case;

FIG. 22 is a table illustrating preliminary test results for a first group of signers;

FIG. 23 is a table illustrating preliminary test results for a second group of signers;

DETAILED DESCRIPTION OF THE DRAWINGS

First we will describe how a signature is acquired, and then after we will describe how a test signature is verified with respect to a reference signature.

The acquisition and the processing of data relating to a handwritten movement, can be divided in two parts. The first part is concerned with acquisition, filtering and derivation of the data provided by the tablet, and the second part is concerned with pre-processing of the data obtained from the first part. The acquisition of the coordinates can be made from two different types of input devices. First, they can be provided from the tablet, and second they can be provided from the disc unit which contains data relating to the acquisition of previous movements. The processing of the data comprises the following operation: converting from a cartesian reference to an intrinsic reference, dynamic segmentation, extraction of simple dynamic parameters, and pre-processing of the image formed by the movement.

During the acquisition of a handwritten movement, the data transmitted by the tablet characterize the trajectory of the point of the pencil by means of a sampling. This sampling is done according to fixed frequency and resolution and with respect to a cartesian reference oriented with respect to the positioning of the tablet. Also, the acquisition mode of the tablet is set to "proximity" as it will be explained in the description of FIG. 3.

Validation of the acquisition is done when the point of the pencil has moved along a minimal of 0.025 cms with an acquisition time superior to 0.5 second. The maximal duration of an acquisition is 9.9 seconds. It is essential to know the sampling frequency and the resolution of the tablet for each acquisition so that the signature can be properly classified. Different studies have shown that the frequency spectrum of a signature has a bandwith of 0 to 20 Hz. Thus, a sampling frequency of at least 100 Hz would be sufficient. A stop is characterized by a displacement inferior to 0.008 cm.

Even if we use a resolution of 393.7×1/cm, it is necessary to filter the signal by a low-pass filter to reduce the acquisition noise. This low-pass filter should have a bandwidth of 20 to 50 Hz.

Figure 1:
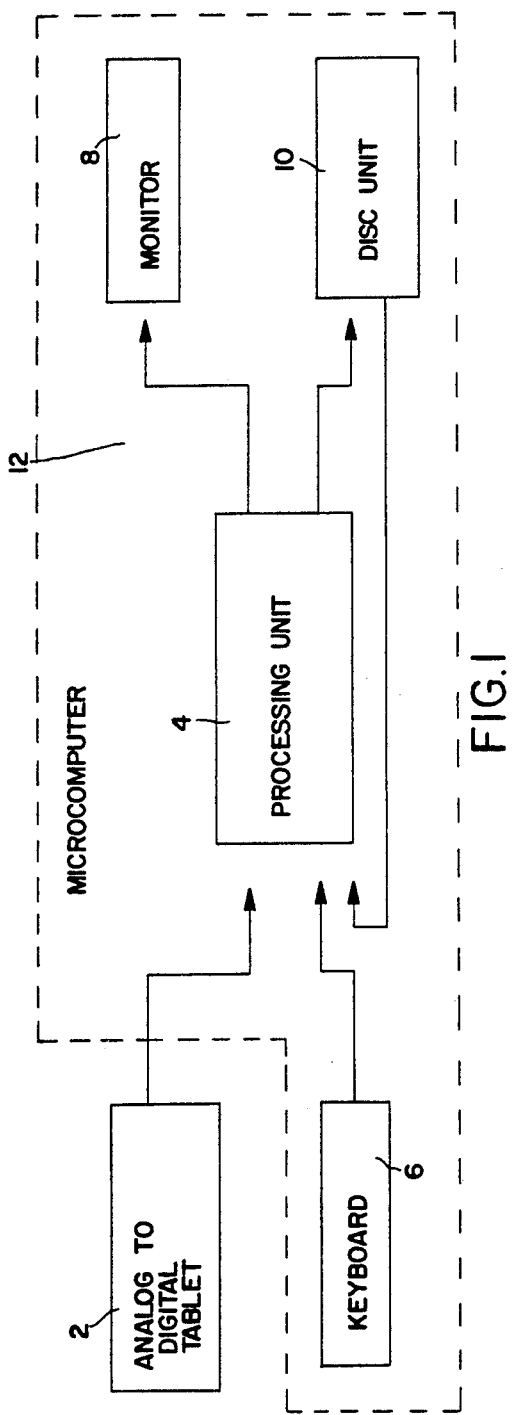
FIG. 1 is a schematic bloc diagram illustrating different elements of an apparatus for comparing a test signature with a reference signature to verify the test signature according to the present invention.

Referring now to FIG. 1, there is shown the apparatus for digitizing and segmenting a handwritten movement, and for comparing a test signature with a reference signature. This apparatus comprises an electrical transducer for generating three electrical digital positions signals characterizing a trajectory of the handwritten movement. The transducer includes a pencil (not shown) provided with a point and an analogue-to-digital tablet 2. The three signals are $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not the point is contacting the tablet. The tablet 2 has a sampling frequency of 119.5 Hz and a resolution of 393.7 l/cm.

The apparatus also comprises means for low-pass filtering the $D_x(t)$ and $D_y(t)$ electrical signals, this means for low-pass filtering being performed by the processing unit 4. This means for low-pass filtering is a low-pass filter having a bandwidth of 20 to 50 Hz.

FIGS. 1A through 1F are a flowchart showing the various steps according to the invention.

Figure 2:
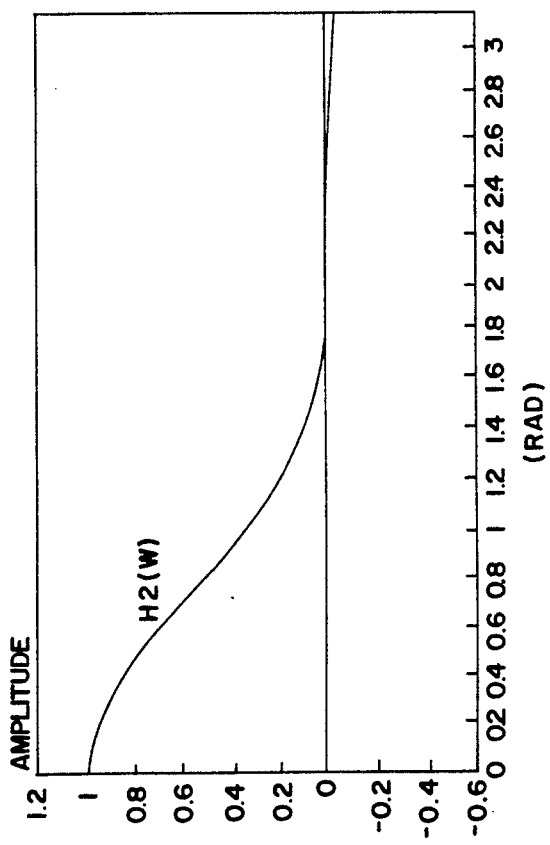
FIG. 2 is a diagram illustrating the frequency response of a low-pass filter that can be used in the present apparatus.
Figure 1A:
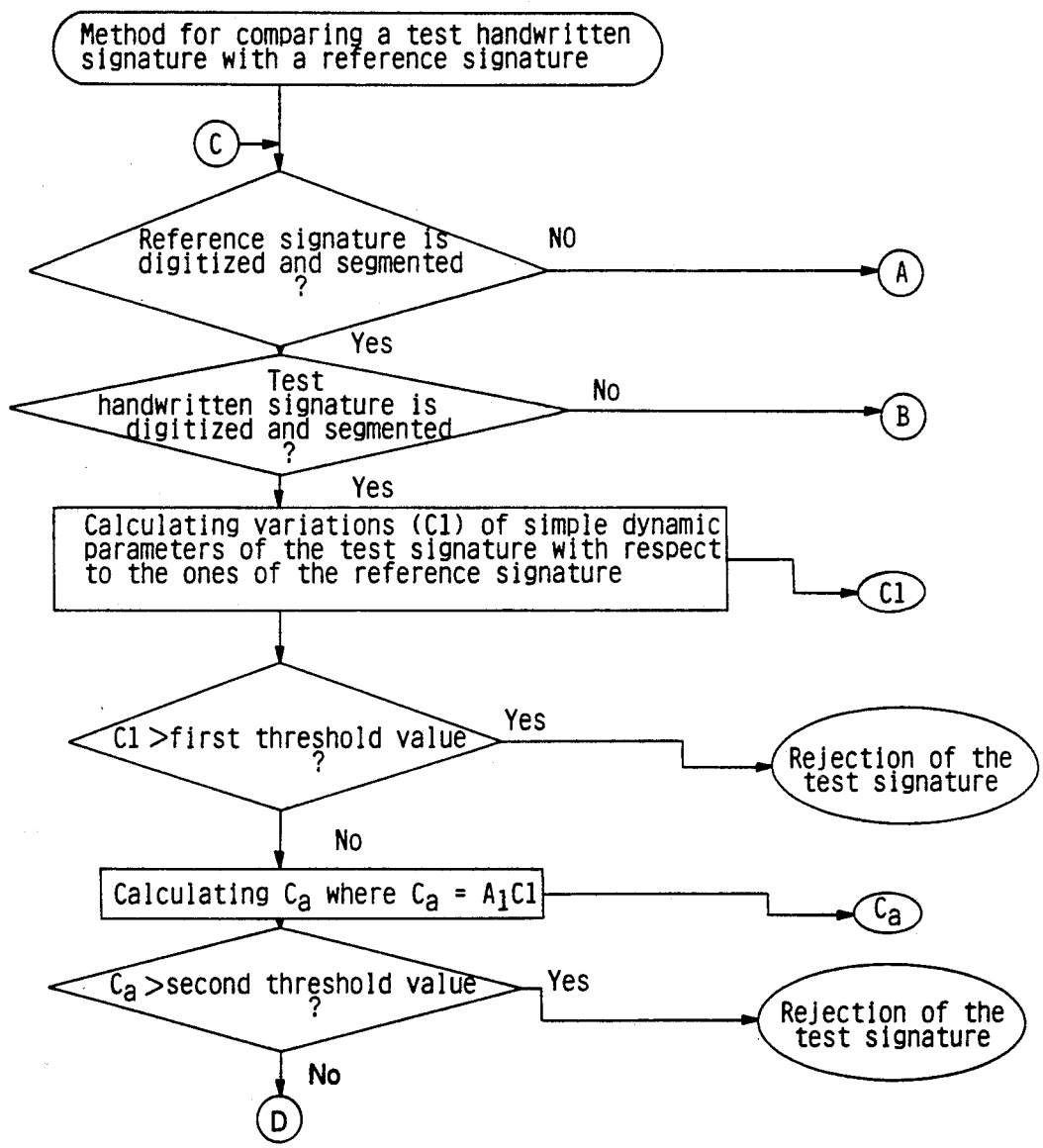
Figure 1B:
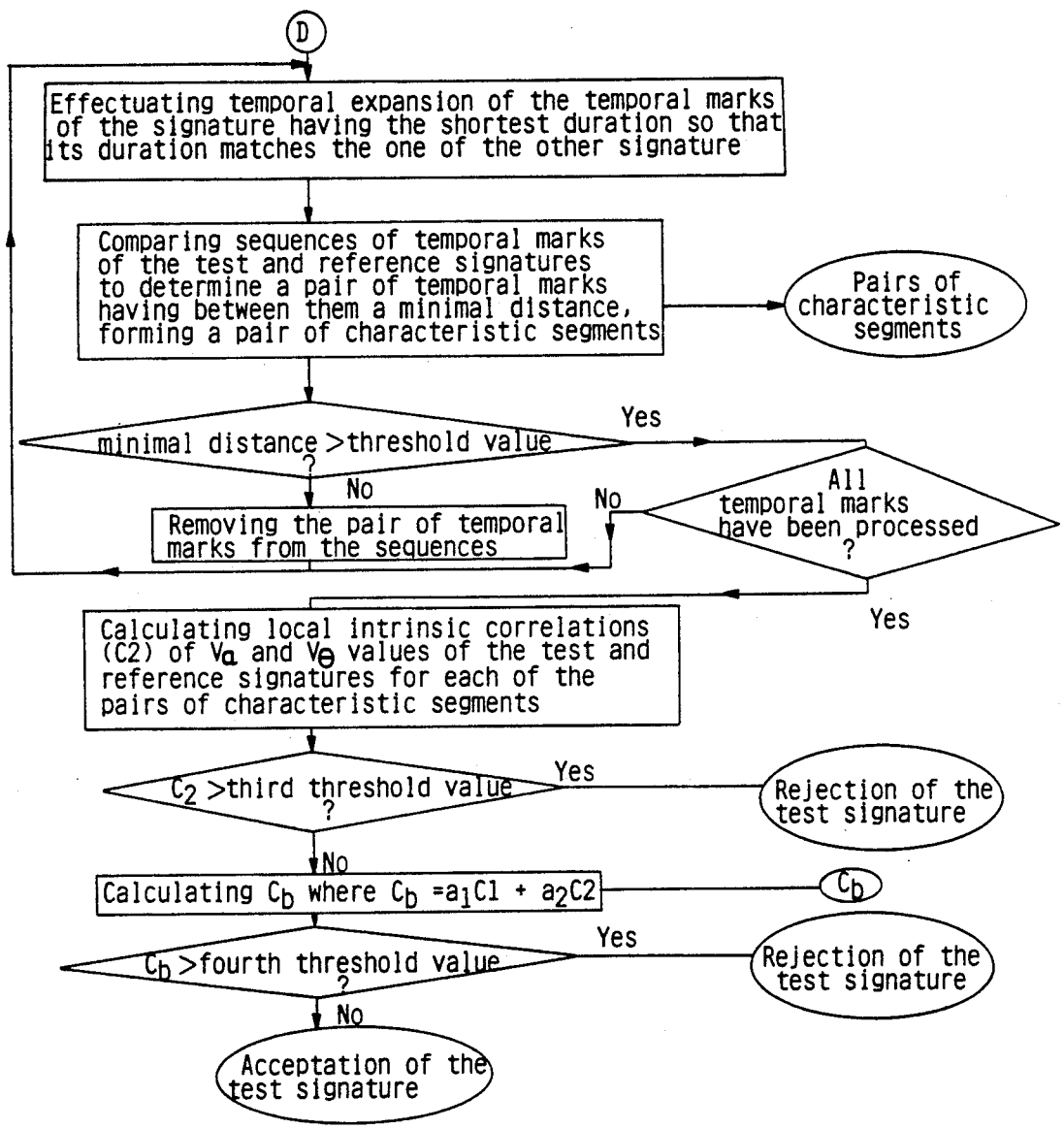
Figure 1C:
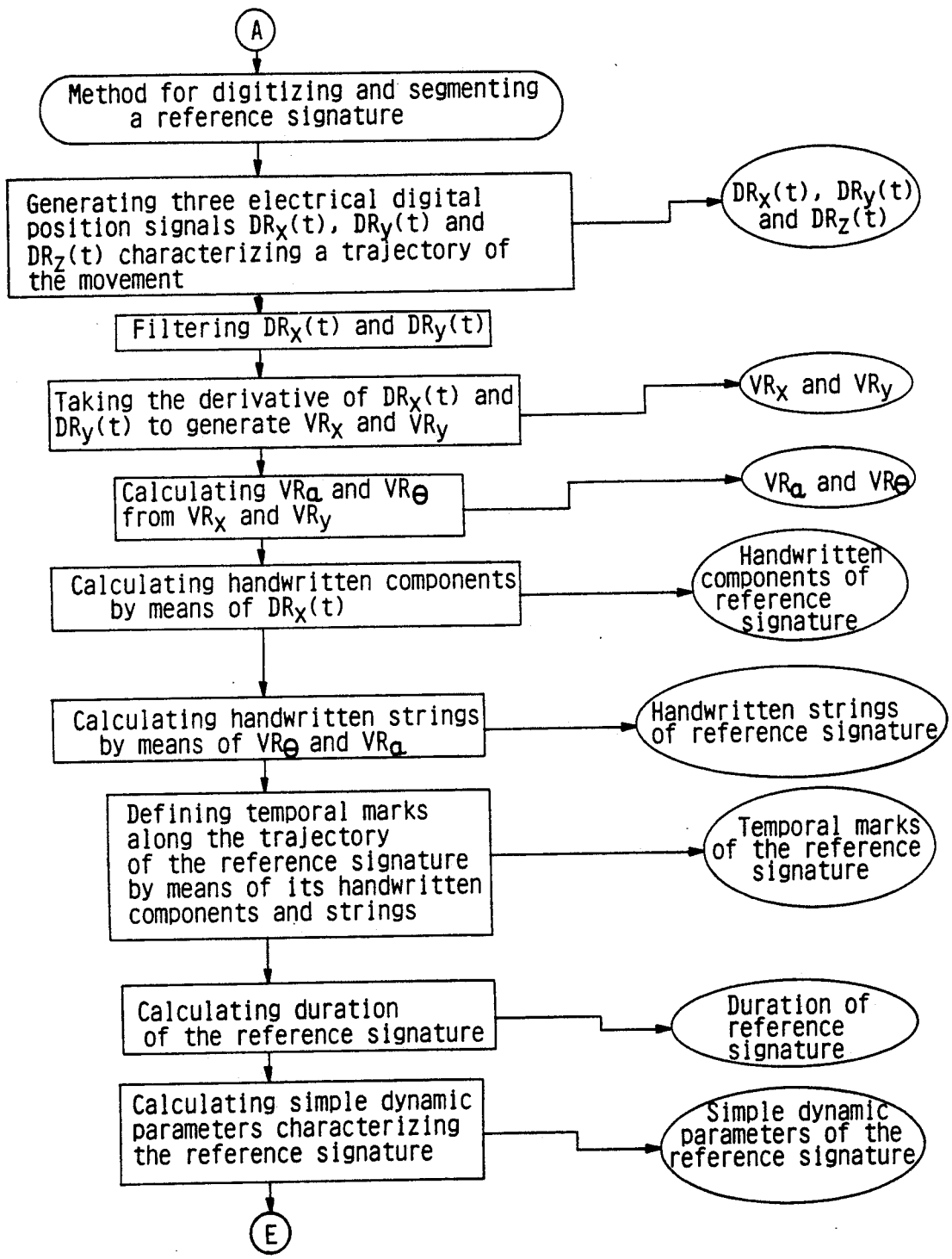
Figure 1F:
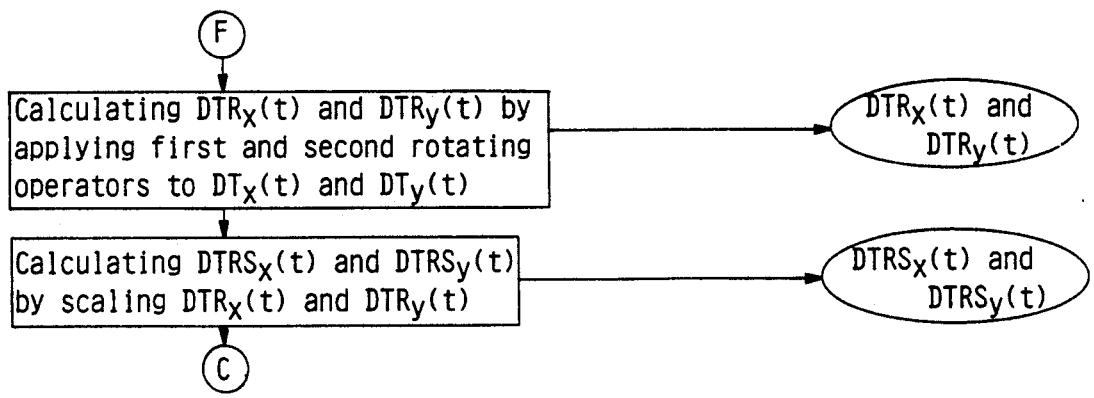

Referring now to FIG. 2, there is shown the low-pass filter which has been found preferable. This low-pass filter is of the GAUSSIAN type. The low-pass filter has a predetermined time function $F_2(t_i)$ where:

$$F_2(t_i) = \frac{F(t_{i-3}) + 3F(t_{i-2}) + 6F(t_{i+1}) + 7F(t_i) + 6F(t_{i+1}) + 3F(t_{i+2}) + F(t_{i+3})}{27}$$

This low-pass filter has also a predetermined transfer function $H_2(\omega)$ where:

$$H_2(\omega) = \frac{7 + 12\cos(\omega) + 6\cos(2\omega) + 2\cos(3\omega)}{27}$$

The present apparatus also comprises means for deriving the $D_x(t)$ and $D_y(t)$ electrical signals by predetermined time and transfer functions for generating $V_x$ and $V_y$ electrical components which represent respectively speeds of the point according to X and Y axes of a cartesian reference. This means for deriving being performed by the processing unit 4. Derivation allows the calculation of cartesian speeds from the cartesian coordinates that have been sampled. These speeds provide more information about the dynamic aspects of the signature. This means for deriving is a filter having a predetermined time function $F_5'(t_i)$ where:

$$F_5'(t_i) = \sum_{K=-N}^{N} C_K t_{i-K},$$

where $$C_K = \frac{\sin(\pi K/N)}{(\pi^2 K/N)} \left[ \frac{\sin(K\omega_c)}{K^2} - \frac{\omega_c \cos(K\omega_c)}{K} \right]$$

and $N=9$.

This means for deriving has also a predetermined transfer function $H_5(\omega)$ where:

$$H_5(\omega) = 2 \sum_{K=1}^{N} \frac{\sin(\pi K/N)}{\pi^2 K/N} \left[ \frac{\sin(K\omega_c)}{K^2} - \frac{\omega_c \cos(K\omega_c)}{K} \right] \sin(K\omega),$$

where $$\omega_c = \frac{2\pi F_c}{F_s}$$

and $N=9$ $F_c$ is a cut off frequency of 20 Hz, and $F_s$ is a sampling frequency of 100 Hz.

The apparatus also comprises means for calculating $V_\sigma$ and $V_\theta$ values from the $V_x$ and $V_y$ components where:

$$V_\sigma = \sqrt{\|V_x\|^2 + \|V_y\|^2}, \text{ and}$$

$$V_\theta = \pm \cos^{-1}\left[\frac{V_x \cdot V_y}{\|V_x\| \cdot \|V_y\|}\right],$$

The sign of $V_\theta$ is determined by:

$$\text{sign} = \left[\sin^{-1}\left[\frac{V_x \times V_y}{\|V_x\| \cdot \|V_y\|}\right]\right]$$

The next step is the dynamic segmentation step which consists in calculating handwritten components and handwritten strings. In order to calculate these handwritten components and handwritten strings, four threshold values have to be set. The first of these threshold values is the predetermined angular speed value which is preferably 50 rad/s. The second of these values is the predetermined curvilinear speed value which is preferably $\overline{V}_\sigma/2$ cm/s where $\overline{V}_\sigma$ is the average curvilinear speed of the pencil point during the trajectory. The third of these values is the minimal period of time of a handwritten string which is preferably 0.05 s. The fourth of these values is the minimal period of time of a lifting of the pencil point which is preferably 0,03 s.

To this effect, the apparatus comprises means for calculating handwritten components and handwritten strings where each of the handwritten components is delimited by two successive liftings of the point along the trajectory of the movement, and each of the handwritten strings is delimited by two successive portions of the trajectory of the movement where the $V_\theta$ value is higher than the predetermined angular speed value and the $V_\sigma$ value is lower than the predetermined curvilinear speed value. This means for calculating is performed by the processing unit 4.

The next step is the calculation of four simple dynamic parameters. These parameters allow a better classification of the signature. The percentages of the second, third and fourth dynamic parameters are normalized according to the duration of the whole duration of acquisition of a signature with liftings of the pencil point. The stops are characterized by a displacement inferior to a predetermined threshold value which can be preferably of 0.008 cms by sampling period. This means that the pencil point is considered as being immobile if the displacement speed is inferior to 0.8 cms/seconds. These threshold values have been fixed to the above-mentioned values because of the noise generated by the tablet. Of course, these threshold values can vary with the use of another tablet having different characteristics.

To this effect, the apparatus comprises means for calculating, by means of the $D_z(t)$, the first simple dynamic parameter consisting of a period of time of the trajectory during which the point of the pencil is contacting the tablet 2; means for calculating, by means of $D_z(t)$, the second simple dynamic parameter consisting of a percentage representative of a period of time of the trajectory during which the point is lifted; means for calculating, by means of the $D_x(t)$ and $D_y(t)$, the third simple dynamic parameter consisting of a percentage representative of a period of time of the trajectory during which the point is stopped; and means for calculating, by means of the $V_\theta$ value, the fourth simple dynamic parameter consisting of a percentage representative of a period of time of the trajectory during which the $V_\theta$ value is positive. All the above-mentioned means for calculating are performed by the processing unit 4.

The next step is concerned with the processing of the image formed by the trajectory of the movement. This processing of the image of the movement consists of a rotation of the trajectory according to its base line, and a normalization of the dimensions of the trajectory by a scaling. The rotation of the trajectory is needed to correct the effects of the orientation of a trajectory according to the cartesian reference of the tablet. The base line of a trajectory is estimated by establishing a straight line of regression applied to local minimums according to the Y cartesian axis. The straight line indicates the orientation of the trajectory with respect to the cartesian reference. A first rotation is made by applying a rotating operator to correct the inclination of the trajectory, and a second iteration is made so that the base line of the trajectory is aligned with a horizontal base line.

It has been noted that the dimensions of the signature of one person vary with a great magnitude from time to time. A normalization of the dimensions of the movement by means of a scaling can correct these variations. The dimensions of the normalized trajectories will be from 0 to 10,000 along the X cartesian axis, and have a value of 0 at the base line of the trajectory along the Y cartesian axis.

To this effect, the apparatus comprises calculating means for applying respectively a first predetermined rotating operator and a second predetermined rotating operator to the $D_x(t)$ and $D_y(t)$ signals for correcting inclination of the trajectory and aligning a base line of the trajectory with a horizontal base line; and calculating means for scaling the $D_x(t)$ signal according to the X cartesian axis with values varying from 0 to 10,000 and for scaling the $D_y(t)$ according to the Y cartesian axis with a value of 0 when $D_y(t)$ signal crosses the base line of the trajectory. Again, all these calculating means are performed by the processing unit 4.

To complete this processing unit 4, there is provided a keyboard 6, a monitor 8 and a disc unit 10. The processing unit 4, the keyboard 6, the monitor 8 and the disc unit 10 form a microcomputer 12.

The analogue-to-digital tablet 2 is of the electromagnetic type. This tablet 2 comprises a receiving surface and an emitting pencil (not shown) provided with a point detector and a command button. The function of this tablet 2 is to sample according to a constant frequency the handwriting movement of a user. The frequency of the tablet must be very stable to allow extraction of dynamic characteristics such as, for example, displacement speeds according to a cartesian reference.

The interface device forming the communication link between the tablet 2 and the microcomputer 10 is of the serial type. Accordingly, it is important to know the format of the output signal of the tablet 2. It has to be noted that this format is variable, thus allowing several modes of operation in which different parameters can be modified, such as the resolution of the tablet, the sampling frequency of the tablet, the transmission speed of the information generated by the tablet to the microprocessor, and the presence of parity.

The keyboard 6 is an input device comprising several control and alphanumeric keys. The keyboard allows a selection of different commands available with the possibility to enter personal information concerning the person under test. The keyboard associated with its serial controller can be of the IBM PC, AT, or extended type.

The monitor 8 is a video display allowing the display of the commands that are available, instructions and results associated with operations that have been performed. The display can be of the Monochrome Adapter, Color Graphic Adapter, Enhanced Graphic Adapter or Video Graphic Array type.

The disc unit 10 is of the magnetic type. This unit 10 allows the storage of the software as well as the different data associated with the system. The disc unit 10 has a minimum capacity of 20 Mb. Each acquisition index includes the information relating to the previous acquisition of a movement by the same user. The disc unit 10 is connected to its controller in a regular manner known in the art.

The processing unit 4 allows the operation of the software. This operation can be divided in three parts. The first part is concerned with the control of the inputs which are provided by the tablet 2, the keyboard 6, and the disc unit 10. The second part is concerned with the processing of the information itself. And the third part is concerned with the command outputs for the monitor 8 and the disc unit 10.

The microprocessor of the processing unit is an INTEL 80286 or 80386 TM having an internal clock of at least 12 MHz. This microprocessor which constitutes the central microprocessor is connected to a mathematical processor which is an INTEL 80287 with a fast RAM memory (100 ns) and a serial port RS-232 for the connection of the tablet 2. The exploitation system for this microcomputer 12 is a MS-DOS Version 3.0 or a more recent version.

For example, the present system can be implemented with the following material: a central microprocessor 80286(12 MHz), an additional mathematical microprocessor 80287(8 MHz), a RAM memory of 512 Kb (100 ns), a serial port RS-232, an internal clock with a calendar, a keyboard of the IBM PC ™ type, a hard disc of 20 Mb and its controller (80 ms), a monitor with a video controller Monochrome Adapter, a SUMMAGRAPHIC MM1201 ™ or PENCEPT 300 ™ tablet, and a MS-DOS Version 3.0 ™ system.

The present system can be also implemented with the following material: central microprocessor 80386 (16 MHz), an additional mathematical microprocessor 80287(8 MHz), a RAM memory of 640 Kb+256 Kb (100 ns), two serial ports RS-232 one parallel port, internal calendar and clock, a keyboard of the extended type, a hard disc of 40Mb and its controller (28 ms), a monitor with a video controller Enhanced Graphic Adapter, a SUMMAGRAPHIC MM1201 and PENCEPT 300 tablets, a MS-DOS Version 3.10 exploitation system, an C microsoft version 5.10 compiler, and a CODE EXPERT Version 1.11 ™ software.

Among the different acquisition modes available, it has been decided to use the proximity acquisition mode, which means that the sampling and the transmission of the information from the tablet to the microcomputer 12 is done only if the position of the pencil point is below 2.5 cms of the surface of the tablet 2.

The present system can be used with two types of tablets which are the "SUMMAGRAPHIC MM1201" (Trade Mark) tablet and the "PENCEPT 300" (Trade Mark) tablet. These tablets have several characteristics, which comprise, among others, the proximity which is the maximal distance below which the information is considered valid, this distance being measured perpendicularly to the surface of the tablet; the precision which relates to the error associated with the difference of position between the measured position and the actual position of the pencil; the noise which relates to the error associated with fluctuations of position, measured during successive acquisition of the same position when the pencil is maintained at this position; and the constancy which relates to the error associated with the difference of position measured during the repetition of the same experience.

Referring now to FIG. 3, there are shown the principal characteristics of the "SUMMAGRAPHIC MM1201" and "PENCEPT 300" tablets in view of the characteristics discussed above.

Referring now to FIG. 4, there is shown the transmission format of the output of the "SUMMAGRAPHIC MM1201" tablet. The X13-X0 represents the X co-ordinates, where X0 is the least significant bit. The Y13-Y0 represents the Y co-ordinates where Y0 is the least significant bit. When DWN=1, this means that the point of the pencil is in a position to operate. When SID=1, this means that the command button of the pen has been pressed. When Prx=0, this means that the point of the pencil is out of the operative proximity, and when this value equals 1, this means that the point of the pencil is inside the operative proximity.

Referring now to FIG. 5, there is shown the transmission format of the "PENCEPT 300" tablet. The X13-X0 represent the X co-ordinates where X0 is the least significant bit, and the Y13-Y0 represents the Y coordinates where Y0 is the least significant bit. The Ax9-Ax0 represents the X angle where Ax0 is the least significant bit, and the Ay9-Ay0 represents the Y angle where Ay0 is the least significant bit, the value of 512 being representative of a vertical position.

The values of Dwn, Sid and Prx have the same meaning that the one described for the FIG. 4.

Figure 6:
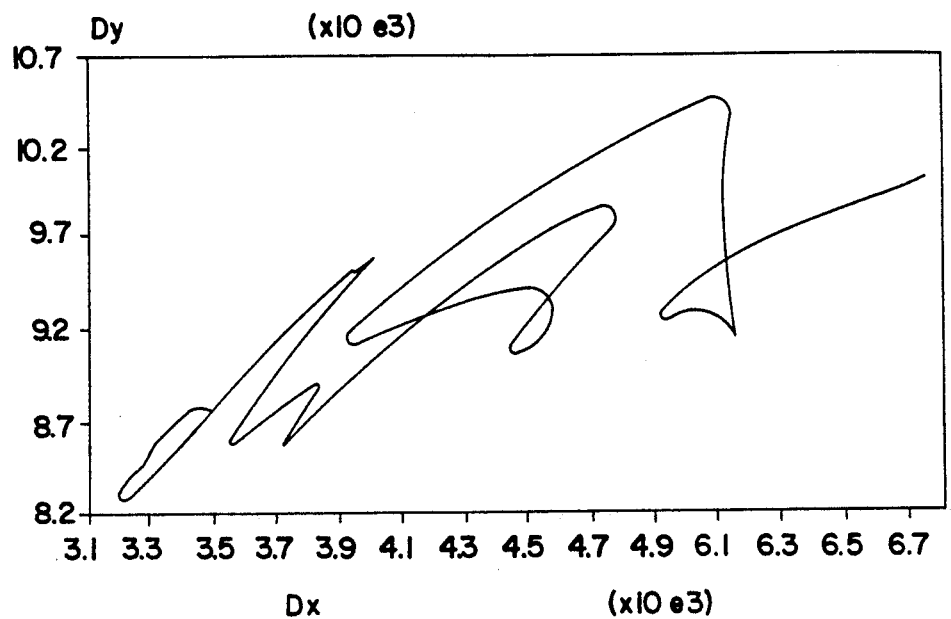
FIG. 6 is a diagram illustrating the trajectory of a movement after that it has been filtered.

Referring now to FIG. 6, there is shown a handwriting movement detected by the tablet ad filtered by the low-pass filter of the GAUSSIAN type which has the frequency spectrum shown on FIG. 2. The X axis is representative of the Dx value, and the Y axis is representative of the Dy value. This movement has not been normalized.

Figure 7:
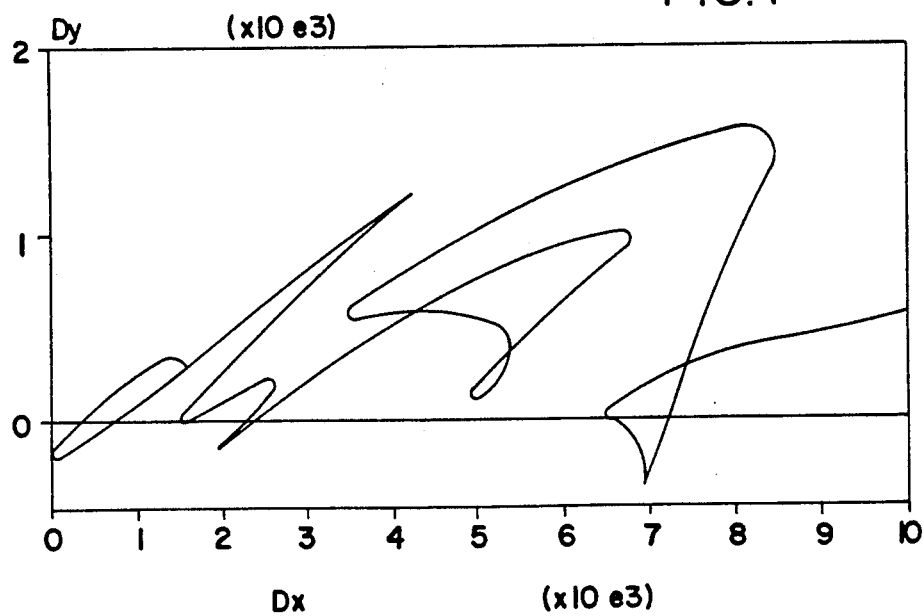
FIG. 7 is a diagram illustrating the trajectory of a movement after that it has been filtered and normalized.

Referring now to FIG. 7, there is shown the trajectory presented on FIG. 6 after that it has been normalized. As described earlier, this normalization consists of a rotation of the trajectory with a scaling.

Figure 8:
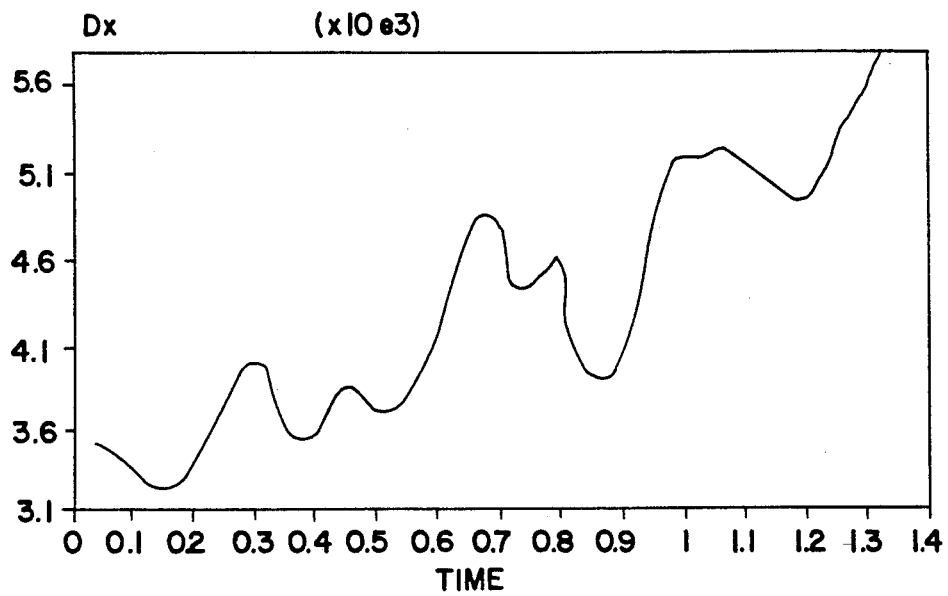
FIG. 8 is a diagram illustrating the displacement according to the X axis of the movement shown in FIG. 6, versus time.

Referring now to FIG. 8, there is shown the variations of the Dx value shown on FIG. 6, with respect to time.

Figure 9:
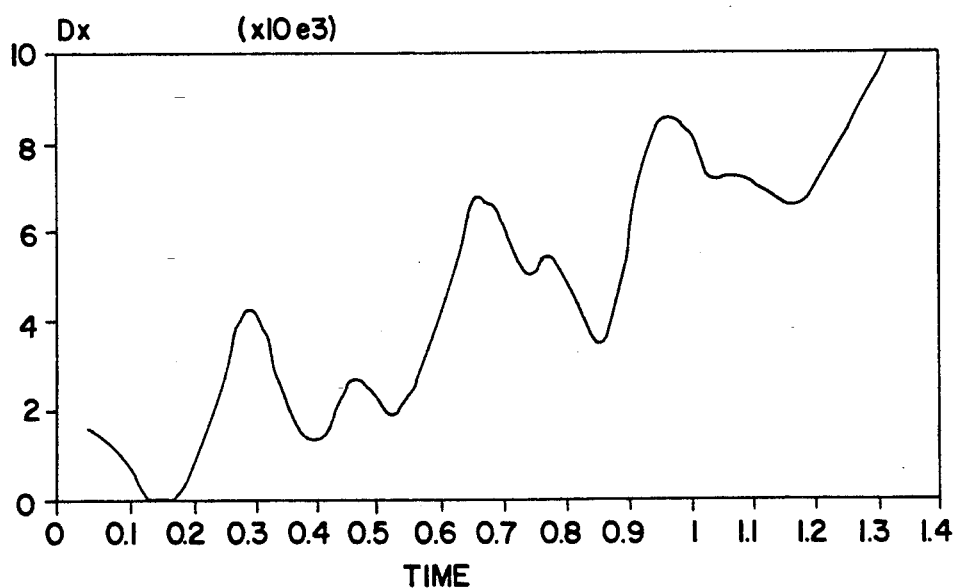
FIG. 9 is a diagram illustrating the displacement according to the X axis of the movement shown in FIG. 7, versus time.

Referring now to FIG. 9, there is shown the variations of Dx value shown on FIG. 7, with respect to time.

Figure 10:
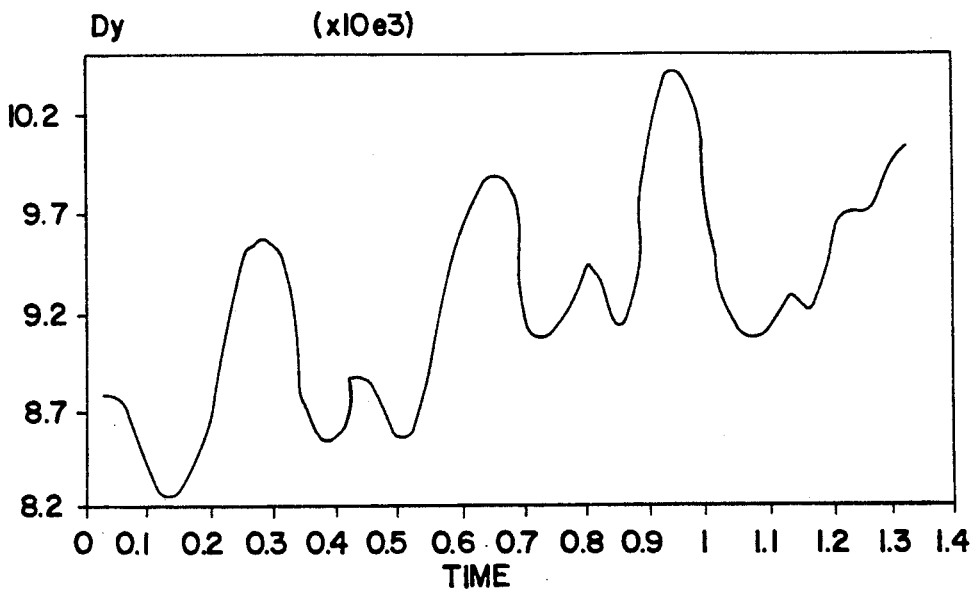
FIG. 10 is a diagram illustrating the displacement along the Y axis of the movement shown on FIG. 6, versus time.

Referring now to FIG. 10, there is shown the variations of Dy value of FIG. 6, with respect to time.

Figure 11:
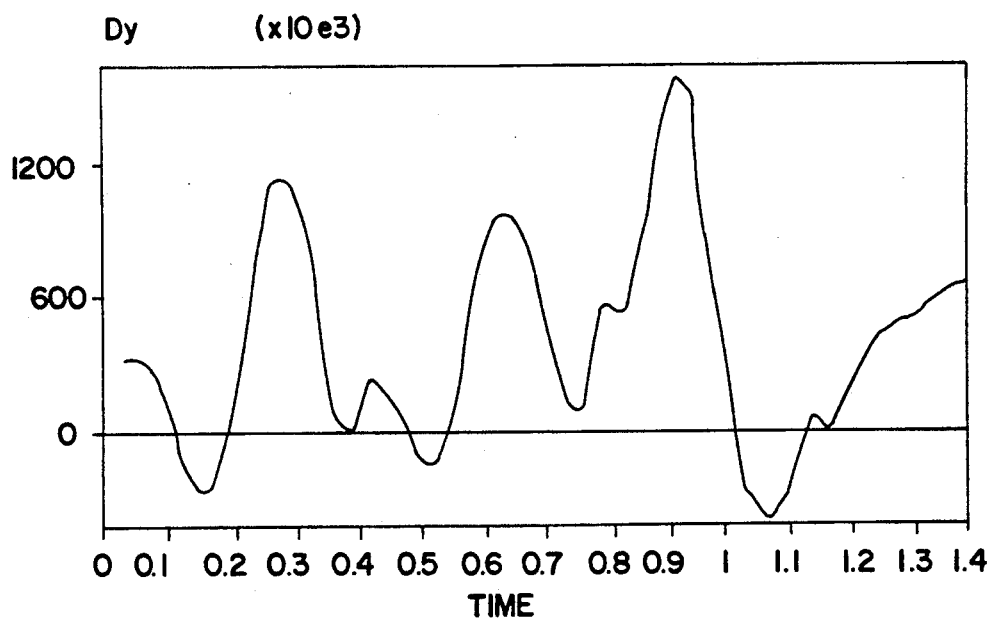
FIG. 11 is a diagram illustrating the displacement along the Y axis of the movement shown on FIG. 7, versus time.

Referring now to FIG. 11, there is shown the variations of Dy value of FIG. 7, with respect to time.

When comparing FIG. 10 and FIG. 11, it can be noted that there is an important variation of the value of Dy along the Y axis.

Figure 12:
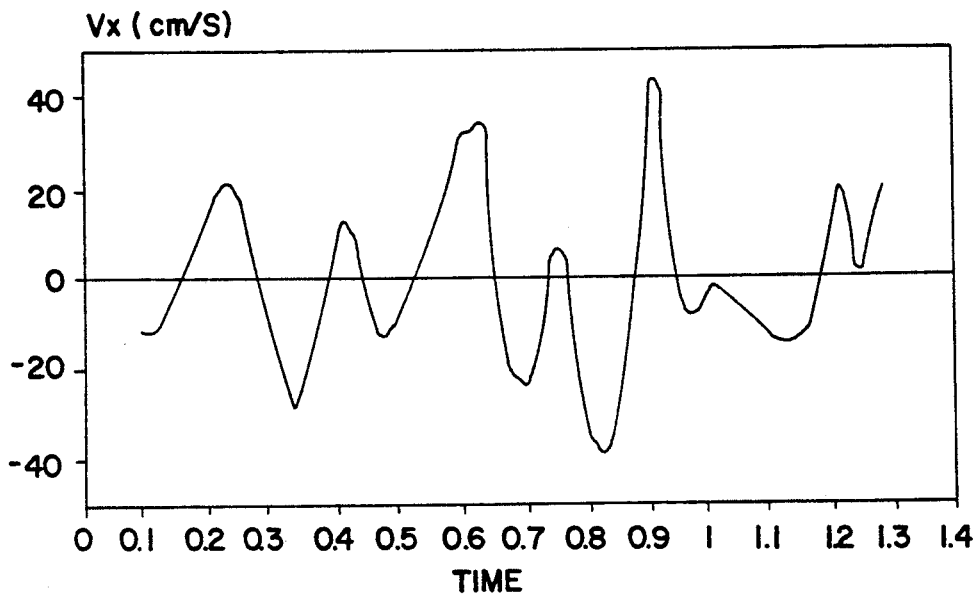
FIG. 12 is a diagram illustrating the cartesian speed $V_x$ of the movement shown on FIG. 6, versus time.

Referring now to FIG. 12, there is shown the cartesian speed Vx of the trajectory shown on FIG. 6, with respect to time. As explained earlier, this $V_x$ is obtained by means of a derivation filter.

Figure 13:
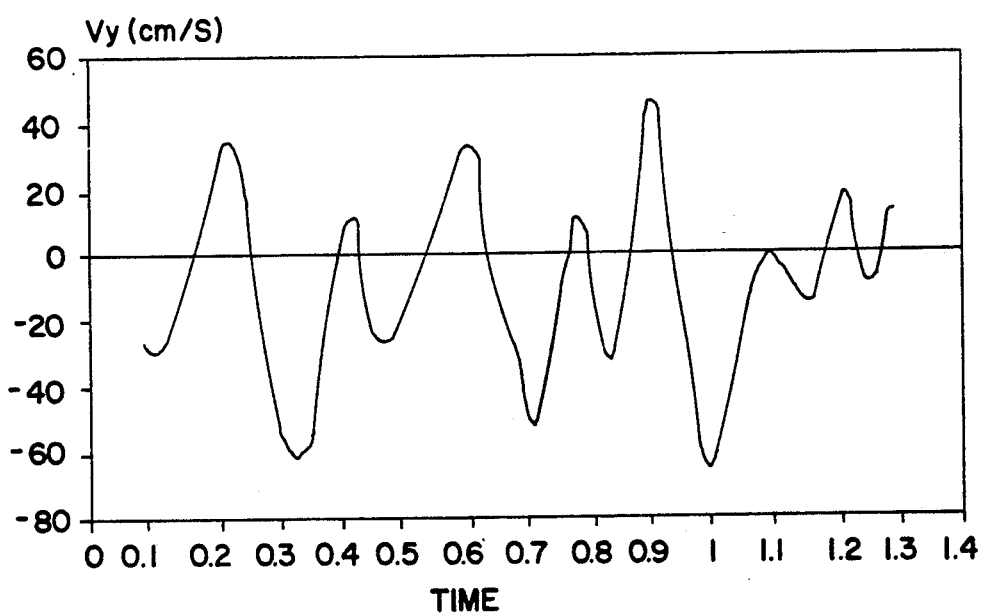
FIG. 13 is a diagram illustrating the cartesian speed $V_y$ of the movement shown on FIG. 6, versus time.

Referring now to FIG. 13, there is shown the cartesian speed Vy of the trajectory shown on FIG. 6, with respect to time.

Figure 14:
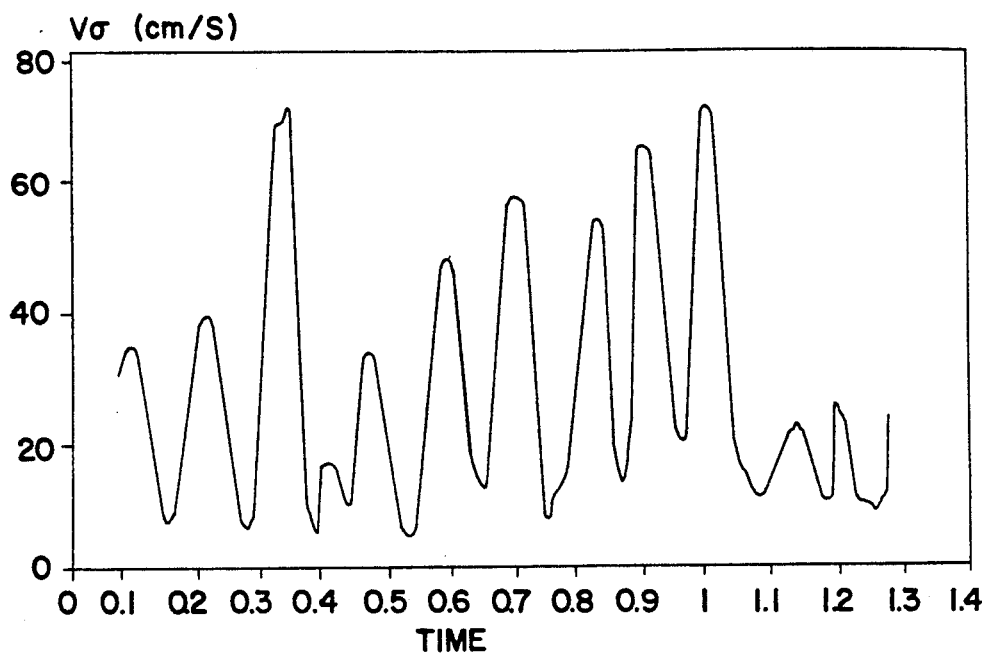
FIG. 14 is a diagram illustrating the curvilinear speed $V_\sigma$ of the movement shown on FIG. 6, versus time.

Referring now to FIG. 14, there is shown the curvilinear speed $V_\sigma$ of the trajectory shown on FIG. 6, with respect to time.

Figure 15:
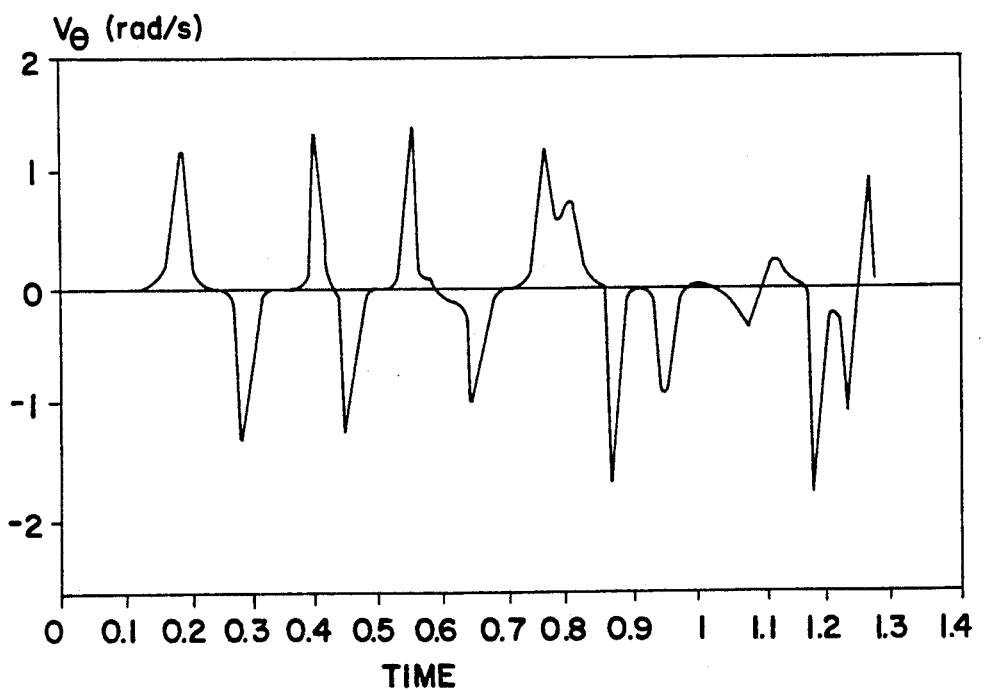
FIG. 15 is a diagram illustrating the angular speed $V_\theta$ of the movement shown on FIG. 6, versus time.

Referring now to FIG. 15, there is shown the angular speed $V_\theta$ of the trajectory shown on FIG. 6, with respect to time.

Figure 16:
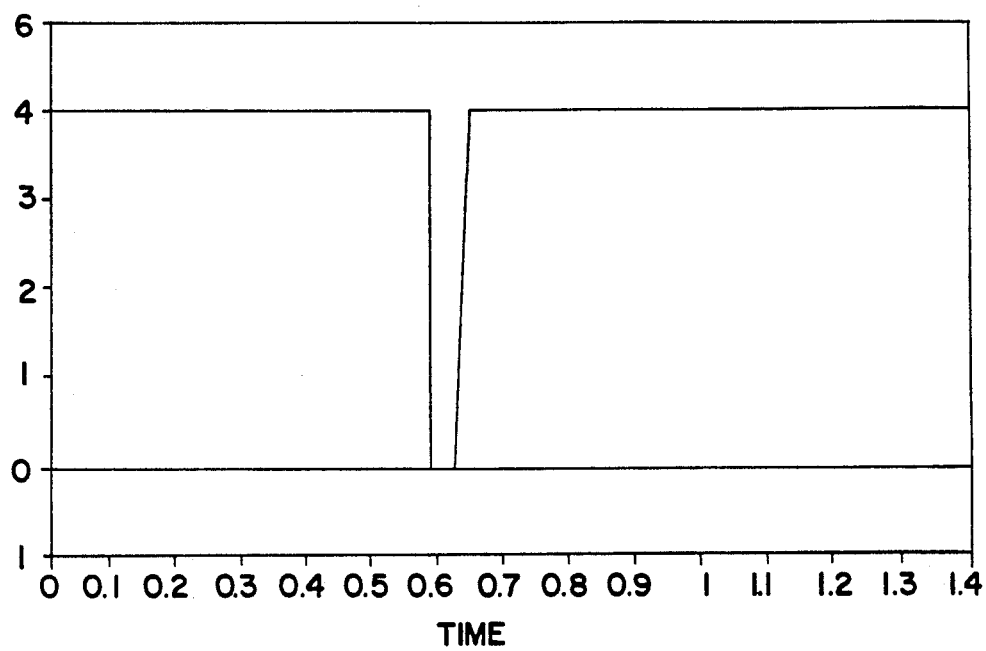
FIG. 16 is a diagram illustrating the signal representative of the lifting of the pen of the analogue-to-digital tablet shown on FIG. 1.

Referring now to FIG. 16, there is shown an example of the signal indicating the state of the pencil point with respect to time. When the pencil point is contacting the tablet, the amplitude of the signal is equal to 4.

Figure 17:
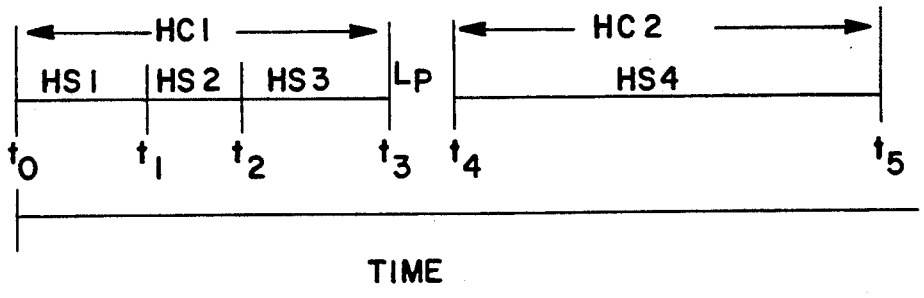
FIG. 17 is a diagram illustrating dynamic segmentation according to the present invention.

Referring now to FIG. 17, there is shown, as an example, the result of dynamic segmentation with respect to time. In this example, the trajectory has been divided in four handwritten strings HS1, HS2, HS3 and HS4, and two handwritten components HC1 and HC2. The handwritten components HC1 and HC2 are separated by a lifting of the pen Lp. The first handwritten component is composed of three handwritten strings HS1, HS2 and HS3 which terminate at $T_1$, $T_2$ and $T_3$ The second handwritten component HC2 is constituted of only one handwritten string HS4 which terminates at $T_5$.

Now concerning the verification of a signature, it consists of the acquisition of a test handwritten signature, and the verification of this test signature. This verification is made over three distinct levels. A first level consists in calculating the variations of the simple dynamic parameters of the test signature with respect to the corresponding parameters of the reference signature. The second level of verification consists in calculating intrinsic local correlation between portions of the test signature velocity with corresponding portions of the reference signature velocity. The third level of verification consists in calculating distances between the test signature image and the reference signature image by dynamic pattern matching. These levels of verification are based on a discriminating function determined by threshold values which are preferably personalized threshold values that are calculated from the acquisition of more than one reference signatures. If necessary, a correction of the segmentation of the test signature is done to improve its classification.

Referring now again to FIG. 1, there is shown the apparatus for comparing a test signature with a reference signature where each of the test and reference signatures have been acquired, as described earlier, by generating three electrical digital position signals characterizing a trajectory of a handwritten signature by means of a pencil provided with a point and an analogue-to-digital tablet, the three signals being $D_x(t)$, $D_y(t)$ and $D_z(t)$;

low-pass filtering the $D_x(t)$ and $D_y(t)$ electrical signals;

taking the derivative of the $D_x(t)$ and $D_y(t)$ electrical signals for generating $V_x$ and $V_y$ electrical components;

calculating $V_\sigma$ and $V_\theta$ values from $V_x$ and $V_y$ components where:

$$V_\sigma = \sqrt{\|V_x\|^2 + \|V_y\|^2}, \text{ and}$$

$$V_\theta = \pm \cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

calculating handwritten components and handwritten strings, the handwritten strings and components having beginnings and ends determining temporal marks along the trajectory by which duration of the handwritten signature is calculating, by means of the $D_z(t)$, a first simple dynamic parameter $P_1$ consisting of a period of time of the trajectory during which the point of the pencil is contacting the tablet;

calculating, by means of $D_z(t)$, a second simple dynamic parameter $P_2$ consisting of a percentage representative of a period of time of the trajectory during which the point is lifted;

calculating, by means of the $D_x(t)$ and $D_y(t)$, a third simple dynamic parameter $P_3$ consisting of a percentage representative of a period of time of the trajectory during which the point is stopped;

calculating, by means of the $V_\theta$ value, a fourth simple dynamic parameter $P_4$ consisting of a percentage representative of a period of time of the trajectory during which the $V_\theta$ value is positive;

applying respectively a first predetermined rotating operator and a second predetermined rotating operator to the $D_x(t)$ and $D_y(t)$ signals for correcting inclination of the trajectory and aligning a base line of the trajectory with a horizontal base line; and scaling the $D_x(t)$ signal according to the X cartesian axis, and scaling the $D_y(t)$ according to the Y cartesian axis.

The apparatus for comparing a test signature with a reference signature comprises means for calculating variations of the simple dynamic parameters of the test signature with respect to the simple dynamic parameters of the reference signature, by calculating a first evaluating function C1 where:

$$C1 = \sum_{i=1}^{4} p_i FC1_i (RC1_i) \in [0,1]$$

where $FC1_i(RC1_i)$ is a function representative of the variations of a particular dynamic parameter where i indicates the parameter in question, and $p_i$ is a weight given to a particular parameter of the simple dynamic parameters; means for comparing C1 with a first threshold value, and rejecting the test signature if C1 passes the first threshold value; means for calculating a classifying function $C_a$ where:

$$C_a = a1 \cdot C1$$

where a1 is a weight given to the first evaluating function C1; and means for comparing the classifying function $C_a$ with a second threshold value, and rejecting the test signature if $C_a$ passes the second threshold value. All of the abovementioned means for calculating and means for comparing are performed by the processing unit 4.

To compare a reference signature with a test signature, the temporal marks of each signature have to be adapted. A correction of the temporal marks of each signature is done by deleting temporal marks that are not shared with the corresponding signature. Thus, concatenation of certain temporal marks will be done to form a group of characteristic segments of the test and reference signatures. This coupling is made by dynamic pattern matching by effectuating temporal expansion of the temporal marks of the signature having the shortest duration so that its duration matches the duration of the other signature, and by concatenating characteristic segments by rejecting liftings of the pen that are not shared by both signatures. These characteristic segments are determined by dynamic pattern matching which consists in calculating a distance d based on the position and the duration of the characteristic segments, where:

$$d = \sqrt{d_{POS}^2 + (2 \cdot d_{DUR})^2}$$

where $d_{POS}$ is the temporal position difference of the beginning of the corresponding pen liftings, and $d_{DUR}$ is the duration difference of the corresponding pen liftings To this effect, the apparatus comprises first means for comparing durations of the test and reference signatures, and effectuating temporal expansion of the temporal marks of the signature having the shortest duration so that its duration matches the duration of the other signature; second means for comparing sequences of the temporal marks of the test and reference signatures and for coupling temporal marks of the test and reference signatures if and only if two corresponding temporal marks have between them a minimal temporal distance which is reciprocally the shortest between the sequences in question, and said minimal distance is shorter than a predetermined distance so that coupled temporal marks form a pair of characteristic segments of the test and reference signatures; and means for processing in an iterative manner remaining temporal marks, that have not been coupled, of the test and reference signatures by means of the first and second means for comparing until no characteristic segment is coupled. The above-mentioned first and second means for comparing, and the means for processing are performed by the processing unit 4.

The apparatus also comprises means for calculating local intrinsic correlations of the $V_\sigma$ and $V_\theta$ values of the test and reference signatures for each of the pairs of characteristic segments, by calculating a second evaluating function C2 where:

$$C2 = \sum_{i=1}^{2} p_i FC2_i (RC2_i), \epsilon [-1,1]$$

where $FC2_i(RC2_i)$ is a function representative of the local intrinsic correlation of either the $V_\sigma$ or $V_\theta$ values for the pairs of characteristic segments where i indicates the component in question, and $p_i$ is a weight given to the particular component in question; means for comparing C2 with a third threshold value, and rejecting the test signature if C2 passes the third threshold value; means for calculating a classifying function $C_b$ where:

$$C_b = a_1 C1 \cdot a_2 C2$$

where $a_2$ is a weight given to the second evaluating function C2; and means for comparing the classifying function $C_b$ with a fourth threshold value, and rejecting the test signature if $C_b$ passes the fourth threshold value. Again, the abovementioned means for comparing and means for calculating are performed by the processing unit 4.

The apparatus also comprises means for calculating variations of $D_x$ and $D_y$ components of the test and reference signatures for each of the pairs of characteristic segment, by calculating a third evaluating function C3 where:

$$C3 = FC3(RC3), [-1,1]$$

where FC3(RC3) is a function representative of variations of $D_x$ and $D_y$ components for the pairs of characteristic segments; means for comparing C3 with a fifth threshold value, and rejecting the test signature if C3 passes the fifth threshold value; means for calculating a classifying function $C_c$ where:

$$C_c = a_1 C1 + a_2 C2 + a_3 C3$$

where $a_3$ is a weight given to the third evaluating function C3; and means for comparing the classifying function $C_c$ with a sixth threshold value REJ, and either rejecting the test signature if $C_c$ is higher than the sixth threshold value REJ, or emitting a signal indicating that no conclusive result has been achieved if $C_c$ is within a first range of values limited by REJ and a threshold value UNC, or accepting the test signature if $C_c$ is lower than UNC. Again, the above-mentioned means for calculating and means for comparing are performed by the processing unit 4. The processing unit 4 rejects the test signature when the first evaluating function C1 equals zero and the second evaluating function C2 equals 1, because it is known that two signatures cannot be exactly the same. Also, for the same reason, the processing unit 4 rejects the test signature when the first evaluating function C1 equals zero and the third evaluating function C3 equals zero.

Each of the classifying functions $C_a$, $C_b$ and $C_c$ is formed by the linear combination of weighed functions C1, C2 and C3 associated respectively with the levels of verification. This classifying function is:

$$C = \sum_{i=1}^{3} a_i C_i$$

These functions $C_i$ are discriminating functions based on an exponential function which is:

$$F(x) = \left[ \frac{(e^{h(x)} - 1)}{(e - 1)} \right]^N + cte \, \epsilon \, [cte, cte + 1]$$

where h(x) is a linear function with respect to x which is comprised in the interval [0,1], N is a growth factor, and cte is a shift.

Figure 18:
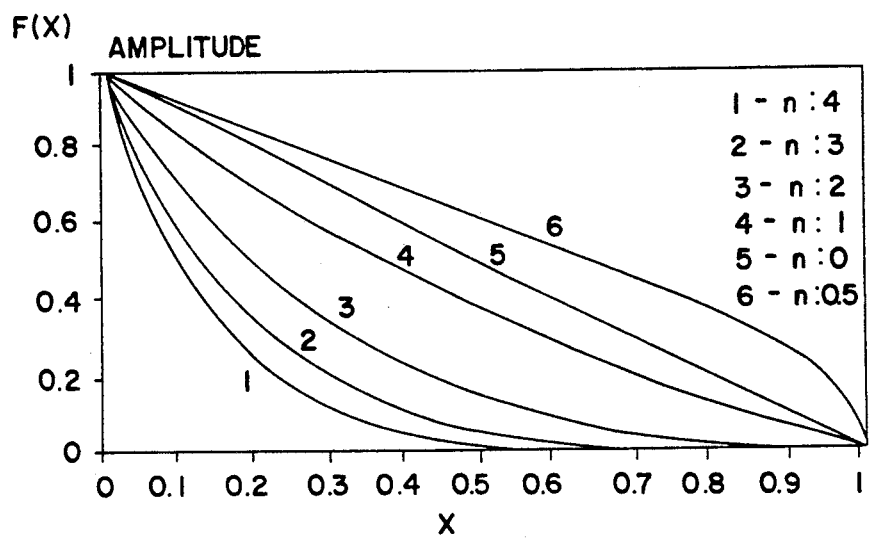
FIG. 18 is a diagram illustrating an exponential function F(X) with respect to X for different values of the growth factor n.

Referring now to FIG. 18, there is shown an example of this function where h(x) = 1-x, cte = 0, and N = 0, 1, 2, 3, 0.5. The variation effect of the factor "N" on the level of growth is clearly shown.

Figure 19:
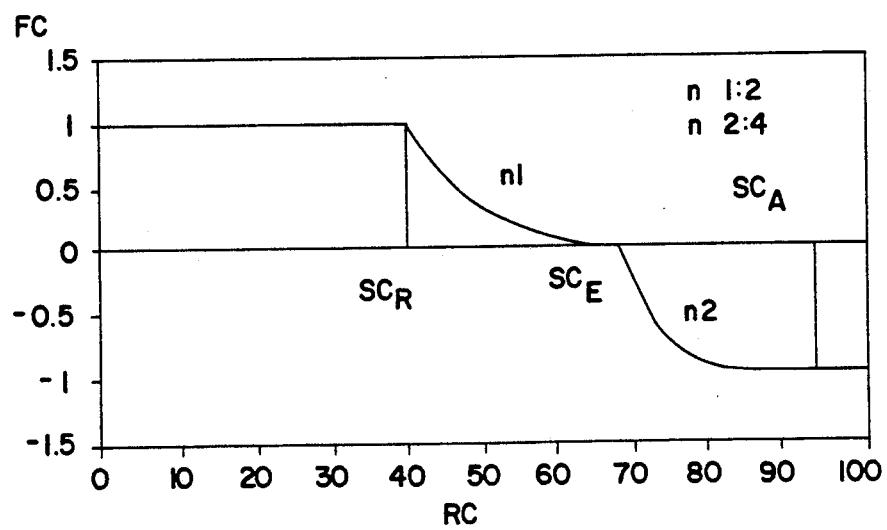
FIG. 19 is a diagram illustrating a function FC(RC) with respect to RC.

Referring now to FIG. 19, there is shown four ranges of possible results associated with the functions $C_i$. Firstly, if $F(x) \leq SC_R$, then the test signature is immediately rejected; secondly, if $SC_R < F(x) < SC_E$, then a penalty weight is associated with this result; thirdly, if $SC_E \leq F(x) \leq SC_A$, then a compensation weight is associated with this result; and fourthly, if $SC_A < F(x)$, then the test signature is immediately accepted. $SC_R$ is a rejection threshold value, $SC_E$ is an equilibrium threshold value, and $SC_A$ is an acceptation threshold value. The evaluation of these threshold values $SC_R$, $SC_E$ and $SC_A$ are based on experimentation.

Preferably, these threshold values $SC_R$, $SC_E$ and $SC_A$ can be based on personalized threshold values determined from several reference signatures. To determine these personalized threshold values, the acquisition of a group of three reference signatures is done. The acquisition of each of these reference signatures is done in the regular manner as described earlier in the disclosure. An acquisition index is created for each of these reference signatures, allowing an analysis of the variations between each of these reference signatures.

Then, personalized threshold values are determined from this analysis. These personalized threshold values allow an auto-adaptation of the discriminating functions $C_i$ with respect to the stability of the reference signatures that are provided.

The determination of these personalized threshold values is based on the worst results of verifications obtained by comparing the three reference signatures among themselves, taken two by two. Each of these reference signatures is considered, at one time of the comparison, as a reference signature, and at another time, as a test signature. Seven personalized threshold values $SP1_1$, $SP1_2$, $SP1_3$, $SP1_4$, $SP2_1$, $SP2_2$ and $SP3$ can be determined. $SP1_1$ represents a maximum variation of the duration of the acquisition of a signature without lifting of the pen, $SP1_2$ is a maximum variation of the normalized percentage of the duration of the stops of the pen, $SP1_3$ is a maximum variation of the normalized percentage of the duration of the liftings of the pen, $SP1_4$ is a maximum variation of the normalized percentage of the duration during which V is positive, $SP2_1$ is the lower intrinsic local correlation of the curvilinear speed $V_\sigma$, $SP2_2$ is the lower intrinsic local correlation of the angular speed $V_\theta$, and SP3 is the greater distance between two compared signatures, obtained by dynamic pattern matching.

Referring now to FIG. 20, there is shown in the upper table, the average values of $P_1$, $P_2$, $P_3$ and $P_4$. In the middle table, there is shown the variations of the parameters. The upper array indicates the level of verification where these variations are determined. The first column indicates the six permutations possible as there are three reference signatures. In the lower table, there is shown the personalized threshold values that are determined from the middle table. As it can be seen, these personalized threshold values are determined from the worst results obtained in the middle table.

Now, there will be described the means for calculating $RC1_i$ and $FC1_i(RC1_i)$. As there are four simple dynamic parameters, the term "i" of the expression $RC1_i$ varies from 1 to 4.

The apparatus comprises means for calculating $RC1_1$, $RC1_2$, $RC1_3$ and $RC1_4$ where:

$RC1_1 = (P_1$ of the test signature $- P_1$ of the reference signature$)/P_1$ of the reference signature;

$RC1_2 = P_2$ of the test signature $- P$ of the reference signature;

$RC1_3 = P_3$ of the test signature $- P$ of the reference signature; and $RC1_4 = P_4$ of the test signature $- P$ of the reference signature. The above-mentioned means for calculating is also performed by the processing unit 4.

The apparatus also comprises means for calculating $FC1_i(RC1_i)$ for each of the four dynamic parameters where $RC1_i$ is the variation of a particular dynamic parameter, where:

$FC1_i(RC1_i) = 0$ if $RC1_i < SC1_{Ei}$ where $SC1_{Ei}$ is a seventh predetermined threshold value for a particular dynamic parameter, $FC1_i(RC1_i) = ((e^{h(RC1_i)} - 1)/(e-1))^{Ni}$ if $SC1_{Ei} < RC1_i < SC1_{Ri}$ where $SC1_{Ri}$ is an eighth predetermined threshold value for a particular dynamic paramater, or $FC1_i(RC1_i) = 1$ if $SC1_{Ri} \leq RC1_i$, where $h(RC1_i) = (RC1_i - SC1_{Ei})/(SC1_{Ri} - SC1_{Ei})$, and where Ni is a growth factor for a particular dynamic parameter; and means for generating a signal indicative of a rejection of the test signature if $FC1_i(RC1_i) = 1$. The above-mentioned means for calculating and means for generating are performed by the processing unit 4.

In the case where the equilibrium threshold value $SC1_{Ei}$ and the rejection threshold value $SC1_{Ri}$ are determined by personalized threshold values, $SC1_{Ei} = $ MAX(cte, $p(SC1_{pi})$) $\in [0\%, SC1_{Ri}]$, and $SC1_{Ri} = $ MAX(cte, $q(SC1_{pi})$) $\in ]SC1_{Ei}, \infty]$. $p(SC1_{pi})$ and $q(SC1_{pi})$ are linear functions of the type $y = a \cdot SC1_{pi} + b$, where $SC1_{pi}$ is the personalized threshold value "i" which is respectively $SP1_1$, $SP1_2$, $SP1_3$ or $SP1_4$. a, b and cte are predetermined constants. The threshold values $SC_{Ei}$ and $SC_{Ri}$ can also be set from precedent experiences.

The local correlation is an algorithm that measures the similarity between two signals with respect to their coefficient of linear correlation. This local correlation is applied to $V_\sigma$ and $V_\theta$ values for each pair of characteristic segments. The wanted result is the weighed summation of its application:

$$RC2_1 = \frac{1}{l_r} \cdot \sum_{j=1}^{N} CV_{\sigma j} \cdot l_j, \in [-1, 1]$$

$$RC2_2 = \frac{1}{l_r} \cdot \sum_{j=1}^{N} CV_{\theta j} \cdot l_j, \in [-1, 1]$$

where $RC2_1$ is the intrinsic local correlation of the curvilinear speed $V_\sigma$, $RC2_2$ is the intrinsic local correlation of the angular speed $V_\theta$, N is the number of characteristic segments, $l_r$ is the total number of samples for obtaining the reference signature, $l_j$ is the number of samples for obtaining a particular characteristic segment identified by "j", $CV_{\sigma j}$ is the partial intrinsic local correlation of the curvilinear speed $V_\sigma$, and $CV_{\theta j}$ is the partial intrinsic local correlation of the angular speed $V_\theta$, where:

$$CV_{\sigma i} = \underset{K}{\text{MAX}} \left[ \frac{COVAR_{\sigma i}(K)}{\sqrt{VAR_{\sigma Ri} \cdot VAR_{\sigma Ti}}} \right]$$

$$COVAR_{\sigma i}(K) = L(K) \cdot \sum_t (V_{\sigma R}(t) - \overline{V_{\sigma R}}) \cdot (V_{\sigma T}(t) - \overline{V_{\sigma T}})$$

where K is a phase shifting between the signals, L(K) is a shared portion of the signals with respect to the phase shifting K, $V_{\sigma R}(t)$ and $V_{\sigma T}(t)$ are respectively the curvilinear speeds of the reference and test signatures, $\overline{V_{\sigma R}}$ and $\overline{V_{\sigma T}}$ are respectively the average curvilinear speeds of the reference and test signatures, and $VAR_{\sigma Ri}$ and $VAR_{\sigma Ti}$ are respectively the variances of the curvilinear speed of the reference and test signatures, where:

$$VAR_{\sigma Ri} = \sum_t (V_{\sigma R}(t) - \overline{V_{\sigma R}})^2$$

$$VAR_{\sigma Ti} = \sum_t (V_{\sigma T}(t) - \overline{V_{\sigma T}})^2$$

Similar calculations can be done for calculating $CV_{\theta R}$ with respect to intrinsic angular speeds $V_{\theta R}$ and $V_{\theta T}$.

Now, there will be described the means for calculating $RC2_i$ and $FC2_i(RC2_i)$ where "i" varies from 1 to 2. The apparatus comprises means for calculating $RC2_1$ and $RC2_2$ where:

$$RC2_1 = \frac{1}{l_r} \cdot \sum_{j=1}^{N} CV_{\sigma j} \cdot l_j, \in [-1, 1]$$

$$RC2_2 = \frac{1}{l_r} \cdot \sum_{j=1}^{N} CV_{\theta j} \cdot l_j, \in [-1, 1]$$

where N is the number of pairs of characteristic segments, $l_r$ is the number of samples used for acquiring the reference signature, j identifies a particular pair of the pairs of characteristic segments, $l_j$ is the number of samples used for acquiring a particular segment of the reference signature, $CV_{\sigma j}$ is a partial intrinsic local correlation of the $V_\sigma$ value for a particular pair of the pairs of characteristic segments, and $CV_{\theta j}$ is a partial intrinsic local correlation of the $V_\theta$ value for a particular pair of the pairs of characteristic segments. The above-mentioned means for calculating is performed by the processing unit 4.

The apparatus also comprises means for calculating $FC2_i(RC2_i)$ for each of the $V_\sigma$ and $V_\theta$ values of the pairs of characteristic segments where $RC2_i$ is an intrinsic local correlation of either the $V_\sigma$ or $V_\theta$ value for the pairs of characteristic segments, where:

$FC2_i(RC2_i) = 1$ if $RC2_i < SC2_{Ri}$ where $SC2_{Ri}$ is a ninth predetermined threshold value, $$FC2_i(RC2_i) = ((e^{h1(RC2_i)} - 1)/(e-1))^{N1i}$$

if $SC2_{Ri} < RC2_i < SC2_{Ei}$ where $SC2_{Ei}$ is a tenth predetermined threshold value, $$FC2_i(RC2_i)  (((e^{h2(RC2_i)} - 1)/(e-1))^{N2i} - 1)$$

if $SC2_{Ei} \leq RC2_i$, or $FC2_i(RC2_i) = 0$ if $SC2_{Ai} \leq RC2_i$ where $SC2_{Ai}$ is an eleventh threshold value; where $h1(RC2_i) = (SC2_{Ei} - RC2_i)/(SC2_{Ei} - SC2_{Ri})$,
$h2(RC2_i) = (SC2_{Ai} - RC2_i)/(SC2_{Ai} - SC2_{Ei})$, and
N1i and N2i are predetermined growth factors;
means for generating a signal indicative of a rejection of the test signature if $FC2_i(RC2_i) = 1$; and means for generating a signal indicative of an acceptation of the test signature if $FC2_i(RC2_i) = 0$. The above-mentioned means for calculating and means for generating are performed by the processing unit 4.

In the case where the equilibrium threshold value $SC2_{Ei}$, the rejection threshold value $SC2_{Ri}$ and the acceptation threshold value $SC2_{Ai}$ are determined by personalized threshold values, $SC2_{Ei} = MAX(cte, p(SC2_{pi}))$ $\epsilon[SC2_{Ri}, SC2_{Ai}[, SC2_{Ri} = MIN(cte, q(SC2_{pi}))$ $\epsilon[0\%, SC2_{Ei}[$, and $SC2_{Ai} = MIN(cte, r(SC2_{pi}))$ $\epsilon]SC2_{Ei}, 100\%]$. $p(SC2_{pi})$, $q(SC2_{pi})$ and $r(SC2_{pi})$ are linear functions of the type $y = a.SC2_{pi} + b$, where $SC2_{pi}$ is the personalized threshold value "i" which is $SP2_1$ or $SP2_2$. a, b and cte are predetermined constants. The threshold values $SC2_{Ei}$, $SC2_{Ri}$ and $SC2_{Ai}$ can also be set from precedent experiences.

Now, there will be described the third level of verification in which a distance is calculated by dynamic pattern matching, and a minimal residual distance RC3 is determined between two signals by means of a function distorting the temporal scale. This function is applied to the signals of the $D_x$ and $D_y$ values for each pair of characteristic segments. The wanted result is the weighed summation of its application:

$$RC3 = \frac{1}{l_r} \cdot \sum_{j=1}^{N} RC3_{ii} \cdot l_{ii} \in [0, \infty]$$

where RC3 is the minimal residual distance obtained by dynamic pattern matching.

$$RC3 = MIN \begin{bmatrix} q(i, j-1) & + & d(i,j) \\ q(i-1, j-1) & + & d(i,j) \\ q(i-1, j) & + & d(i,j) \end{bmatrix}$$

where $$d(i,j) = \sqrt{(\Delta D_{xT} - \Delta D_{xR})^2 + (\Delta D_{yT} - \Delta D_{yR})^2} \; ;$$

$D_{xT}$ and $D_{xR}$ are respectively the $D_x$ components of the test and reference signatures of a particular pair of characteristic segments;

$D_{yT}$ and $D_{yR}$ are respectively the $D_y$ components of the test and reference signatures of a particular pair of characteristic segments; and $\Delta$ is a linear operator of difference.

To this effect, the apparatus comprises means for calculating RC3 where:

$$RC3 = \frac{1}{l_r} \cdot \sum_{j=1}^{N} RC3_{ii} \cdot l_{ii} \in [0, \infty]$$

where $RC3_{ii}$ is the minimal residual distance of the $D_x$ and $D_y$ components between the characteristic segments of a particular pair of the pairs of characteristic segments.

The above-mentioned means for calculating is performed by the processing unit 4.

The apparatus also comprises means for calculating $FC3(RC3)$ for each of the $D_x$ and $D_y$ components of the pairs of characteristic segments where RC3 is representative of the minimal residual distance of the $D_x$ and $D_y$ components between the characteristic segments of each of the pairs of characteristic segments, where:

$FC3(RC3) = 1$ if $RC3 > SC3_R$ where $SC3_R$ is a twelfth threshold value, $$FC3(RC3) = ((e^{h1(RC3)} - 1)/(e-1))^{N1}$$

if $SC3_E < RC3 < SC3_R$ where $SC3_E$ is a thirteenth threshold value, $$FC3(RC3) = (((e^{h2(RC3)} - 1)/(e-1))^{N2} - 1)$$

if $SC3_A < RC3 < SC3_E$ where $SC3_A$ is a fourteenth threshold value, or $FC3(RC3) = 0$ if $RC3 \leq SC3_A$; where $h1(RC3) = (RC3 - SC3_E)/(SC3_R - SC3_E)$, $h2(RC3) = (SC3_A - RC3)/(SC3_A - SC3_E)$, and N1 and N2 are predetermined growth factors; means for generating a signal indicative of a rejection of the test signature if $FC3(RC3) = 1$; and means for generating a signal indicative of an acceptation of the test signature if $FC3(RC3) = 0$. The above-mentioned means for calculating and means for generating are performed by the processing unit 4.

In the case where the equilibrium threshold value $SC3_E$, the rejection threshold value $SC3_R$ and the acceptation threshold value $SC3_A$ are determined by personalized threshold values, $SC3_E = MIN(cte, p\;))$ e $SC3_p))$ $\epsilon]SC3_A, SC3_R[$, $SC3_R = MAX(cte, q(SC3_p))$ $\epsilon]SC3_E, \infty$, and $SC3_A = MAX(cte, r(SC3_p))$ $\epsilon[0, SC3_E[$. $p(SC3_p)$, $q(SC3_p)$ and $r(SC3_p)$ are linear functions of the type $y = a.SC_p + b$ where $SC3_p$ is the personalized threshold value SP3. a, b and cte are predetermined constants. The personalized threshold values can also be set from precedent experiences.

To determine the personalized threshold values, more than one reference signatures are acquired, and compared among themselves, taken two by two, to obtain several groups of $RC1_1$, $RC1_2$, $RC1_3$, $RC1_4$, $RC2_1$, $RC2_2$ and RC3 values. To this effect, the apparatus further comprises means for comparing each of said $RC1_1$, $RC1_2$, $RC1_3$, $RC1_4$ and RC3 values with other corresponding values of its own group, and determining maximum values of each group which constitutes respectively personalized threshold values $SP1_1$, $SP1_2$, SP1₃, SP1₄ and SP3; and means for comparing each of said RC2₁ and RC2₂ values with other corresponding values of its own group, and determining minimum values of each group which constitutes respectively personalized threshold values SP2₁ and SP2₂; means for calculating SC1$_{Ei}$=MAX (cte, p(SC1$_{pi}$)) ∈ [0%,SC1$_{Ri}$[, and SC1$_{Ri}$=MAX (cte,q(SC1$_{pi}$)) ∈]SC1$_{Ei}$, ∞, where p(SC1$_{pi}$) and q(SC1$_{pi}$) are linear functions of the type y=a.SC1$_{pi}$+b, where SC1$_{pi}$ is the personalized threshold value "i" which is respectively SP1₁, SP1₂, SP1₃ or SP1₄, a, b and cte being predetermined constants; means for calculating SC2$_{Ei}$=MAX (cte,p(SC2$_{pi}$)) ∈]SC2$_{Ri}$, SC2$_{Ai}$[, SC2$_{Ri}$=MIN (cte,q(SC2$_{pi}$)) ∈[0%,SC2$_{Ei}$[, and SC2$_{Ai}$=MIN (cte,r(SC2$_{pi}$)) ∈]SC2$_{Ei}$, 100%], where p(SC2$_{pi}$), q(SC2$_{pi}$) and r(SC2$_{pi}$) are linear functions of the type y=a.SC2$_{pi}$+b, where SC2$_{pi}$ is the personalized threshold value "i" which is respectively SP2₁ or SP2₂, a, b and cte being predetermined constants; and means for calculating SC3$_E$=MIN (cte,p(SC3$_p$)) ∈]SC3$_A$,SC3$_R$[, SC3$_R$=MAX(cte, q(SC3$_p$)) ∈]SC3$_E$,∞, and SC3$_A$=MAX(cte,r(SC3$_p$)) ∈[0,SC3$_E$[, where p(SC3$_p$), q(SC3$_p$) and r(SC3$_p$) are linear functions of the type y=a,SC3$_p$+b, where SC3$_p$ is the personalized threshold value SP3, a, b and cte being predetermined constants. All of the above-mentioned means for comparing and means for calculating are performed by the processing unit 4.

The present apparatus and method have been preliminarily tested with two groups of signatures which are the IM and IN groups. The IM group has been created during examination of plagiarism, and is characterized by containing excellent false signatures. This group comprises eight right-handed signers consisting of one European, one Asian and six North Americans; and eight right-handed imitators consisting of eight right-handed North Americans. Each signer has provided three signatures which have been stored in 24 acquisition indexes. Each imitator has provided three signatures for each signature of the signers, which have been stored in 192 acquisition indexes.

The IN group comprises six right-handed signers consisting in one European and five North Americans. Each signer has provided nine signatures that have been stored in 54 acquisition indexes. Several tests have been done for adjusting the discriminating function to minimize errors.

Referring now to FIG. 21, there is shown the discriminating function that has been found preferable.

Referring now to FIGS. 22 and 23, there are illustrated the results obtained for each group of signatures. It can be noted that in the IN group, all of the true signatures have been recognized as such. In the IM group, false signatures have been accepted in 0,5% of the cases, which is relatively low. Those false acceptations can be explained by the fact that the reference signatures were from an Asian signer, which were quite unstable since he was not familiar with occidental way of signing. This instability has provided a group of very permissive personalized threshold values.

Other preliminary tests with different data base show that the performances are dependent on the data base and that accordingly, it is important to adjust the discriminating functions to prevent rejection of good signatures at the exception of those resulting from a bad manipulation of the system.

In the case where no decision can be made (uncertain result), the signer can be invited to sign again for verification.

Figure 24:
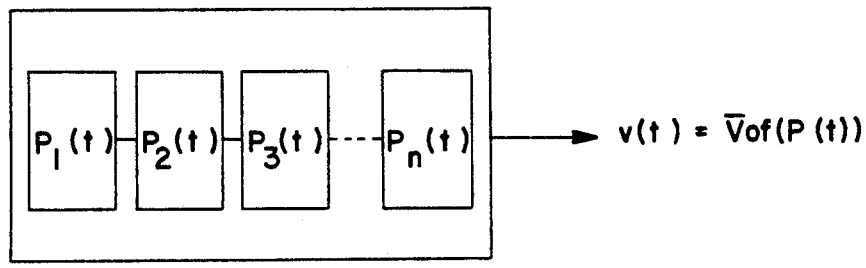
FIG. 24 is a diagram illustrating a general model of rapid-aimed movement.

The strings shown on FIG. 17 can be subdivided into subunits called strokes. A general way to look at the origin of the strokes of a movement is depicted in FIG. 24. The overall sets of neural and muscle networks involved in the generation of a single aimed-movement is assumed to result from the sequential actions of a set of n stochastic The internal description of these processing units is irrelevant to the model only their global statistical behavior is of interest. Some of them might be composed of networks, others of muscle fiber networks, some might incorporate internal feedback, etc. As long as they are in sufficient number, the theory holds. Assuming the ideal output for such a system to be a constant mean velocity $\overline{V}$ that would result in a displacement D when applied for a time interval $(t_1-t_0)$:

$$D = \overline{V}(t_1 - t_0) \tag{1}$$

one can then consider the real output v(t) to reflect the total probability P(t) of having produced such an ideal output in a given time interval. In this context, one can write:

$$v(t) = \overline{V} f(P(t)) \tag{2}$$

where f(P(t)) is the probability density function of P(t).

If one assumes that all these processes are independent, in a sense that the jth subsystem does not load down the jth-1, the probability P(t) of producing a specific velocity at a given time will be the product of the probabilities $p_i(t)$ that each subsystem produces a response during that specific time interval:

$$P(t) = \prod_{i=1}^{n} p_i(t) \tag{3}$$

By taking the natural logarithm of this product, $$\ln P(t) = \prod_{i=1}^{n} \ln p_i(t) \tag{4}$$

and assuming that the density function of each $p_i(t)$ satisfies the weak condition of having a finite variance, then, if n is large, the central-limit theorem applies. The probability density function of ln P(t) is thus normally distributed around its mean $\mu$ with a variance $\sigma^2$ and P(t) is distributed according to a log-normal density function:

$$f(P(t)) = \frac{1}{\sigma \sqrt{2\pi} \, P(t)} \exp - \left\{ [(\ln P(t) - \mu)]^2 \cdot \frac{1}{2\sigma^2} \right\} \tag{5}$$

If one assumes that P(t) increases linearly with time, up to a certain limit $t_1$:

$$P(t) = \frac{t - t_0}{t_1 - t_0}, \text{ for } t_0 \leq t \leq t_1 \tag{6}$$

where $t_0$ = time when the probability of having produced $\overline{V}$ starts increasing from 0 (initiation time of the system)

$t_1$ = time when the probability of having produced $\overline{V}$ is equal to 1(termination time), that is: $t_1 - t_0$ = stroke duration time, then, by combining the equations (5), (6) and (2), one obtains a mathematical description for the velocity profiles:

$$v(t) = \tag{7}$$

$$\frac{\overline{V}(t_1 - t_0)}{\sigma \sqrt{2\pi} \ (t - t_0)} \exp - \left\{ \left[ \ln\left(\frac{t - t_0}{t_1 - t_0}\right) - \mu \right]^2 \cdot \frac{1}{2\sigma^2} \right\}$$

Figure 25:
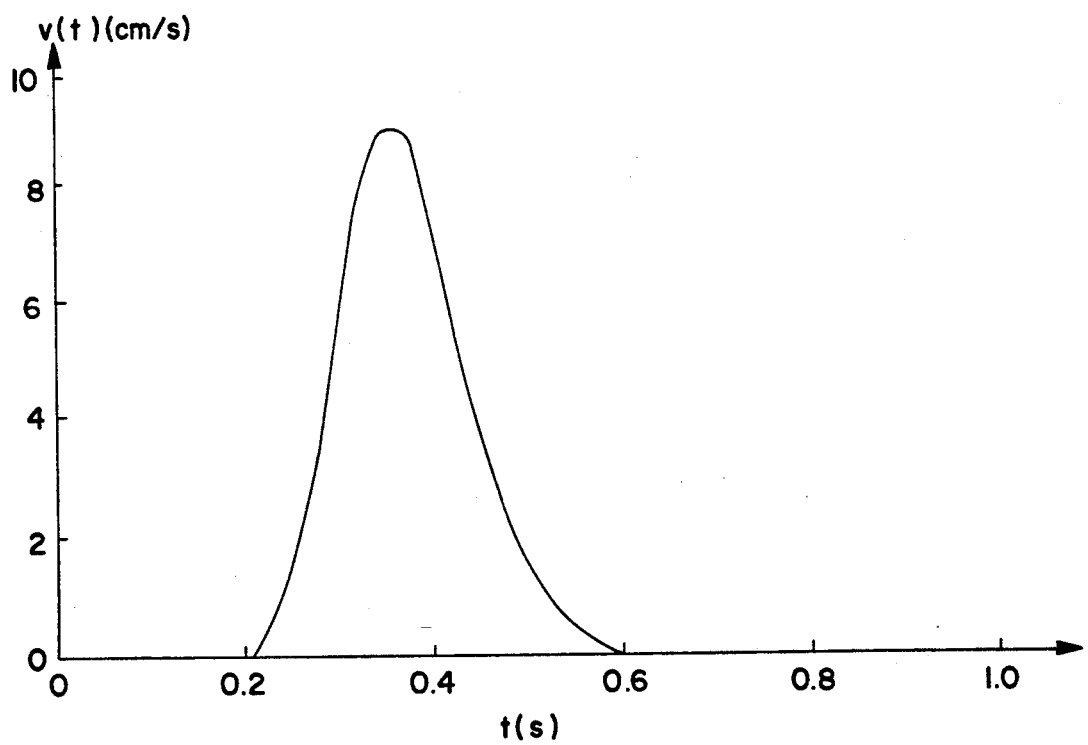
FIG. 25 is a log-normal velocity profile v(t) versus time.

Equation (7) constitutes a mathematical description of an asymmetric bell-shaped velocity profile where the shape of the profile can be theoretically affected by five parameters: $\overline{V}$, $t_0$, $t_1$, $\mu$ and $\sigma$. These parameters can be easily combined to rescale the velocity profiles under different changes of experimental conditions, keeping the general appearance of the profile invariant under these conditions. The following parameter values were used in the bell-shaped velocity profile shown on FIG. 25: $\overline{v}$=2.0 cm/s; $t_0$=0.0s, $t_1$=1.0s, $\mu$=−1.0, $\sigma$=0.25.

A rapid-aimed movement described by a log-normal velocity profile can be seen as the fundamental unit of a learned movement or a stroke. Because of the direct relationship between the distance and some velocity control parameters, there is an equivalence between spatial and timing representation of movement through the log-normal velocity profile. More complex movements or strings can be planned and generated by summing up these bell-shaped velocity profiles This immediately suggests two types of execution processes: an anticipation process, where complex velocity profiles can be described in terms of superimposed log-normal curves and a correction process where velocity can be reproduced by a sequence of independent log-normal curves without superimposition The asymmetric bell-shaped velocity profiles result from the global stochastical behavior of the large number of processes involved in the velocity control, in other words the invariance of these profiles can be interpreted as resulting from the global self-organization of the system. In the same context, it is shown that the previously reported relationship between movement time and spatial or timing accuracy are no conflicting observations of different independent phenomena but results from the intrinsic properties of the log-normal velocity profiles.

Asymmetric bell-shaped velocity profiles can be used as fundamental units for representing a signature. Accordingly, the curvilinear speed $V_\sigma$ and the angular speed $V_\theta$ along the trajectory of a handwritten movement can be represented by asymmetric bell-shaped curvilinear velocity profiles $v_\sigma(t)$ (curvilinear strokes) and asymmetric bell-shaped angular velocity profiles $v_\sigma(t)$ (angular strokes) respectively.

By means of the processing unit 4, the following parameter values: $\overline{V}_\sigma$, $t_{0\sigma}$, $t_{1\sigma}$, $\mu_\sigma$ and $\sigma_\sigma$ are calculated so that $v_\sigma(t)$ matches with the $V_\sigma$ values along the trajectory of the curvilinear stroke where:

$$v_\sigma(t) = \frac{V_\sigma(t_{1\sigma} - t_{0\sigma})}{\sigma_\sigma \sqrt{2\pi} \ (t - t_{0\sigma})}$$

$$\exp = \left\{ \left[ \ln\left(\frac{t - t_{0\sigma}}{t_{1\sigma} - t_{0\sigma}}\right) - \mu_\sigma \right]^2 \cdot \frac{1}{2\sigma_\sigma^2} \right\}$$

Also, by means of the processing unit 4, the following parameter values $\overline{V}_\theta$, $t_{0\theta}$, $t_{1\theta}$, $\mu_\theta$ and $\sigma_\theta$ are calculated so that $v_\theta(t)$ matches with the $V_\theta$ values along the trajectory of the angular stroke where:

$$v_\theta(t) = \frac{V_\theta(t_{1\theta} - t_{0\theta})}{\sigma_\theta \sqrt{2\pi} \ (t - t_{0\theta})}$$

$$\exp - \left\{ \left[ \ln\left(\frac{t - t_{0\theta}}{t_{1\theta} - t_{0\theta}}\right) - \mu_\theta \right]^2 \cdot \frac{1}{2\sigma_\theta^2} \right\}$$

An approximate model by means of $v_\sigma(t)$ and $v_\theta(t)$ offers an advantage for data compression since only a few parameter values are needed for characterizing the trajectory of a handwritten stroke. Accordingly, the microcomputer 12 comprises a memory for registering the parameter values $\overline{V}_\sigma$, $t_{0\sigma}$, $t_{1\sigma}$, $\mu_\sigma$, $\sigma_\sigma$, $\overline{V}_\sigma$, $t_{0\sigma}$, $t_{1\sigma}$, $\mu_\sigma$ and $\sigma_\theta$ whereby said handwritten movement is memorized and data compression is achieved.

As previously noted, the data processing of the present method for digitizing and segmenting a handwriting movement is performed by the processing unit which operates according to a proper programming stored in the disc unit 10. A set of programs have been written to perform this task for use with the computer equipment previously described.

The following brief description of these programs follows before an explicit listing of the actual program statements:

/*Listing file vds.h*/: defines and initializes different variables, parameters and procedures that are used in the other programs;

/*Listing file vds.c*/: registers a user;

/*Listing abonne.c*/: presents the results obtained after digitizing and segmenting of a handwriting movement;

/*Listing file acqui.c*/: performs all the data processing necessary for digitizing and segmenting a handwriting movement;

/*Listing file verifi.c*/: performs all the data processing necessary for comparing a test handwriting signature with a reference signature, where each of the test and reference signatures has been acquired by the /*Listing file acqui.c*/ program.

```c
/* Listing -> file vds.h */ include <stdio.h>
include <stdlib.h>
#include <malloc.h>
#include <math.h>
#include <dos.h>
#include <conio.h>
#include <time.h>
#include <direct.h>
#include <string.h>
include <io.h> typedef int Ch_car[200][2];
define NB_CH_MAX 100
#define NB_PT_MAX 1000

/* verifi.c */
extern void ver_sign(struct BANQUE *);
extern struct RESULTAT *verifie(struct BANQUE *,struct FA *);
extern void var_param_sp(struct SIG *,struct SIG *,struct RESULTAT *);
extern void corr_segm(struct SIG *,struct SIG *,Ch_car,Ch_car);
extern double cor_reg_sig(struct SIG *,struct SIG *,Ch_car,Ch_car,int);
extern double cor_reg_ch(double *,double *,int,int,double);
extern void pd_comp(int [100][3],int [100][3],int [100][2],double);
extern double pd_im_sig(struct SIG *,struct SIG *,Ch_car,Ch_car);
extern double pd_im_ch(float [2][1000],float [2][1000],int,int);

/* acqui.c */
extern struct SIG *acqui_sig(int,struct FA *);
extern int acquisition(int,struct SIG *,struct FA *);
extern void conver(struct SIG *);
extern void seg_dyn(struct SIG *);
extern void param_sp(struct SIG *);
extern void pretraite_i(struct SIG *);
extern void filtre(int,double [NB_PT_MAX][2],struct SIG *);
extern void derive(int,double [NB_PT_MAX][2],struct SIG *);
extern int synchronise(int,int *,int *,int *);
extern void acqui_coor(int,int *,int *,int *,int *);
extern int recole(void);
extern double var_angle(double *,double *);
extern int reg_lin(double [100][2],int,double *,double *);

/* abonne.c */
extern void abonne(struct BANQUE *);
extern struct ETIQ *lect_etiq(struct BANQUE *);
extern void ecri_etiq(struct ETIQ *,struct BANQUE *);
extern void ecri_ref(struct SIG *,struct BANQUE *);
extern struct SIG *lect_ref(struct BANQUE *);

/* vds.c */
extern void main(int,char *[]);
extern void init_coml(int);
extern void transmet(int);
extern void prebanque(struct BANQUE *);

/* lib.c */
extern void efface(void);
extern void cadre(void);
extern void delai(double);
```

```c
extern int acceptation(void);
extern void cls(void);

#define CARRE(x)    (float)((x)*(x))
#define sign(x)  ((x) > 0 ? 1 : ((x) == 0 ? 0 : (-1)))
#define PI 3.141592653
#define ESC       27
#define RETURN    13
#define HAUT      72
#define BAS       80
#define GAUCHE    75
#define DROITE    77
#define PAUSE    {printf("\nPRESSER UNE TOUCHE");bdos(1,0,0);}
#define VRAI     0xffff
#define FAUX     0
#define KFILTRE  3
#define X        0
#define Y        1
#define CURVI    0
#define ANG      1
#define XMIN     0
#define XMAX     1
#define YMIN     2
#define YMAX     3
#define MIN      0
#define MAX      1
#define PENCEPT  '1'
#define SUMMA    '2'
#define TEST     1
#define REF      0
#define DIAG_BAS   0
#define DIAG_HAUT  1
#define DIAG_OBLIQUE 2
#define FICHIER  3
#define OUI      1
#define NON      0
#define NO_OP    9
#define ESC      27
#define NB_MAX_ABONNE 100
#define NB_PT_CH     100
struct BANQUE {
     char fichier[80];
     char reperto[60];
     char source[3];
     char ext[4];
     int nb_abonne;
     int nip_ref;
     };
struct ETIQ {
     char etat;
     char nb_sig;
     char nom[30];
     char date[9];
     char heure[9];
     float SDtot;
     float SDlv;
     float SDar;
     float SDap;
     float SCVs;
```

```
            float SCVt;
            float SDpd;
            };
struct SIG(
        struct(
                float cc[2];
                float vc[2];
                float vi[2];
                int   pointe;
                ) dyn[NB_PT_MAX];
        struct(
                int   nb_point;
                int   nb_chaine;
                int   nb_composante;
                float vit_moy;
                float Dtot;
                float Dar;
                float Dlv;
                float Dap;
                ) info;
        int ch[NB_CH_MAX][2];
        };
struct RESULTAT(
        struct(
                float VDtot;
                float VDlv;
                float VDar;
                float VDap;
                float s[3][4];
                int niveau[4];
                float cout;
                ) a;
        struct(
                float CVs;
                float CVt;
                float s[3][2];
                float cout;
                ) b;
        struct(
                float Dpd;
                float s[3];
                float cout;
                ) c;
        int niveau[5];
        char essai;
        float duree;
        float cout;
        };
struct ERREUR(
        struct(
                char type1;
                char type2;
                char type3;
                )d;
        int usager;
        float t1[8][15];
        float t2[8][15];
        float t3[8][15];
        float g1[3][15];
```

```
           int t1_nb;
           int t2_nb;
           int t3_nb;
           int gl_t1_nb;
           int gl_t2_nb;
           int gl_t3_nb;
           };
struct FA{
       int n_sig;
       int n_imi;
       int n_essai;
       char fich[80];
       char source[60];
       };
#define DEBUG            0x01    /*0000 0001*/
#define ASCII            0x02    /*0000 0010*/
#define GRAPHIQUE        0x04    /*0000 0100*/
#define TEMPS_REEL       0x10    /*0000 0000*/
#define TEMPS_REEL_P     0x20    /*0100 0000*/
#define TEMPS_DIFFERE    0x40    /*1000 0000*/
#define TEMPS_DIFFERE_P  0x80    /*1100 0000*/
#define VIT_CUR          0
#define VIT_ANG          1
#define NB_POINT         2
#define ECHEC           'F'
#define SUCCES          'S'
#define REJETEE         'R'
#define S_NB_POINT       5.0
#define S_VIT_CURVI      5.0
#define S_VIT_ANG        1.0
#define VERTICAL         1
#define HORIZONTAL       2
define DIAGONAL         3 define LF_PB            3
define LF_FD            8 define REJET            0
define ACCEPT           1
#define EQUIL            2

/* Listing -> file vds.c */ include "vds.h"
int faute = FAUX;
int tab_num;
int ve[10];
char mode_vds;

void main(argc,argv)
int   argc;
char *argv[];
{
struct BANQUE Bs;
int          i;
int          choix;
int          sortie;
char         Ligne[80];
char         Commande_DOS[80];
```

```c
FILE        *Ptr;
{
i = 1;
if(argc >= 2 ){
   for(;;){
      if(i >= argc)break;
      if(!strcmp(argv[i],"d") || !strcmp(argv[i],"D")){
         mode_vds |= DEBUG;
         }
      else if(!strcmp(argv[i],"g") || !strcmp(argv[i],"G")){
         mode_vds |= GRAPHIQUE;
         }
      else if(!strcmp(argv[i],"asc") || !strcmp(argv[i],"ASC")){
         mode_vds |= ASCII;
         }
      else if(!strcmp(argv[i],"auto+") || !strcmp(argv[i],"AUTO+")){
         mode_vds |= TEMPS_DIFFERE_P;
         }
      else if(!strcmp(argv[i],"auto") || !strcmp(argv[i],"AUTO")){
         mode_vds |= TEMPS_DIFFERE;
         }
      i++;
      }
   }
)
if((mode_vds & TEMPS_DIFFERE_P) || (mode_vds & TEMPS_DIFFERE)){
{
   if((Ptr = fopen("protoc.tdi","r")) == NULL){
      printf("Erreur a l'ouverture du fichier PROTOC.TDI\n");
      exit(1);
      }
   fgets(Ligne,80,Ptr);
   sscanf(Ligne,"%s",Bs.source);
   fgets(Ligne,80,Ptr);
   sscanf(Ligne,"%s",Bs.ext);
   fgets(Ligne,80,Ptr);
   sscanf(Ligne,"%s",Bs.reperto);
   i = 0;
   for(;;){
      if(i > 9)break;
      fgets(Ligne,80,Ptr);
      sscanf(Ligne,"%d",&ve[i]);
      ++i;
      }
   fclose(Ptr);
   cls();
   sprintf(Bs.fichier,"%sbanque.%s\0",Bs.reperto,Bs.ext);
)
   if((mode_vds & TEMPS_DIFFERE_P)){
{
      sprintf(Commande_DOS,"del %s\0",Bs.fichier);
      system(Commande_DOS);
      sprintf(Commande_DOS,"del *.cor\0");
      system(Commande_DOS);
      prebanque(&Bs);
      Bs.nb_abonne = ve[1];
      abonne(&Bs);
      printf("OK\n");
)
      }
```

```
{
   if(access(Bs.fichier,0) == -1){
      prebanque(&Bs);
      exit(1);
      }
   ver_sign(&Bs);
}
   }
else{
{
   printf("\033[0m\033[2J\033[1m");
   i = 1;
   for(;;){
      if(i > 2)break;
      printf("==============================================");
      printf("==============================================\033[24;1H");
      ++i;
      }
   printf("\033[1;1H \033[1;80H \033[24;80H \033[2;1H");
   i = 2;
   for(;;){
      if(i > 23)break;
      printf("‖\033[%d;80H‖",i);
      ++i;
      }
   printf("\033[3;21H\033[4m");
   printf("LOGICIEL DE VERIFICATION DE SIGNATURE");
   printf("\033[0m\033[4;34H");
   printf("Version 3.0");
   printf("\033[1m\033[6;25HDEPARTEMENT DE GENIE ELECTRIQUE");
   printf("\033[11;10H\033[0m");
   printf("Programmeur:  Louis Brassard   (automne 1984)");
   printf("\033[12;10H(version TI-FS990/4)");
   printf("\033[14;10HRevisé et modifié par:  Jean Beaudoin  (hiver 1987)");
   printf("\033[15;10H(version IBM-PC et compatibles)")                                ;
   printf("\033[17;10HRevisé et amélioré par:  Jean Beaudoin et Alain \
Gladu  (été 1987)");
   printf("\033[18;10H(version COMPAQ 386)");
   printf("\033[7m\033[22;23H Presser une touche pour continuer");
   printf("\033[0m");
   bdos(1,0,0);
   printf("\033[0m");
   printf("\033[6;25H                                   ");
   printf("\033[11;10H");
   printf("                                            ");
   printf("\033[12;10H                             ");
   printf("\033[14;10H                                                      ");
   printf("\033[15;10H                              ")                           ;
   printf("\033[17;10H                                                       \
          ");
   printf("\033[18;10H                       ")            ;
   printf("\033[22;23H                                      ");
}
{
   if((Ptr = fopen("protoc.tre","r")) == NULL){
      printf("Erreur a l'ouverture du fichier PROTOC.TRE\n");
      exit(1);
      }
   fgets(Ligne,80,Ptr);
   sscanf(Ligne,"%s",Bs.source);
```

```
     fgets(Ligne,80,Ptr);
     sscanf(Ligne,"%s",Bs.ext);
     fgets(Ligne,80,Ptr);
     sscanf(Ligne,"%s",Bs.reperto);
     fgets(Ligne,80,Ptr);
     sscanf(Ligne,"%d",&tab_num);
     fclose(Ptr);
     sprintf(Bs.fichier,"%sbanque.%s\0",Bs.reperto,Bs.ext);
     if(access(Bs.fichier,0) == -1){
        prebanque(&Bs);
        }
  }
  {
     sortie = FAUX;
     for(;;){
     {
        choix = 0;
        cadre();
        printf("\033[1;4m\033[2;21H");
        printf("PROGRAMME DE VERIFICATION DE SIGNATURE\033[0;1m");
        printf("\033[4;1H╠══════════════════════════════════");
        printf("══════════════════════════════════╣");
        printf("\033[1;3H %s ",Bs.fichier);
        printf("\033[0m\033[6;10H");
        printf("1)  Abonner un usager, ajouter des références, ");
        printf("activer un code");
        printf("\033[7;10H     sur l'usager");
        printf("\033[9;10H");
        printf("2)  Consulter les références de l'usager");
        printf("\033[12;10H3)  Désactiver un code, désabonner l'usager");
        printf("\033[15;10H4)  Vérifier la signature de l'usager");
        printf("\033[18;10H5)  Sortie du logiciel\033[0;1m");
        printf("\033[20;1H╠══════════════════════════════════");
        printf("══════════════════════════════════╣");
        printf("\033[0;7m\033[22;5H Numéro de la commande:");
        printf("\033[0m ");
        choix = bdos(1,0,0) & 0xff;
     }
        if(choix == '1'){
     {
           efface();
           printf("\033[4;32H mode abonnement ");
           printf("\033[8;10H1. Abonner un usager au système");
           printf("\033[12;10H2. Ajouter des signatures de références");
           printf("\033[16;10H3. Réactiver le numéro d'un abonné");
           printf("\033[0;7m\033[22;5H Numéro de la commande:");
           printf("  \033[2D");
           printf("\033[0m ");
     }
           for(;;){
              choix = bdos(1,0,0) & 0xff;
              if(choix == '1'){
                 abonne(&Bs);
                 break;}
              else{
     {
                 printf("\033[1m\033[22;5H");
                 printf("COMMANDE INVALIDE\033[0m                         ");
                 delai(1.0);
```

```
                    printf("\033[0;7m\033[22;5H Numéro de la commande:");
                    printf("\033[0m ");
            }
                }
            }
        }
        else if(choix == '2'){
        }
        else if(choix == '3'){
        }
        else if(choix == '4'){
            ver_sign(&Bs);
        }
        else if(choix == '5'){
            sortie = VRAI;
        }
        else{
            printf("\033[1m\033[22;5H");
            printf("COMMANDE INVALIDE\033[0m                    ");
            delai(1.0);
        }
        if(sortie)break;
    }
    printf("\033[2J\033[1m\033[12;35HAU REVOIR !\033[0m\033[24;1H");
}
    }
} void init_com1(Mode)
int Mode;
{
union REGS regs;
if(Mode == PENCEPT){
    {
        regs.h.ah = 0x00;
        regs.h.al = 0xe3;
        regs.h.dh = 0x00;
        regs.h.dl = 0x00;
        int86(0x14,®s,®s);
        transmet(0x20);
        transmet(0x20);
    }
}
else if(Mode == SUMMA){
    {
        regs.h.ah = 0x00;
        regs.h.al = 0xeb;
        regs.h.dh = 0x00;
        regs.h.dl = 0x00;
        int86(0x14,®s,®s);
        transmet(0x20);
        transmet(0x40);
        transmet(0x68);
        transmet(0x51);
    }
}
}
```

```c
void prebanque(Bs)
struct BANQUE *Bs;
{
int    i;
int    Erreur=0;
char   Mess[55];
long   Decalage;
struct ETIQ Es;
FILE   *Ptr;
{
Es.etat = 0;
Es.SDtot =  (float)0.001;
Es.SD1v  =  (float)0.001;
Es.SDar  =  (float)0.001;
Es.SDap  =  (float)0.001;
Es.SCVs  =  (float)0.999;
Es.SCVt  =  (float)0.999;
Es.SDpd  =  (float)0.001;
}
if((Ptr = fopen(Bs->fichier,"w+b")) == NULL){
   Erreur = 1;
   }
sprintf(Mess,"Programmeur: Pierre Yergeau,Version 1.00,Mars 1988\0");
if(fwrite(Mess,50,1,Ptr) != 1 && !Erreur){
   Erreur = 2;
   }
if(fseek(Ptr,50L,SEEK_SET) != 0 && !Erreur){
   Erreur = 3;
   }
i = 0;
if(fwrite(&i,sizeof(int),1,Ptr) != 1){
   Erreur = 4;
   }
i = 1;
for(;;){
   if(i > NB_MAX_ABONNE)break;
   Decalage = (long)((i-1)*sizeof(struct ETIQ)+50L+sizeof(int));
   if(fseek(Ptr,Decalage,SEEK_SET) != 0 && !Erreur){
      Erreur = 5;
      }
   if(fwrite(&Es,sizeof(struct ETIQ),1,Ptr) != 1 && !Erreur){
      Erreur = 6;
      }
   ++i;
   }
if(Erreur){
   fprintf(stderr,"\nFonction: prebanque(), Erreur: %2d",Erreur);
   }
fclose(Ptr);
} void transmet(Octet)
int Octet;
{
int Drapeau;
outp(0x3F8,Octet);
for(;;){
   Drapeau = inp(0x3FD);
   if(Drapeau & 0x20)break;
   }
}
```

```c
/* Listing -> abonne.c */ include "vds.h"
extern char mode_vds;
extern int tab_num;
extern int ve[];
char *ent_abonne[] = {
"",
"┌─────────────────────────────────────────┐",
"│ Renseignements personnels de l'abonné   │",
"│                                         │",
"│                                         │",
"│                                         │",
"└─────────────────────────────────────────┘",
"",
"┌─────────────────────────────────────────┐",
"│ Valeurs des paramètres du 1er niveau    │",
"│                                         │",
"│                                         │",
"└─────────────────────────────────────────┘",
"",
"┌─────────────────────────────────────────┐",
"│       Variations des paramètres         │",
"│                                         │",
"│   1%   1%   1%   1%   2%   2%   3       │",
"│                                         │",
"│ #Perm δDtot δDar δDlv δDap CVs CVt Dpd  │",
"│                                         │",
"└─────────────────────────────────────────┘",
"",
"┌─────────────────────────────────────────┐",
"│         Valeurs des seuils              │",
"│   1%   1%   1%   1%   2%   2%   3       │",
"│                                         │",
"│ δDtot δDar δDlv δDap CVs CVt Dpd        │",
"│                                         │",
"└─────────────────────────────────────────┘",
};

void abonne(Bs)
struct BANQUE   *Bs;
{
int     i;
int     j;
int     k;
int     n;
int     Rep;
int     Sortie;
int     Erreur=0;
int     Nb_sig;
float   Seuil[6][7];
char    commande[50];
char    Fich_ent[60];
struct FA       Fa;
struct BANQUE   Ba;
struct ETIQ     *Ea;
struct ETIQ     *Es;
struct SIG      *Sra;
struct RESULTAT *Re;
FILE *Ptr;
{
sprintf(Ba.source,"ab");
sprintf(Ba.ext,"abt");
sprintf(Ba.reperto,"");
```

```
sprintf(Ba.fichier,"banque.abt");
prebanque(&Ba);
sprintf(Fa.source,"%s%s\0",Bs->reperto,Bs->source);
}
if((mode_vds & TEMPS_REEL)){
{
   Bs->nip_ref = 0;
   lect_etiq(Bs);
   if(Bs->nb_abonne == 0){
      Bs->nip_ref = 0;
      }
   else if(Bs->nb_abonne < (NB_MAX_ABONNE-1)){
      Bs->nip_ref = 0;
      Sortie = FAUX;
      for(;;){
         if((Es = lect_etiq(Bs)) == NULL){
            Erreur = 1;
            }
         else{
            if(!(Es->etat & 0x80)){
               Sortie = VRAI;
               }
            else{
               free(Es);
               ++Bs->nip_ref;
               }
            }
         if(Sortie || Erreur)break;
         }
      }
   else{
      efface();
      printf("\033[12;10H\033[1m");
      printf("LA CAPACITE MAXIMALE DE 100 ABONNES A ETE ATTEINTE.  ") ;
      printf("DESOLE ...");
      printf("\033[7m\033[22;5HPresser une touche pour continuer");
      printf("\033[0m");
      bdos(1,0,0);
      return;
      }
}
{
   efface();
   printf("\033[1m\033[6;32HNOUVEL ABONNEMENT\033[0m");
   printf("\033[9;10H1. Fournir les renseignements suivants:");
   printf("\033[11;20H- Nom et prénom:");
   printf("\033[13;20H- Date d'abonnement:");
   printf("\033[17;10H2. L'usager devra signer son nom 3 fois");
   printf("\033[22;5H\033[7m");
   printf(" Nom et prénom:                           \033[25D");
   fflush(stdin);
   for(;;){
      gets(Es->nom);
      if(strlen(Es->nom) > 0)break;
      }
   strupr(Es->nom);
   printf("\033[0m\033[11;38H%-26s",Es->nom);
   _strdate(Es->date);
   _strtime(Es->heure);
```

```
      printf("\033[0m\033[13;42H%-10s",Es->date);
      printf("\033[0m\033[22;5H                                                      \
");
      printf("\033[7m\033[22;5HPresser une touche pour continuer            ");
      printf("\033[0m");
      bdos(1,0,0);
   }
   {
      Fa.n_sig = Fa.n_imi = Bs->nip_ref;
      Nb_sig = 1;
      for(;;){
         Fa.n_essai = Nb_sig;
         if((Sra = acqui_sig(tab_num,&Fa)) == NULL){
            Erreur = 2;
            }
         else{
            free(Sra);
            ++Nb_sig;
            }
         efface();
         printf("\033[23;16H(Presser ESC pour annuler la séance)");
         printf("\033[22;16H");
         printf("La signature est-elle valide ? (O/N): ");
         if((Rep = acceptation()) == 0){
            sprintf(commande,"del %s",Fa.fich);
            system(commande);
            }
         if(Rep == ESC){
            efface();
            printf("\033[12;10H");
            printf("LE PROCESSUS D'ABONNEMENT A ETE INTERROMPU");
            printf("\033[14;10H");
            printf("L'abonnement est donc annulé !");
            printf("\033[16;10H");
            printf("Vous pouvez cependant faire une autre demande si vous");
            printf(" le desirez");
            free(Es);
            return;
            break;}
         if(Nb_sig == 4)break;
         }
      efface();
      printf("\033[12;10H");
      printf("LE PROCESSUS D'ABONNEMENT EST EN COURS D'OPERATION...");
      printf("\033[0m\033[22;5H                                                   ");
      mode_vds = (mode_vds & 0x0f) | TEMPS_REEL_P;
      ve[0] = ve[1] = Bs->nip_ref;
      ++Bs->nb_abonne;
   }
   }
i = ve[0];
for(;;){
   if(i > ve[1])break;
   if(mode_vds & TEMPS_DIFFERE_P){
      printf("\n Abonnement -> usager #%3d",i);
      }
{
   Ba.nip_ref = 0;
   if((Ea = lect_etiq(&Ba)) == NULL){
      Erreur = 3;
```

```
    )
    _strdate(Ea->date);
    _strtime(Ea->heure);
    Ea->etat = 0xFF;
    Ea->nb_sig = 3;
    if(mode_vds & TEMPS_DIFFERE_P){
        sprintf(Ea->nom,"USAGER #%3d",i);
    }
    else{
        sprintf(Ea->nom,"%s",Es->nom);
    }
    j = 1;
    for(;;){
        if(j > 3)break;
        Ba.nip_ref = j;
        Fa.n_sig = Fa.n_imi = i;
        Fa.n_essai = j;
        if((Sra = acqui_sig(FICHIER,&Fa)) == NULL){
            Erreur = 4;
        }
        else{
            ecri_etiq(Ea,&Ba);
            free(Ea);
            ecri_ref(Sra,&Ba);
            free(Sra);
            ++j;
        }
        if(Erreur)break;
    }
        Ba.nb_abonne = 3.
    }
    {
        n = 0;
        j = 1;
        for(;;){
            if(j > 3)break;
            k = 1;
            for(;;){
                if(k > 3)break;
                if(j != k){
                    Ba.nip_ref = j;
                    Fa.n_sig = Fa.n_imi = i;
                    Fa.n_essai = k;
                    Re = verifie(&Ba,&Fa);
                    Seuil[n][0] = Re->a.VDtot;
                    Seuil[n][1] = Re->a.VDlv;
                    Seuil[n][2] = Re->a.VDar;
                    Seuil[n][3] = Re->a.VDap;
                    Seuil[n][4] = Re->b.CVs;
                    Seuil[n][5] = Re->b.CVt;
                    Seuil[n++][6] = Re->c.Dpd;
                    free(Re);
                }
                ++k;
            }
            ++j;
        }
        Ba.nip_ref = i;
        if((Es = lect_etiq(&Ba)) == NULL){
            Erreur = 5;
        }
```

```c
{
    Es->SDtot = Seuil[0][0];
    Es->SDlv = Seuil[0][1];
    Es->SDar = Seuil[0][2];
    Es->SDap = Seuil[0][3];
    Es->SCVs = Seuil[0][4];
    Es->SCVt = Seuil[0][5];
    Es->SDpd = Seuil[0][6];
    j = 1;
    for(;;){
        if(j == n)break;
        if(Es->SDtot < Seuil[j][0]){
            Es->SDtot = Seuil[j][0];
        }
        if(Es->SDlv < Seuil[j][1]){
            Es->SDlv = Seuil[j][1];
        }
        if(Es->SDar < Seuil[j][2]){
            Es->SDar = Seuil[j][2];
        }
        if(Es->SDap <.Seuil[j][3]){
            Es->SDap = Seuil[j][3];
        }
        if(Es->SCVs > Seuil[j][4]){
            Es->SCVs = Seuil[j][4];
        }
        if(Es->SCVt > Seuil[j][5]){
            Es->SCVt = Seuil[j][5];
        }
        if(Es->SDpd < Seuil[j][6]){
            Es->SDpd = Seuil[j][6];
        }
        ++j;
    }
}
}
{
    Es->etat = 0xFF;
    Ba.nip_ref = 1;
    if((Sra = lect_ref(&Ba)) == NULL){
        Erreur = 6;
    }
    else{
        Bs->nip_ref = i;
        ecri_etiq(Es,Bs);
        ecri_ref(Sra,Bs);
    }
}
{
    sprintf(Fich_ent,"%s%s___%02d.ent\0",Bs->reperto,Bs->ext,Bs->nip_ref);
    if((Ptr = fopen(Fich_ent,"w+")) == NULL){
        Erreur = 5;
    }
    fprintf(Ptr,"%s\n",ent_abonne[0]);
    fprintf(Ptr,"%s\n",ent_abonne[1]);
    fprintf(Ptr,"%s\n",ent_abonne[2]);
    fprintf(Ptr,"‖Nom complet.......: %-20s‖\n",Es->nom);
    fprintf(Ptr,"‖Date d'abonnement.: %s            ‖\n",Es->date);
    fprintf(Ptr,"‖Heure d'abonnement: %s            ‖\n",Es->heure);
    fprintf(Ptr,"%s\n",ent_abonne[4]);
```

```c
    fprintf(Ptr,"%s\n",ent_abonne[5]);
    fprintf(Ptr,"%s\n",ent_abonne[6]);
    fprintf(Ptr,"%s\n",ent_abonne[7]);
    fprintf(Ptr,"‖Durée sans levée de crayon: %5.2f s     ‖\n",
            Sra->info.Dtot);
    fprintf(Ptr,"‖Durée des temps d'arrêt...: %4.1f %%    ‖\n",
            Sra->info.Dar*100);
    fprintf(Ptr,"‖Durée des levées de crayon: %4.1f %%    ‖\n",
            Sra->info.Dlv*100);
    fprintf(Ptr,"‖Durée de la vit. ang. pos.: %4.1f %%    ‖\n",
            Sra->info.Dap*100);
    fprintf(Ptr,"%s\n",ent_abonne[9]);
    fprintf(Ptr,"%s\n",ent_abonne[10]);
    fprintf(Ptr,"%s\n",ent_abonne[11]);
    fprintf(Ptr,"%s\n",ent_abonne[12]);
    fprintf(Ptr,"%s\n",ent_abonne[13]);
    fprintf(Ptr,"%s\n",ent_abonne[14]);
    fprintf(Ptr,"%s\n",ent_abonne[15]);
    fprintf(Ptr,"%s\n",ent_abonne[16]);
    j = 0;
    for(;;){
        if(j > 5)break;
        fprintf(Ptr,"‖   %ld    |%5.1f|%4.1f|%4.1f",
 j+1,Seuil[j][0]*100,Seuil[j][1]*100,Seuil[j][2]*100);
        fprintf(Ptr,"|%4.1f|%3.0f|%3.0f|%3.0f‖\n",
                Seuil[j][3]*100,Seuil[j][4]*100,
                Seuil[j][5]*100,Seuil[j][6]);
        ++j;
    }
    fprintf(Ptr,"%s\n",ent_abonne[17]);
    fprintf(Ptr,"%s\n",ent_abonne[18]);
    fprintf(Ptr,"%s\n",ent_abonne[19]);
    fprintf(Ptr,"%s\n",ent_abonne[20]);
    fprintf(Ptr,"%s\n",ent_abonne[21]);
    fprintf(Ptr,"%s\n",ent_abonne[22]);
    fprintf(Ptr,"%s\n",ent_abonne[23]);
    fprintf(Ptr,"%s\n",ent_abonne[24]);
    fprintf(Ptr,"‖%5.1f|%4.1f|%4.1f",
            Es->SDtot*100,Es->SDlv*100,Es->SDar*100);
    fprintf(Ptr,"|%4.1f|%3.0f|%3.0f|%3.0f‖\n",
            Es->SDap*100,Es->SCVs*100,
            Es->SCVt*100,Es->SDpd);
    fprintf(Ptr,"%s\n",ent_abonne[25]);
    free(Sra);
    free(Es);
    fclose(Ptr);
}
    ++i;
}
if((mode_vds & TEMPS_REEL_P)){
    mode_vds = (mode_vds & 0x0f) | TEMPS_REEL;
{
    printf("\033[12;10H");
    printf("LE PROCESSUS D'ABONNEMENT S'EST TERMINE NORMALLEMENT");
    printf("\033[14;10H");
    printf("Le numéro d'identification du nouvel abonné est: ");
    printf("%d",Bs->nip_ref);
    printf("\033[7m\033[22;5H Presser une touche pour continuer ");
    printf("\033[0m");
    bdos(1,0,0);
```

```
        }
     }
     else if(mode_vds & TEMPS_DIFFERE_P){
        mode_vds = (mode_vds & 0x0f) | TEMPS_DIFFERE;
        }
     } struct ETIQ *lect_etiq(Bs)
  struct BANQUE *Bs;
  {
  int    Erreur=0;
  long   Decalage;
  struct ETIQ *Es;
  FILE *Ptr;
  if((Es = (struct ETIQ *)calloc(1,sizeof(struct ETIQ))) == NULL){
     Erreur = 1;
     }
  if((Ptr = fopen(Bs->fichier,"r+b")) == NULL && !Erreur){
     Erreur = 2;
     }
  if(fseek(Ptr,50L,SEEK_SET) != 0 && !Erreur){
     Erreur = 3;
     }
  if(fread(&(Bs->nb_abonne),sizeof(int),1,Ptr) != 1 && !Erreur){
     Erreur = 4;
     }
  Decalage = (long)((Bs->nip_ref)*sizeof(struct ETIQ)+50L+sizeof(int));
  if(fseek(Ptr,Decalage,SEEK_SET) != 0 && !Erreur){
     Erreur = 5;
     }
  if(fread(&(*Es),sizeof(struct ETIQ),1,Ptr) != 1 && !Erreur){
     Erreur = 6;
     }
  if(Erreur){
     fprintf(stderr,"\nFonction: lect_etiq(), Erreur: %2d",Erreur);
     if(Erreur != 1){
        free(Es);
        }
     Es = NULL;
     }
  fclose(Ptr);
  return(Es);
  } void ecri_etiq(Es,Bs)
  struct ETIQ   *Es;
  struct BANQUE *Bs;
  {
  int    Erreur=0;
  long   Decalage;
  FILE *Ptr;
  if((Ptr = fopen(Bs->fichier,"r+b")) == NULL){
     Erreur = 1;
     }
  if(fseek(Ptr,50L,SEEK_SET) != 0 && !Erreur){
     Erreur = 2;
     }
  if(fwrite(&(Bs->nb_abonne),sizeof(int),1,Ptr) != 1 && !Erreur){
     Erreur = 3;
     }
```

```c
Decalage = (long)((Bs->nip_ref)*sizeof(struct ETIQ)+50L+sizeof(int));
if(fseek(Ptr,Decalage,SEEK_SET) != 0 && !Erreur){
   Erreur = 4;
   }
if(fwrite(&(*Es),sizeof(struct ETIQ),1,Ptr) != 1 && !Erreur){
   Erreur = 5;
   }
if(Erreur){
   fprintf(stderr,"\nFonction: ecri_etiq(), Erreur: %2d",Erreur);
   }
fclose(Ptr);
} void ecri_ref(Sr,Bs)
struct BANQUE *Bs;
struct SIG    *Sr;
{
int    Erreur=0;
char   Fich[81];
FILE *Ptr;
sprintf(Fich,"%s%s___%02d.COR\0",Bs->reperto,Bs->ext,Bs->nip_ref);
if((Ptr = fopen(Fich,"w+b")) == NULL){
   Erreur = 1;
   }
if(fwrite(Sr,sizeof(struct SIG),1,Ptr) != 1 && !Erreur){
   Erreur = 2;
   }
if(Erreur){
   fprintf(stderr,"\nFonction: ecri_ref(), Erreur: %2d",Erreur);
   }
fclose(Ptr);
}
    /* Listing -> file verifi.c */ include "vds.h"
    extern int tab_num;
    extern char mode_vds;
    extern int ve[];
    extern char *page1[];
    extern char *page2[];
    extern char *entete_fich[]={
"┌─────────────────────────────────┐",
"╞═════════════════════════════════╡",
"│    .25   .25   .25   .25         .10  .85 .15 .60",
" 1.0  .30       Niveaux  │",
"├─────────────────────────────────┤",
"│  │  │  │  │  │  │  │  │  │  │",
"│#Sign│δDtot│δDar│δDlv│δDap│1234│ C1 │Ccu│Can│ C2",
" │Dpd│ C3 │Cout│123 GR│Dur.│",
"├─────────────────────────────────┤",
"│  │  │  │  │  │  │  │  │  │  │",
"└─────────────────────────────────┘"};

void ver_sign(Bs)
    struct BANQUE *Bs;
    {
    char Fich_res1[40];
    char Commande[81];
    int i;
```

```
int k;
int l;
int Rep;
int Erreur;
long int Num_test;
struct RESULTAT *Re;
struct ETIQ     *Es;
struct FA       Fa;
FILE *Ptr1;
sprintf(Fa.source,"%s%s\0",Bs->reperto,Bs->source);
if(mode_vds & TEMPS_REEL){
   for(;;){
{
     efface();
     printf("\033[4;30H\033[0m mode vérification ");
     printf("\033[7;10H1. Identifiez-vous en entrant votre numéro ");
     printf("d'abonné au clavier");
     printf("\033[10;10H2. Presser ensuite la touche 'RETURN'");
     printf("\033[13;10H");
     printf("3. Signer votre nom sur la feuille déposée sur la tablette ");
     printf("numérique");
     printf("\033[16;10H4. Suivre la procédure qui sera affichée");
     i = 0;
     for(;;){
     printf("\033[22;5H\033[7m NUMERO D'ABONNE:     \033[22;23H");
     fflush(stdin);
     scanf("%d",&Bs->nip_ref);
     printf("\033[0m");
     if((Es = lect_etiq(Bs)) == NULL){
        Erreur = 1;
        }
     if(!(Es->etat & 0xc0)){
        printf("\033[22;5HNUMERO INVALIDE:            ");
        delai(1.0);
        printf("\033[22;5H                                           ") ;
        }
     if(Es->etat & 0xc0)break;
     ++i;
     if(i > 2){
        efface();
        printf("\033[12;10HPLUS DE TROIS ESSAIS DE NUMERO INVALIDES ONT"

printf(" ETE COMPOSES...");
        printf("\033[17;30HMode vérification annulé...");
        printf("\033[7m\033[22;5H Presser une touche pour continuer ");
        printf("\033[0m");
        bdos(1,0,0);
        Rep = NON;
        break;}
    } if(Rep == NON)break;

Fa.n_sig   = Fa.n_imi = Bs->nip_ref;
    Fa.n_essai = Es->nb_sig + 1;
    if((Re = verifie(Bs,&Fa)) == NULL){
       printf("Erreur à la vérification\n");
       }
```

```
{
    efface();
    printf("\033[10;5H");
    if(Re->niveau[3] == SUCCES){
        printf("LA SIGNATURE DE \033[1m%s\033[0m EST RECONNUE COMME ETANT \
AUTHENTIQUE !",Es->nom);
    }
    else if(Re->niveau[3] == 'I'){
        printf("LE RESULTAT DE LA VERIFICATION EST INCERTAIN...");
    }
    else{
        printf("CETTE SIGNATURE N'EST PAS RECONNUE COMME CELLE DE ");
        printf("%s !!",Es->nom);
    }
}
    printf("\033[22;16H");
    printf("La signature est-elle valide ? (O/N): ");
    if((Rep = acceptation()) == NON){
        sprintf(Commande,"del %s",Fa.fich);
        system(Commande);
    }
    else{
        ++Es->nb_sig;
        ecri_etiq(Es,Bs);
        Num_test = Bs->nip_ref * 101000 + Fa.n_essai;

sprintf(Fich_res1,"%sres_%02d.man\0",Bs->reperto,Bs->nip_ref);
        if(access(Fich_res1,0) == 0){
            if((Ptr1 = fopen(Fich_res1,"a+")) == NULL){
                printf("Erreur a l'ouverture du fichier resultat #1");
            }
        }
        else{
            if((Ptr1 = fopen(Fich_res1,"w+")) == NULL){
                printf("Erreur a l'ouverture du fichier resultat #1");
            }
            fprintf(Ptr1,"%s",entete_fich[0]);
            fprintf(Ptr1,"%s\n",entete_fich[1]);
            fprintf(Ptr1,"%s",entete_fich[2]);
            fprintf(Ptr1,"%s\n",entete_fich[3]);
            fprintf(Ptr1,"%s",entete_fich[4]);
            fprintf(Ptr1,"%s\n",entete_fich[5]);
            fprintf(Ptr1,"%s",entete_fich[6]);
            fprintf(Ptr1,"%s\n",entete_fich[7]);
            fprintf(Ptr1,"|| ----- |%5.1f|%4.1f|%4.1f|%4.1f|----|----",
                Es->SDtot*100,Es->SD1v*100,
                Es->SDar*100 ,Es->SDap*100);
            fprintf(Ptr1,"|%3.0f|%3.0f|----|%3.0f|----|----|--- --|----||\n",
                Es->SCVs*100,Es->SCVt*100,Es->SDpd);
            fprintf(Ptr1,"%s",entete_fich[8]);
            fprintf(Ptr1,"%s\n",entete_fich[9]);
        }
      fprintf(Ptr1,"||%07ld|%5.1f|%4.1f|%4.1f|%4.1f|%c%c%c%c|%4.0f",
      Num_test,Re->a.VDtot*100,Re->a.VD1v*100,
      Re->a.VDar*100,Re->a.VDap*100,Re->a.niveau[0],
      Re->a.niveau[1],Re->a.niveau[2],Re->a.niveau[3],100*Re->a.cout);
        fprintf(Ptr1,"|%3.0f|%3.0f|%4.0f|%3.0f|%4.0f|%4.0f",
        Re->b.CVs*100,Re->b.CVt*100,Re->b.cout*100,
        Re->c.Dpd,Re->c.cout*100,Re->cout*100);
        fprintf(Ptr1,"|%c%c%c %c%c|%4.1f||\n",
```

```c
            Re->niveau[0],Re->niveau[1],Re->niveau[2],Re->niveau[3],
            Re->niveau[4],Re->duree);
          fclose(Ptr1);
        }
          free(Es);
          free(Re);
          }
        printf("\033[22;5H");
        printf("Désirez-vous vérifier une autre signature (O/N): ");
        Rep = acceptation();
      }
        if(Rep == NON)break;
        }
     }
  else{
  {
     i = ve[3];
     for(;;){
        if(i > ve[4])break;
        Bs->nip_ref = i;
        if((Es = lect_etiq(Bs)) == NULL){
           Erreur = 4;
           }
  {
        sprintf(Fich_res1,"%sres_%02d.aut\0",Bs->reperto,Bs->nip_ref);
        if((Ptr1 = fopen(Fich_res1,"w+")) == NULL){
           printf("Erreur a l'ouverture du fichier resultat #1");
           }
        fprintf(Ptr1,"%s",entete_fich[0]);
        fprintf(Ptr1,"%s\n",entete_fich[1]);
        fprintf(Ptr1,"%s",entete_fich[2]);
        fprintf(Ptr1,"%s\n",entete_fich[3]);
        fprintf(Ptr1,"%s",entete_fich[4]);
        fprintf(Ptr1,"%s\n",entete_fich[5]);
        fprintf(Ptr1,"%s",entete_fich[6]);
        fprintf(Ptr1,"%s\n",entete_fich[7]);
        fprintf(Ptr1,"| ----- |%5.1f|%4.1f|%4.1f|%4.1f|----|----",
              Es->SDtot*100,Es->SDlv*100,
              Es->SDar*100 ,Es->SDap*100);
        fprintf(Ptr1,"|%3.0f|%3.0f|----|%3.0f|----|----|-- --|----|\n",
              Es->SCVs*100,Es->SCVt*100,Es->SDpd);
        fprintf(Ptr1,"%s",entete_fich[8]);
        fprintf(Ptr1,"%s\n",entete_fich[9]);
  }
  {
        k = 1;
        for(;;){
           if(k > 1)break;
           l = ve[5];
           for(;;){
              if(l > ve[6])break;
              Num_test = Bs->nip_ref * 100000 + k * 1000 + l;
              Fa.n_sig = i;
              Fa.n_imi = k;
              Fa.n_essai = l;
              printf("test: %07ld\n",Num_test);
              if((Re = verifie(Bs,&Fa)) == NULL){
                 printf("%s ->vérification impossible\n",Fa.fich);
                 }
              else{
```

```
                fprintf(Ptr1,"‖%07ld|%5.1f|%4.1f|%4.1f|%4.1f|%c%c%c%c|%4.0f",
    Num_test,Re->a.VDtot*100,Re->a.VDlv*100,
    Re->a.VDar*100,Re->a.VDap*100,Re->a.niveau[0],
    Re->a.niveau[1],Re->a.niveau[2],Re->a.niveau[3],100*Re->a.cout);
                fprintf(Ptr1,"|%3.0f|%3.0f|%4.0f|%3.0f|%4.0f|%4.0f",
    Re->b.CVs*100,Re->b.CVt*100,Re->b.cout*100,
    Re->c.Dpd,Re->c.cout*100,Re->cout*100);
                fprintf(Ptr1,"|%c%c%c %c%c|%4.1f‖\n",
    Re->niveau[0],Re->niveau[1],Re->niveau[2],Re->niveau[3],
    Re->niveau[4],Re->duree);
          }
                free(Re);
             }
          ++l;
          }
       ++k;
       }
    }
    {
       k = ve[7];
       for(;;){
          if(k > ve[8])break;
          l = 1;
          for(;;){
             if(l > ve[9])break;
             Num_test = Bs->nip_ref * 100000 + k * 1000 + l;
             Fa.n_sig = i;
             Fa.n_imi = k;
             Fa.n_essai = l;
             printf("test: %07ld\n",Num_test);
             if((Re = verifie(Bs,&Fa)) == NULL){
                printf("%s ->vérification impossible\n",Fa.fich);
             }
             else{ fprintf(Ptr1,"‖%07ld|%5.1f|%4.1f|%4.1f|%4.1f|%c%c%c%c|%4.0f",
    Num_test,Re->a.VDtot*100,Re->a.VDlv*100,
    Re->a.VDar*100,Re->a.VDap*100,Re->a.niveau[0],
    Re->a.niveau[1],Re->a.niveau[2],Re->a.niveau[3],100*Re->a.cout);
                fprintf(Ptr1,"|%3.0f|%3.0f|%4.0f|%3.0f|%4.0f|%4.0f",
    Re->b.CVs*100,Re->b.CVt*100,Re->b.cout*100,
    Re->c.Dpd,Re->c.cout*100,Re->cout*100);
                fprintf(Ptr1,"|%c%c%c %c%c|%4.1f‖\n",
    Re->niveau[0],Re->niveau[1],Re->niveau[2],Re->niveau[3],
    Re->niveau[4],Re->duree);
          }
                free(Re);
             }
          ++l;
          }
       ++k;
       }
    }
    fprintf(Ptr1,"%s",  entete_fich[10]);
    fprintf(Ptr1,"%s\n",entete_fich[11]);
    fprintf(Ptr1,"ᵩ");
    fclose(Ptr1);
    free(Es);
    ++i;
    }
```

```
      }
    }
  } struct RESULTAT *verifie(Bs,Fa)
    struct BANQUE  *Bs;
    struct FA      *Fa;
    {
    struct RESULTAT *Re;
    struct SIG *Sr;
    struct SIG *St;
    Ch_car      R_ch,R_ch1;
    Ch_car      T_ch,T_ch1;
    struct ETIQ *Es;
    int i;
    int Type;
    int Rejet-FAUX;
    int Accept-FAUX;
    float Parametre[4];
    float Poids[4];
    clock_t T_ini,T_fin;
    float a,b,c;
    float Poids_niveau[3];
    float Cout;
    int Erreur;
    {
    Re = (struct RESULTAT *)calloc(1,sizeof(struct RESULTAT));
    if(Re == NULL){
        printf("Erreur a l'allocation de r\n");
        }
    }
    {
    if((Sr = lect_ref(Bs)) == NULL){
        printf("Erreur à la lecture de la référence\n");
        }
    if((Es = lect_etiq(Bs)) == NULL){
        printf("Erreur à la lecture d'une étiquette\n");
        }
    if(mode_vds & TEMPS_REEL || mode_vds & TEMPS_REEL_P){
        Type = tab_num;
        }
    else{
        Type = FICHIER;
        }
    if((St = acqui_sig(Type,Fa)) == NULL){
        free(Sr);
        free(R_ch);
        free(T_ch);
        return(NULL);
        }
    }
    {
    T_ini = clock();
    Re->a.niveau[0] = '-';
    Re->a.niveau[1] = '-';
    Re->a.niveau[2] = '-';
    Re->a.niveau[3] = '-';
    Re->niveau[0]   = '-';
    Re->niveau[1]   = '-';
    Re->niveau[2]   = '-';
```

```
Re->niveau[3]   = '-';
Re->niveau[4]   = ' ';
Poids_niveau[0] = 0.10;
Poids_niveau[1] = 0.60;
Poids_niveau[2] = 0.30;
Re->a.cout      = 0.0;
Re->b.cout      = 0.0;
Re->c.cout      = 0.0;
Re->cout        = 0.0;
Re->b.CVs       = 0.0;
Re->b.CVt       = 0.0;
Re->c.Dpd       = 0.0;
Re->a.s[EQUIL][0]  = max(0.10,4*Es->SDtot);
Re->a.s[EQUIL][1]  = max(0.05, Es->SDlv);
Re->a.s[EQUIL][2]  = max(0.05, Es->SDar);
Re->a.s[EQUIL][3]  = max(0.05, Es->SDap);
Re->a.s[REJET][0]  = 0.25;
Re->a.s[REJET][1]  = 0.20;
Re->a.s[REJET][2]  = 0.20;
Re->a.s[REJET][3]  = 0.20;
Re->a.s[ACCEPT][0] = 0.0;
Re->a.s[ACCEPT][1] = 0.0;
Re->a.s[ACCEPT][2] = 0.0;
Re->a.s[ACCEPT][3] = 0.0;
Re->b.s[EQUIL][0]  = min(max(0.6,0.9*Es->SCVs),Es->SCVs);
Re->b.s[REJET][0]  = 0.40;
Re->b.s[ACCEPT][0] = 0.90;
Re->b.s[EQUIL][1]  = max(0.3,0.8*Es->SCVt);
Re->b.s[REJET][1]  = 0.25;
Re->b.s[ACCEPT][1] = 0.90;
Re->c.s[EQUIL]  = Es->SDpd;
Re->c.s[REJET]  = min(2*Es->SDpd,50.0);
Re->c.s[ACCEPT] = 5.0;
}
{
var_param_sp(Sr,St,Re);
Parametre[0] = Re->a.VDtot;
Parametre[1] = Re->a.VDlv;
Parametre[2] = Re->a.VDar;
Parametre[3] = Re->a.VDap;
Poids[0] = Poids[1] = Poids[2] = Poids[3] = 0.25;
i = 0;
for(;;){
   if(i == 4)break;
   if(Re->a.s[REJET][i]<=Parametre[i]){
      Re->a.niveau[i] = 'F';
      Re->niveau[0]   = 'F';
      Re->a.cout = 1.00;
      Rejet = VRAI;
      break;}
   else if(Re->a.s[EQUIL][i]<Parametre[i]&&Parametre[i]<Re->a.s[REJET][i]){
      a = Parametre[i]      - Re->a.s[EQUIL][i];
      b = Re->a.s[REJET][i] - Re->a.s[EQUIL][i];
      Cout = Poids[i]*(exp(a/b)-1.)/(exp(1.0)-1.0);
      Cout = sqrt(Cout);
      Cout = sqrt(Cout);
      Re->a.cout += (Poids[i]*Cout);
      Re->a.niveau[i] = 'C';
      Re->niveau[0]   = 'C';
      }
```

```
      else if(Re->a.s[ACCEPT][i]<=Parametre[i]&&Parametre[i]<=Re->a.s[EQUIL][i]){
         Re->a.niveau[i] = 'S';
         Re->niveau[0]   = 'S';
         Cout = 0.0;
         )
      else if(Parametre[i]<Re->a.s[ACCEPT][i]){
         Re->a.niveau[i] = 'A';
         Re->niveau[0]   = 'A';
         Accept = VRAI;
         Re->a.cout = 0.0;
         break;)
      ++i;
   )
   Re->cout += (Poids_niveau[0]*Re->a.cout);
   if(Rejet == VRAI){
      Re->niveau[3] = 'F';
      Re->niveau[4] = '1';
      )
   if(Accept == VRAI){
      Re->niveau[3] = 'A';
      Re->niveau[4] = '1';
      )
   if(Re->cout >= 0.25 && Rejet == FAUX){
      Rejet = VRAI;
      Re->niveau[3] = 'F';
      Re->niveau[4] = '1';
      )

)
if((Rejet == FAUX && Accept == FAUX) || (mode_vds & 0xa0)){
   corr_segm(Sr,St,R_ch,T_ch);
(
   corr_segm1(Sr->ch,St->ch,R_ch1,T_ch1);
   Erreur = 0;
   if(R_ch[0][0] != R_ch1[0][0] || T_ch[0][0] != T_ch1[0][0]){
      Erreur = 100;
      printf("erreur\n");
      )
   i = 1;
   for(;;){
      if(i > R_ch[0][0])break;
      if(R_ch[i][0] != R_ch1[i][0] || R_ch[i][1] != R_ch1[i][1]){
         Erreur = 100;
         printf("erreur\n");
         )
      ++i;
      )
   i = 1;
   for(;;){
      if(i > T_ch[0][0])break;
      if(T_ch[i][0] != T_ch1[i][0] || T_ch[i][1] != T_ch1[i][1]){
         Erreur = 100;
         printf("erreur\n");
         )
      ++i;
      )
   if(Erreur == 0){
      printf("Ok !\n");
      )
   else{
      exit(0);
      )
```

```
}
{
    if(mode_vds & GRAPHIQUE){
        }
    Parametre[0] = Re->b.CVs = cor_reg_sig(Sr,St,R_ch,T_ch,CURVI);
    Parametre[1] = Re->b.CVt = cor_reg_sig(Sr,St,R_ch,T_ch,ANG);
    Poids[0] = 0.85;
    Poids[1] = 0.15;
    i = 0;
    for(;;){
        if(i == 2)break;
        if(Parametre[i]<=Re->b.s[REJET][i]){
            Re->niveau[1] = 'F';
            Re->b.cout = 1.0;
            Rejet = VRAI;
            break;}
        else if(Re->b.s[REJET][i]<Parametre[i]&&Parametre[i]<Re->b.s[EQUIL][i]){
            a = Re->b.s[EQUIL][i] - Parametre[i];
            b = Re->b.s[EQUIL][i] - Re->b.s[REJET][i];
            Cout = Poids[i]*(exp(a/b)-1.)/(exp(1.0)-1.0);
            Cout = sqrt(Cout);
            Re->niveau[1] = 'C';
            Re->b.cout += (Poids[i]*Cout);
            }
        else
if(Re->b.s[EQUIL][i]<=Parametre[i]&&Parametre[i]<=Re->b.s[ACCEPT][i]){
            a = Re->b.s[ACCEPT][i] - Parametre[i] ;
            b = Re->b.s[ACCEPT][i] - Re->b.s[EQUIL][i];
            Cout = Poids[i]*(exp(a/b)-1.)/(exp(1.0)-1.0);
            Cout = Cout*Cout*Cout*Cout -1.0;
            Re->b.cout += (Poids[i]*Cout);
            Re->niveau[1] = 'S';
            }
        else if(Re->b.s[ACCEPT][i]<Parametre[i]){
            Accept = VRAI;
            Re->b.cout = 0.0;
            Re->niveau[1] = 'A';
            break;}
        i++;
        }
    Re->cout += (Poids_niveau[1]*Re->b.cout);
    if(Rejet == VRAI){
        Re->niveau[3] = 'F';
        Re->niveau[4] = '2';
        }
    if(Accept == VRAI){
        Re->niveau[3] = 'A';
        Re->niveau[4] = '2';
        }
    if(Re->cout >= 0.25 && Rejet == FAUX){
        Rejet = VRAI;
        Re->niveau[3] = 'F';
        Re->niveau[4] = '2';
        }
}
    if((Rejet == FAUX && Accept == FAUX) || (mode_vds & 0xa0)){
{
        Parametre[0] = Re->c.Dpd = pd_im_sig(Sr,St,R_ch,T_ch);
        Poids[0] = 1.0;
        if(Re->c.s[REJET]<=Parametre[0]){
```

```
              Re->niveau[2] = 'F';
              Re->c.cout = 1.0;
              Rejet = VRAI;
              )
          else if(Re->c.s[EQUIL]<Parametre[0]&&Parametre[0]<Re->c.s[REJET]){
              a = Parametre[0]    - Re->c.s[EQUIL];
              b = Re->c.s[REJET] - Re->c.s[EQUIL];
              Cout = Poids[0]*(exp(a/b)-1.)/(exp(1.0)-1.0);
              Cout = sqrt(Cout);
              Cout = sqrt(Cout);
              Re->niveau[2] = 'C';
              Re->c.cout += Cout;
              )
          else if(  Re->c.s[ACCEPT]<=Parametre[0]&&Parametre[0]<=Re->c.s[EQUIL]){
              a = Re->c.s[ACCEPT] - Parametre[0];
              b = Re->c.s[ACCEPT] - Re->c.s[EQUIL];
              Cout = Poids[0]*(exp(a/b)-1.)/(exp(1.0)-1.0);
              Cout = Cout*Cout*Cout*Cout - 1.0;
              Re->c.cout += Cout;
              Re->niveau[2] = 'S';
              )
          else if(Parametre[0]<Re->c.s[ACCEPT]){
              Accept = VRAI;
              Re->c.cout = 0.0;
              Re->niveau[2] = 'A';
              )
          Re->cout += (Poids_niveau[2]*Re->c.cout);
          if(Rejet == VRAI){
              Re->niveau[3] = 'F';
              Re->niveau[4] = '2';
              )
          if(Accept == VRAI){
              Re->niveau[3] = 'A';
              Re->niveau[4] = '2';
              )
          if(Re->cout >= 0.25 && Rejet == FAUX){
              Rejet = VRAI;
              Re->niveau[3] = 'F';
              Re->niveau[4] = '2';
              )
    )
       )
    )
{
if(Re->cout >  0.25 && Rejet == FAUX && Accept == FAUX){
    Re->niveau[3] = 'F';
    Re->niveau[4] = 'G';
    )
else if(Re->cout >  0.1 && Rejet == FAUX && Accept == FAUX){
    Re->niveau[3] = 'I';
    Re->niveau[4] = 'G';
    )
else if(Re->cout <= 0.1 && Rejet == FAUX && Accept == FAUX){
    Re->niveau[3] = 'S';
    Re->niveau[4] = 'G';
    )
free(Sr);
free(St);
free(R_ch);
free(R_ch);
```

```
T_fin - clock();
Re->duree - (float)(T_fin - T_ini)/1000.;
return(Re);
}
} struct SIG *lect_ref(Bs)
struct BANQUE *Bs;
{
int      Erreur=0;
char     Fich[81];
struct SIG *Sr;
FILE     *Ptr;
if((Sr = (struct SIG *)calloc(1,sizeof(struct SIG))) == NULL){
    Erreur = 1;
    }
sprintf(Fich,"%s%s___%02d.COR\0",Bs->reperto,Bs->ext,Bs->nip_ref);
if((Ptr = fopen(Fich,"r+b")) == NULL && !Erreur){
    Erreur = 2;
    }
if(fread(Sr,sizeof(struct SIG),1,Ptr) != 1 && !Erreur){
    Erreur = 3;
    }
if(Erreur){
    fprintf(stderr,"\nFonction: lect_ref(), Erreur: %2d",Erreur);
    if(Erreur != 1){
        free(Sr);
        }
    Sr = NULL;
    }
fclose(Ptr);
return(Sr);
} void var_param_sp(Sr,St,Re)
struct SIG      *Sr;
struct SIG      *St;
struct RESULTAT *Re;
{
Re->a.VDtot = fabs(St->info.Dtot - Sr->info.Dtot) / Sr->info.Dtot;
Re->a.VDlv  = fabs(St->info.Dlv  - Sr->info.Dlv );
Re->a.VDar  = fabs(St->info.Dar  - Sr->info.Dar );
Re->a.VDap  = fabs(St->info.Dap  - Sr->info.Dap );
} void corr_segm(sr,st,r_i,r_j)
struct SIG *sr;
struct SIG *st;
Ch_car     r_i;
Ch_car     r_j;
{
int i,j,n1,n2,i1,i2,nb_levee,nt1,nt2;
int ch_i[200][2],ch_j[200][2],levee_i[100][3],levee_j[100][3];
int ch[100][2];
int d_i[200],d_j[200],p_i[200][2],p_j[200][2];
float d,dist,d_ref,a,b;
int indice,pair,levee,ch_cour;
float ratio,depl1,depl2;
int passe,sortie,fin;
sortie = 0;
```

```
{
ch_i[1][0] = sr->ch[1][0];
ch_j[1][0] = st->ch[1][0];
nt1 = nt2 = 1;
levee = 0;
i = 2;
for(;;){
   if(i > sr->ch[0][0])break;
   ch_i[nt1][1] = sr->ch[i-1][1];
   if((sr->ch[i][0]-1) != sr->ch[i-1][1]){
      ++levee;
      ++nt1;
      levee_i[levee][0] = ch_i[nt1][0] = sr->ch[i-1][1]+1;
      levee_i[levee][1] = ch_i[nt1][1] = sr->ch[i][0]-1;
      levee_i[levee][2] = nt1;
      }
   ch_i[++nt1][0] = sr->ch[i][0];
   ++i;
   }
ch_i[nt1][1] = levee_i[levee+1][0] = sr->ch[i-1][1];
ch_i[0][0] = nt1;
levee_i[0][0] = levee;
levee = 0;
j = 2;
for(;;){
   if(j > st->ch[0][0])break;
   ch_j[nt2][1] = st->ch[j-1][1];
   if((st->ch[j][0]-1) != st->ch[j-1][1]){
      ++levee;
      ++nt2;
      levee_j[levee][0] = ch_j[nt2][0] = st->ch[j-1][1]+1;
      levee_j[levee][1] = ch_j[nt2][1] = st->ch[j][0]-1;
      levee_j[levee][2] = nt2;
      }
   ch_j[++nt2][0] = st->ch[j][0];
   ++j;
   }
ch_j[nt2][1] = levee_j[levee+1][0] = st->ch[j-1][1];
ch_j[0][0] = nt2;
levee_j[0][0] = levee;
}
ratio = (ch_j[nt2][1]-ch_j[1][0])/
        (float)(ch_i[nt1][1]-ch_i[1][0]);
if(levee_i[0][0] == 0 || levee_j[0][0] == 0){
   ch[0][0] = 0;
   }
else{
   pd_comp(levee_i,levee_j,ch,ratio);

}
{
fin = max(nt1,nt2);
i = 0;
for(;;){
   if(i > fin)break;
   d_i[i] = 1000;
   d_j[i] = 2000;
   ++i;
   }
}
```

```
      pair = 1;
      i = i1 = i2 = 1;
      nb_levee = ch[0][0];
     for(;;){
     {
         if(i != 1){
            p_i[pair][1] = ch_i[i1][1];
            p_j[pair][1] = ch_j[i2][1];
            ++i1;
            ++i2;
            ++pair;
            }
         p_i[pair][0] = ch_i[i1][0];
         p_j[pair][0] = ch_j[i2][0];
         if(nb_levee > 0){
            n1 = levee_i[ch[nb_levee][0]][2]-1;
            n2 = levee_j[ch[nb_levee][1]][2]-1;
            --nb_levee;
            }
         else{
            n1 = nt1;
            n2 = nt2;
            sortie = VRAI;
            }
         a = ch_j[n2][1]-p_j[pair][0];
         b = ch_i[n1][1]-p_i[pair][0];
         if(b != 0.0){
            ratio = a/b;
            d_ref = max(fabs(a-b),5);
            }
         else{
            ratio = 1000.;
            d_ref = 0.;
            }
         depl1 = p_i[pair][0];
         depl2 = p_j[pair][0];
     }
         for(;;){
            if(i > n1)break;
     {
         i = i1;
         for(;;){
            if(i > n1)break;
            j = i2-1;
            if(j < 1){
               j = 1;
               }
            dist = 99999;
            for(;;){
               if(j > n2)break;
               d = (ch_i[i][1]-depl1)*ratio+depl2 - ch_j[j][1];
               if(fabs(d) < dist){
                  dist = fabs(d);
                  indice = j;
                  }
               ++j;
               }
            if(dist <= d_ref){
               d_i[i] = indice;
               }
```

```
         else{
            d_i[i] = 1000;
            }
         ++i;
         }
      j = i2;
      for(;;){
         if(j > n2)break;
         i = i1-1;
         if(i < 1){
            i =1;
            }
         dist = 99999;
         for(;;){
            if(i > n1)break;
            d = (ch_i[i][1]-dep11)*ratio+dep12 - ch_j[j][1];
            if(fabs(d) < dist){
               dist = fabs(d);
               indice = i;
               }
            ++i;
            }
         if(dist <= d_ref){
            d_j[j] = indice;
            }
         else{
            d_j[j] = 2000;
            }
         ++j;
         }
      }
   {
      i = i1;
      for(;;){
         if(i > n1)break;
         indice = d_i[i];
         if(d_j[indice] == i && indice >= i2){
            i1 = i;
            i2 = indice;
            p_i[pair][1] = ch_i[i1][1];
            p_j[pair][1] = ch_j[i2][1];
            ++pair;
            p_i[pair][0] = ch_i[i1][1]+1;
            p_j[pair][0] = ch_j[i2][1]+1;
            if(i < n1){
               ratio = (ch_j[n2][1]-p_j[pair][0])/
      (float)(ch_i[n1][1]-p_i[pair][0]);
               dep11 = p_i[pair][0];
               dep12 = p_j[pair][0];
               }
            else{
               ratio = 0;
               dep11 = dep12 = 0;
               }
            ++i1 ;
            ++i2 ;
            break;}
         ++i;
         }
   }
```

```
        }
     if(sortie)break;
     }
  p_i[0][0] = p_j[0][0] = pair-1;
  passe = 0;
  {
  ch_cour = 1;
  i1 = 1;
  i = ch[0][0];
  for(;;){
     if(i == 0 || ch_cour > pair || passe)break;
     if(p_i[ch_cour][0] == levee_i[ch[i][0]][0] &&
  p_i[ch_cour][1] > levee_i[ch[i][0]][1]){
        p_i[ch_cour][0] = levee_i[ch[i][0]][1]+1;
        --i;
        }
     else if(p_i[ch_cour][0] == levee_i[ch[i][0]][0] &&
  p_i[ch_cour][1] == levee_i[ch[i][0]][1]){
        --i;
        ++ch_cour;
        }
     else if(p_i[ch_cour][0] < levee_i[ch[i][0]][0] &&
  p_i[ch_cour][1] > levee_i[ch[i][0]][1]){
        r_i[i1][0] = p_i[ch_cour][0];
        r_i[i1++][1] = levee_i[ch[i][0]][0];
        p_i[ch_cour][0] = levee_i[ch[i][0]][1]+1;
        --i;
        }
     else if(p_i[ch_cour][0] < levee_i[ch[i][0]][0] &&
  p_i[ch_cour][1] == levee_i[ch[i][0]][1]){
        r_i[i1][0] = p_i[ch_cour][0];
        r_i[i1++][1] = levee_i[ch[i][0]][0];
        ++ch_cour;
        --i;
        }
     else{
        r_i[i1][0] = p_i[ch_cour][0];
        r_i[i1++][1] = p_i[ch_cour][1];
        ++ch_cour;
        }
     }
  for(;;){
     if(ch_cour == pair)break;
     r_i[i1][0] = p_i[ch_cour][0];
     r_i[i1++][1] = p_i[ch_cour][1];
     ++ch_cour;
     }
  r_i[0][0] = i1-1;
  }
  {
  ch_cour = 1;
  i2 = 1;
  i = ch[0][0];
  for(;;){
     if(i == 0 || ch_cour > pair || passe)break;
     if(p_j[ch_cour][0] == levee_j[ch[i][1]][0] &&
  p_j[ch_cour][1] > levee_j[ch[i][1]][1]){
        p_j[ch_cour][0] = levee_j[ch[i][1]][1]+1;
        --i;
        }
```

```
        else if(p_j[ch_cour][0] == levee_j[ch[i][1]][0] &&
p_j[ch_cour][1] == levee_j[ch[i][1]][1]){
            --i;
            ++ch_cour;
        }
        else if(p_j[ch_cour][0] < levee_j[ch[i][1]][0] &&
p_j[ch_cour][1] > levee_j[ch[i][1]][1]){
            r_j[i2][0] = p_j[ch_cour][0];
            r_j[i2++][1] = levee_j[ch[i][1]][0];
            p_j[ch_cour][0] = levee_j[ch[i][1]][1]+1;
            --i;
        }
        else if(p_j[ch_cour][0] < levee_j[ch[i][1]][0] &&
p_j[ch_cour][1] == levee_j[ch[i][1]][1]){
            r_j[i2][0] = p_j[ch_cour][0];
            r_j[i2++][1] = levee_j[ch[i][1]][0];
            ++ch_cour;
            --i;
        }
        else{
            r_j[i2][0] = p_j[ch_cour][0];
            r_j[i2++][1] = p_j[ch_cour][1];
            ++ch_cour;
        }
    }
    for(;;){
        if(ch_cour == pair)break;
        r_j[i2][0] = p_j[ch_cour][0];
        r_j[i2++][1] = p_j[ch_cour][1];
        ++ch_cour;
    }
    r_j[0][0] = i2-1;
    }
} double cor_reg_sig(Sr,St,R_ch,T_ch,Type)
struct SIG *Sr;
struct SIG *St;
Ch_car      R_ch;
Ch_car      T_ch;
int         Type;
{
int     i;
int     j;
int     k;
int     Indice_initial=0;
int     Ajust_nb_ech =1;
int     Nb_ech_local;
int     Nb_ech_global=0;
int     Nb_ech_ref;
int     Nb_ech_test;
int     Nb_chaine;
double  Decal=0.25;
double  V_ref[1000];
double  V_test[1000];
double  Cor_reg_local;
double  Cor_reg_global=0.;
if(Type == ANG){
    Indice_initial = 1;
    Ajust_nb_ech   = 0;
    }
```

```
Nb_chaine = R_ch[0][0];
i = 1;
for(;;){
   if(i > Nb_chaine)break;
{
   Nb_ech_ref   = (R_ch[i][1]-R_ch[i][0])+Ajust_nb_ech;
   Nb_ech_test  = (T_ch[i][1]-T_ch[i][0])+Ajust_nb_ech;
   Nb_ech_local = max(Nb_ech_ref,Nb_ech_test);
}
{
   j = 0;
   k = Indice_initial + R_ch[i][0];
   for(;;){
      if(j == Nb_ech_ref)break;
      V_ref[j++] = (double)Sr->dyn[k++].vi[Type];
      }
   j = 0;
   k = Indice_initial + T_ch[i][0];
   for(;;){
      if(j == Nb_ech_test)break;
      V_test[j++] = (double)St->dyn[k++].vi[Type];
      }
}
   Cor_reg_local=cor_reg_ch(V_ref,V_test,Nb_ech_ref,Nb_ech_test,Decal);
   Cor_reg_global += (Cor_reg_local * Nb_ech_local);
   Nb_ech_global += Nb_ech_local;
   ++i;
   }
Cor_reg_global /= (double)Nb_ech_global;
return(Cor_reg_global);
} double pd_im_sig(Sr,St,R_ch,T_ch)
struct SIG *Sr;
struct SIG *St;
Ch_car      R_ch;
Ch_car      T_ch;
{
int i;
int j;
int k;
int Nb_chaine;
int Nb_ech_ref;
int Nb_ech_test;
double Dpd=0.0;
double Dc=0.0;
float  V_ref[2][1000];
float  V_test[2][1000];
Nb_chaine = R_ch[0][0];
i = 1;
for(;;){
   if(i > Nb_chaine)break;
{
   Nb_ech_ref   = (R_ch[i][1]-R_ch[i][0])+1;
   Nb_ech_test  = (T_ch[i][1]-T_ch[i][0])+1;
   j = 0;
   k = R_ch[i][0];
   for(;;){
      if(j++ == Nb_ech_ref)break;
      Dc += hypot(Sr->dyn[k].vc[X],Sr->dyn[k].vc[Y]);
```

```
            k++;
            }
   }
   {
      j = 0;
      k = R_ch[i][0];
      for(;;){
         if(j == Nb_ech_ref)break;
         V_ref[0][j]    = Sr->dyn[k].vc[X];
         V_ref[1][j]    = Sr->dyn[k++].vc[Y];
         j++;
         }
      j = 0;
      k = T_ch[i][0];
      for(;;){
         if(j == Nb_ech_test)break;
         V_test[0][j]   = St->dyn[k].vc[X];
         V_test[1][j]   = St->dyn[k++].vc[Y];
         j++;
         }
   }
      Dpd += pd_im_ch(V_ref,V_test,Nb_ech_ref,Nb_ech_test);
      ++i;
      }
   Dpd *= (50./Dc);
   return(Dpd);
   } void pd_comp(l_i,l_j,ch,ratio)
int l_i[100][3],l_j[100][3],ch[100][2];
double ratio;
{
int i,j,k,n,sortie;
int i_o,j_o,ch_precede;
int mat_ch[50][50];
double dist[100][2];
float dist_temps,dist_duree;
float d,d_o;
int dist_lev_i,dist_lev_j,lev_i,lev_j,lev_i_o,lev_j_o;
{
i = 0;
for(;;){
   if(i > l_i[0][0])break;
   dist[i][0] = 1.0e+30;
   ++i;
   }
dist[0][1] = 1.0e+30;
dist_temps = l_i[1][0]*ratio - l_j[1][0];
dist_duree = 2*((l_i[1][1]-l_i[1][0])-(l_j[1][1]-l_j[1][0]));
dist[1][1] = hypot(dist_temps,dist_duree);
mat_ch[1][1] = DIAGONAL;
}
i = 2;
j = 1;
for(;;){
   if(j > l_j[0][0])break;
   for(;;){
      if(i > l_i[0][0])break;
      dist_temps = l_i[i][0]*ratio - l_j[j][0];
      dist_duree = 2*((l_i[i][1]-l_i[i][0])-(l_j[j][1]-l_j[j][0]));
```

```
        dist[i][1] = hypot(dist_temps,dist_duree);
        if((dist[i][0] < dist[i-1][0]) && (dist[i][0] < dist[i-1][1])){
            dist[i][1] = dist[i][1] + dist[i][0];
            mat_ch[i][j] = VERTICAL;
            }
        else if((dist[i-1][1] < dist[i-1][0]) && (dist[i-1][1] < dist[i][0])){
            dist[i][1] = dist[i][1] + dist[i-1][1];
            mat_ch[i][j] = HORIZONTAL;
            }
        else{
            dist[i][1] = dist[i][1] + dist[i-1][0];
            mat_ch[i][j] = DIAGONAL;
            }
        i++;
        }
    ++j;
    if(j > l_j[0][0])break;
{
    k = 0;
    for(;;){
        if(k > l_i[0][0])break;
        dist[k][0] = dist[k][1];
        k++;
        }
    i = 1;
}
}
{
sortie = FAUX;
n = 1;
i = l_i[0][0];
j = l_j[0][0];
ch_precede = DIAGONAL;
if((dist[i-1][1] < dist[i][1]) && (dist[i-1][1] < dist[i][0])){
    --i;
    }
else if((dist[i][0] < dist[i-1][1]) && (dist[i][0] < dist[i][1])){
    --j;
    }
for(;;){
    if(sortie == VRAI)break;
    if(mat_ch[i][j] == DIAGONAL && ch_precede == DIAGONAL){
        ch[n][0] = i;
        ch[n++][1] = j;
    --i;
    --j;
    if(i == 0 && j == 0){
        sortie = VRAI;
        }
        }
    else if(mat_ch[i][j] == VERTICAL){
        d_o = 1.0e+30;
        for(;;){
            dist_temps = l_i[i][0]*ratio - l_j[j][0];
            dist_duree =2*((l_i[i][1]-l_i[i][0])-(l_j[j][1]-l_j[j][0]));
            d = hypot(dist_temps,dist_duree);
            if(d < d_o){
                d_o = d;
                j_o = j;
                }
```

```
            if(mat_ch[i][j] != VERTICAL)break;
            --j;
            }
        ch[n][0] = i;
        ch[n++][1] = j_o;
        if(mat_ch[i][j] == DIAGONAL){
            --i;
            --j;
            ch_precede = DIAGONAL;
            }
        else if(mat_ch[i][j] == HORIZONTAL){
            --i;
            ch_precede = HORIZONTAL;
            }
        if(i == 0 && j == 0){
            sortie = VRAI;
            }
        }
    else if(mat_ch[i][j] == HORIZONTAL){
        d_o = 1.0e+30;
        for(;;){
            dist_temps = l_i[i][0]*ratio - l_j[j][0];
            dist_duree=2*((l_i[i][1]-l_i[i][0])-(l_j[j][1]-l_j[j][0]));
            d = hypot(dist_temps,dist_duree);
            if(d < d_o){
                d_o = d;
                i_o = i;
                }
            if(mat_ch[i][j] != HORIZONTAL)break;
            --i;
            }
        ch[n][0] = i_o;
        ch[n++][1] = j;
        if(mat_ch[i][j] == DIAGONAL){
            --i;
            --j;
            ch_precede = DIAGONAL;
            }
            else if(mat_ch[i][j] == VERTICAL){
            --j;
            ch_precede = HORIZONTAL;
            }
        if(i == 0 && j == 0){
            sortie = VRAI;
            }
        }
    }
ch[0][0] = n -1;
if(mode_vds & DEBUG){
    i = 0;
    for(;;){
        if(i > ch[0][0])break;
        printf("%3d - %3d",ch[i][0],ch[i][1]);
        ++i;
        }
    printf("\n");
    }
return;
{
n = 1;
```

```
i = 1;
lev_i = ch[i][0];
lev_j = ch[i][1];
lev_i_o = l_i[0][0]+1;
lev_j_o = l_j[0][0]+1;
dist_lev_i = l_i[lev_i_o][0] - l_i[lev_i][1];
dist_lev_j = l_j[lev_j_o][0] - l_j[lev_j][1];
for(;;){
   if(dist_lev_i > dist_lev_j){
      if(dist_lev_i * ratio < 1.33 * dist_lev_j){
         ch[n][0] = lev_i_o = lev_i;
         ch[n][1] = lev_j_o = lev_j;
         ++n;
         }
      )
   else{
      if(dist_lev_i * ratio > 0.75 * dist_lev_j){
         ch[n][0] = lev_i_o = lev_i;
         ch[n][1] = lev_j_o = lev_j;
         ++n;
         }
      }
   ++i;
   if(i > ch[0][0])break;
   lev_i = ch[i][0];
   lev_j = ch[i][1];
   ratio = (l_i[lev_i_o][0]-7)/(float)(l_j[lev_j_o][0]-7);
   dist_lev_i = l_i[lev_i_o][0] - l_i[lev_i][1];
   dist_lev_j = l_j[lev_j_o][0] - l_j[lev_j][1];
   }
ch[0][0] = n-1;
}
if(mode_vds & DEBUG){
   i = 0;
   for(;;){
      if(i > ch[0][0])break;
      printf("%3d - %3d",ch[i][0],ch[i][1]);
      ++i;
      }
   printf("\n");
   }
}
} double cor_reg_ch(V_ref,V_test,Nr,Nt,Decal)
double *V_ref;
double *V_test;
int    Nr;
int    Nt;
double Decal;
{
int i;
int f;
int s;
int Decalage;
int Ind1;
int Ind2;
int L_recouv;
double Crr;
double Ctt;
```

```
double Crt;
double Cor_reg;
double Cor_reg_o;
double Racine_crr_ctt;
double Moy_ref;
double Moy_test;
{
Moy_ref = Moy_test = 0.0;
i = 0;
for(;;){
   if(i == Nr)break;
   Moy_ref += V_ref[i++];
   }
Moy_ref /= Nr;
i = 0;
for(;;){
   if(i == Nt)break;
   Moy_test += V_test[i++];
   }
Moy_test /= Nt;
}
{
Crr = 0.0;
i = 0;
for(;;){
   if(i == Nr)break;
   Crr += (CARRE(V_ref[i] - Moy_ref)) ;
   i++;
   }
Ctt = 0.0;
i = 0;
for(;;){
   if(i == Nt)break;
   Ctt += (CARRE(V_test[i] - Moy_test)) ;
   i++;
   }
if( Crr * Ctt == 0.0){
   return((double)1.0);
   }
}
{
if(Nt > Nr){
   s = 0;
   f = (Nt - Nr) / 2;
   Decalage = (int)(Decal * Nt);
   }
else if(Nr > Nt){
   f = 0;
   s = (Nr - Nt) / 2;
   Decalage = (int)(Decal * Nr);
   }
else{
   f = s = 0;
   Decalage = (int)(Decal * Nr);
   }
}
{
Cor_reg = -1.0;
Racine_crr_ctt = sqrt(Crr*Ctt);
```

```
i = -(Decalage);
for(;;){
   if(i > Decalage)break;
   Crt = 0.0;
   L_recouv = 0;
   Ind1 = s+i;
   Ind2 = f;
   for(;;){
      if(Ind1 == Nr || Ind2 == Nt)break;
      if(Ind1 >= 0 && Ind2 >= 0){
         Crt += ((V_ref[Ind1]-Moy_ref)*(V_test[Ind2]-Moy_test));
         ++L_recouv;
         }
      ++Ind1;
      ++Ind2;
      }
   if((Cor_reg_o = Crt / Racine_crr_ctt) > Cor_reg){
      Cor_reg = Cor_reg_o;
      }
   i++;
   }
return(Cor_reg);
}
} double pd_im_ch(V_ref,V_test,Nr,Nt)
float  V_ref[2][1000];
float  V_test[2][1000];
int    Nr;
int    Nt;
{
int i;
int j;
int k;
int Decal_min;
int Decal_max;
int Lim_inf_fen;
int Lim_sup_fen;
float  Dist[1000][2];
double Dvc_x;
double Dvc_y;
{
Decal_min = Nr-Nt - max(max(Nr,Nt)/2.,abs(Nr-Nt));
Decal_max = Nr-Nt + max(max(Nr,Nt)/2.,abs(Nr-Nt));
Lim_inf_fen = max(1+Decal_min,2);
Lim_sup_fen = min(1+Decal_max,Nr);
i = 0;
for(;;){
   if(i > Nr)break;
   Dist[i++][0] = 1.0e+30;
   }
i = 0;
for(;;){
   if(i > Nr)break;
   Dist[i++][1] = 0.0;
   }
Dist[0][1] = 1.0e+30;
Dvc_x = V_ref[0][0] - V_test[0][0];
Dvc_y = V_ref[1][0] - V_test[1][0];
Dist[1][1] = hypot(Dvc_x,Dvc_y);
```

```
    }
    j = 1;
    for(;;){
        if(j > Nt)break;
        i = Lim_inf_fen;
        for(;;){
            if(i > Lim_sup_fen)break;
    {
            Dvc_x = V_ref[0][i-1]-V_test[0][j-1];
            Dvc_y = V_ref[1][i-1]-V_test[1][j-1];
            Dist[i][1] = hypot(Dvc_x,Dvc_y);
            if((Dist[i][0] < Dist[i-1][0]) && (Dist[i][0] < Dist[i-1][1])){
                Dist[i][1] += Dist[i][0];
                }
            else if((Dist[i-1][1] < Dist[i-1][0]) && (Dist[i-1][1] < Dist[i][0])){
                Dist[i][1] += Dist[i-1][1];
                }
            else{
                Dist[i][1] += Dist[i-1][0];
                }
    }
            i++;
            }
    {
        Lim_inf_fen = max(j+Decal_min,1);
        Lim_sup_fen = min(j+Decal_max,Nr);
        k = Lim_inf_fen;
        for(;;){
            if(k > Lim_sup_fen)break;
            Dist[k][0] = Dist[k][1];
            k++;
            }
    }
        j++;
        }
    return(Dist[Nr][1]);
    } define DEB     0
define FIN     1
#define GRAND   9999
#define NIL_r   5000
#define NIL_t   3000
int corr_segml(Ch_r,Ch_t,Ch_rc,Ch_tc)
Ch_car      Ch_r;
Ch_car      Ch_t;
Ch_car      Ch_rc;
Ch_car      Ch_tc;
{
int i,j,Nr,Nt,Ir,It;
int Nlev_r=0;
int Nseg_r=1;
int Nlev_t=0;
int Nseg_t=1;
int Seg_r[200][2];
int Seg_t[200][2];
int Lev_r[100][3];
```

```
int Lev_t[100][3];
int Pair_r[200][2];
int Pair_t[200][2];
int Dr[200];
int Dt[200];
int ch[100][2];
float d,dist,d_ref,a,b;
int indice,Npair,Lev,ch_cour;
float ratio,Tr,Tt;
int fin;
int Nlev;
int sortie=FAUX;
{
Seg_r[Nseg_r][DEB] = Ch_r[Nseg_r][DEB];
i = 2;
for(;;){
   if(i > Ch_r[0][0])break;
   Seg_r[Nseg_r][FIN] = Ch_r[i-1][FIN];
   if((Ch_r[i][DEB]-1) != Ch_r[i-1][FIN]){
      ++Nlev_r;
      ++Nseg_r;
      Lev_r[Nlev_r][DEB] = Seg_r[Nseg_r][DEB] = Ch_r[i-1][FIN]+1;
      Lev_r[Nlev_r][FIN] = Seg_r[Nseg_r][FIN] = Ch_r[i][DEB]-1;
      Lev_r[Nlev_r][2]   = Nseg_r;
      }
   Seg_r[++Nseg_r][DEB] = Ch_r[i++][DEB];
   }
Seg_r[Nseg_r][FIN] = Lev_r[Nlev_r+1][DEB] = Ch_r[i-1][FIN];
Seg_t[Nseg_t][DEB] = Ch_t[Nseg_t][DEB];
j = 2;
for(;;){
   if(j > Ch_t[0][0])break;
   Seg_t[Nseg_t][FIN] = Ch_t[j-1][FIN];
   if((Ch_t[j][DEB]-1) != Ch_t[j-1][FIN]){
      ++Nlev_t;
      ++Nseg_t;
      Lev_t[Nlev_t][DEB] = Seg_t[Nseg_t][DEB] = Ch_t[j-1][FIN]+1;
      Lev_t[Nlev_t][FIN] = Seg_t[Nseg_t][FIN] = Ch_t[j][DEB]-1;
      Lev_t[Nlev_t][2]   = Nseg_t;
      }
   Seg_t[++Nseg_t][DEB] = Ch_t[j++][DEB];
   }
Seg_t[Nseg_t][FIN] = Lev_t[Nlev_t+1][DEB] = Ch_t[j-1][FIN];
}
{
if(Nlev_r == 0 || Nlev_t == 0){
   ch[0][0] = 0;
   }
else{
   ratio = (Seg_t[Nseg_t][FIN]-Seg_t[1][DEB])/
        (float)(Seg_r[Nseg_r][FIN]-Seg_r[1][DEB]);
   pd_compl(Lev_r,Lev_t,Nlev_r,Nlev_t,ch,ratio);
   }
}
{
{
fin = max(Nseg_r,Nseg_t);
i = 0;
for(;;){
   if(i > fin)break;
```

```
      Dr[i] = NIL_r;
      Dt[i] = NIL_t;
      ++i;
      }
}
Npair = 1;
i = Ir = It = 1;
Nlev = ch[0][0];
for(;;){
{
   if(i != 1){
      Pair_r[Npair][1] = Seg_r[Ir][1];
      Pair_t[Npair][1] = Seg_t[It][1];
      ++Ir;
      ++It;
      ++Npair;
      }
   if(Nlev > 0){
      Nr = Lev_r[ch[Nlev][0]][2]-1;
      Nt = Lev_t[ch[Nlev][1]][2]-1;
      --Nlev;
      }
   else{
      Nr = Nseg_r;
      Nt = Nseg_t;
      sortie = VRAI;
      }
   Tr = Pair_r[Npair][DEB] - Seg_r[Ir][DEB];
   Tt = Pair_t[Npair][DEB] - Seg_t[It][DEB];
   a = Seg_t[Nt][FIN] - Seg_t[It][DEB];
   b = Seg_r[Nr][FIN] - Seg_r[Ir][DEB];
   if(b != 0.0){
      ratio = a/b;
      d_ref = max(fabs(a-b),5);
      }
   else{
      ratio = 1000.;
      d_ref = 0.;
      }
}
   for(;;){
      if(i > Nr)break;
{
      i = Ir;
for(;;){
   if(i > Nr)break;
   j = max(It-1,1);
   dist = GRAND;
   for(;;){
      if(j > Nt)break;
      d = fabs((Seg_r[i][FIN]-Tr)*ratio+Tt-Seg_t[j][FIN]);
      if(d < dist){
         dist = d;
         indice = j;
         }
      ++j;
      }
   if(dist <= d_ref){
      Dr[i] = indice;
      }
```

```
        else{
            Dr[i] = NIL_r;
            }
        ++i;
        }
    j = It;
    for(;;){
        if(j > Nt)break;
        i = max(Ir-1,1);
        dist = GRAND;
        for(;;){
            if(i > Nr)break;
            d = fabs((Seg_r[i][FIN]-Tr)*ratio+Tt-Seg_t[j][FIN]);
            if(d < dist){
                dist = d;
                indice = i;
                }
            ++i;
            }
        if(dist <= d_ref){
            Dt[j] = indice;
            }
        else{
            Dt[j] = NIL_t;
            }
        ++j;
        }
    }
    {
    i = Ir;
    for(;;){
        if(i > Nr)break;
        indice = Dr[i];
        if(Dt[indice] == i && indice >= It){
            Ir = i;
            It = indice;
            Pair_r[Npair][FIN] = Seg_r[Ir][FIN];
            Pair_t[Npair][FIN] = Seg_t[It][FIN];
            ++Npair;
            Pair_r[Npair][DEB] = Seg_r[Ir][FIN]+1;
            Pair_t[Npair][DEB] = Seg_t[It][FIN]+1;
            if(i < Nr){
                ratio = (Seg_t[Nt][FIN]-Pair_t[Npair][DEB])/
        (float)(Seg_r[Nr][FIN]-Pair_r[Npair][DEB]);
                Tr = Pair_r[Npair][DEB];
                Tt = Pair_t[Npair][DEB];
                }
            else{
                ratio = 0.0;
                Tr = Tt = 0;
                }
            ++Ir ;
            ++It ;
            break;}
        ++i;
        }
    }
    }
    if(sortie == VRAI)break;
    }
```

```
Pair_r[0][0] = Pair_t[0][0] = Npair-1;
}
{
ch_cour = 1;
Ir = 1;
i = ch[0][0];
for(;;){
   if(i == 0 || ch_cour > Npair)break;
   if(Pair_r[ch_cour][DEB] == Lev_r[ch[i][0]][DEB] &&
Pair_r[ch_cour][FIN] > Lev_r[ch[i][0]][FIN]){
       Pair_r[ch_cour][0] = Lev_r[ch[i][0]][1]+1;
       --i;
   }
   else if(Pair_r[ch_cour][DEB] == Lev_r[ch[i][0]][DEB] &&
Pair_r[ch_cour][FIN] == Lev_r[ch[i][0]][FIN]){
       --i;
       ++ch_cour;
   }
   else if(Pair_r[ch_cour][0] < Lev_r[ch[i][0]][0] &&
Pair_r[ch_cour][1] > Lev_r[ch[i][0]][1]){
       Ch_rc[Ir][0] = Pair_r[ch_cour][0];
       Ch_rc[Ir++][1] = Lev_r[ch[i][0]][0];
       Pair_r[ch_cour][0] = Lev_r[ch[i][0]][1]+1;
       --i;
   }
   else if(Pair_r[ch_cour][0] < Lev_r[ch[i][0]][0] &&
Pair_r[ch_cour][1] == Lev_r[ch[i][0]][1]){
       Ch_rc[Ir][0] = Pair_r[ch_cour][0];
       Ch_rc[Ir++][1] = Lev_r[ch[i][0]][0];
       ++ch_cour;
       --i;
   }
   else{
       Ch_rc[Ir][0] = Pair_r[ch_cour][0];
       Ch_rc[Ir++][1] = Pair_r[ch_cour][1];
       ++ch_cour;
   }
}
for(;;){
   if(ch_cour == Npair)break;
   Ch_rc[Ir][0] = Pair_r[ch_cour][0];
   Ch_rc[Ir++][1] = Pair_r[ch_cour][1];
   ++ch_cour;
}
Ch_rc[0][0] = Ir-1;
}
{
ch_cour = 1;
It = 1;
i = ch[0][0];
for(;;){
   if(i == 0 || ch_cour > Npair)break;
   if(Pair_t[ch_cour][0] == Lev_t[ch[i][1]][0] &&
Pair_t[ch_cour][1] > Lev_t[ch[i][1]][1]){
       Pair_t[ch_cour][0] = Lev_t[ch[i][1]][1]+1;
       --i;
   }
   else if(Pair_t[ch_cour][0] == Lev_t[ch[i][1]][0] &&
Pair_t[ch_cour][1] == Lev_t[ch[i][1]][1]){
       --i;
```

```
            ++ch_cour;
            )
        else if(Pair_t[ch_cour][0] < Lev_t[ch[i][1]][0] &&
    Pair_t[ch_cour][1] > Lev_t[ch[i][1]][1]){
            Ch_tc[It][0] - Pair_t[ch_cour][0];
            Ch_tc[It++][1] - Lev_t[ch[i][1]][0];
            Pair_t[ch_cour][0] - Lev_t[ch[i][1]][1]+1;
            --i;
            )
        else if(Pair_t[ch_cour][0] < Lev_t[ch[i][1]][0] &&
    Pair_t[ch_cour][1] -- Lev_t[ch[i][1]][1]){
            Ch_tc[It][0] - Pair_t[ch_cour][0];
            Ch_tc[It++][1] - Lev_t[ch[i][1]][0];
            ++ch_cour;
            --i;
            )
        else(
            Ch_tc[It][0] - Pair_t[ch_cour][0];
            Ch_tc[It++][1] - Pair_t[ch_cour][1];
            ++ch_cour;
            )
        )
    for(;;){
        if(ch_cour -- Npair)break;
        Ch_tc[It][0] - Pair_t[ch_cour][0];
        Ch_tc[It++][1] - Pair_t[ch_cour][1];
        ++ch_cour;
        )
    Ch_tc[0][0] - It-1;
    )
)

int pd_compl(l_i,l_j,Nlev_r,Nlev_t,ch,ratio)
int Nlev_r,Nlev_t;
int l_i[100][3],l_j[100][3],ch[100][2];
double ratio;
(
int i,j,k;
int n-1;
int sortie=FAUX;
int i_o,j_o;
int mat_ch[50][50]                              ;
int ch_precede=DIAGONAL;
double dist[100][2];
float dist_temps,dist_duree;
float d,d_o;
int dist_lev_i,dist_lev_j,lev_i,lev_j,lev_i_o,lev_j_o;
(
i - 0;
for(;;){
    if(i > Nlev_r)break;
    dist[i][0] - 1.0e+30;
    ++i;
    )
dist[0][1] - 1.0e+30;
dist_temps - l_i[1][0]*ratio - l_j[1][0];
dist_duree - 2*((l_i[1][1]-l_i[1][0])-(l_j[1][1]-l_j[1][0]));
dist[1][1] - hypot(dist_temps,dist_duree);
mat_ch[1][1] - DIAGONAL;
```

```
}
i = 2;
j = 1;
for(;;){
    if(j > Nlev_t)break;
    for(;;){
       if(i > Nlev_r)break;
       dist_temps = l_i[i][0]*ratio - l_j[j][0];
       dist_duree = 2*((l_i[i][1]-l_i[i][0])-(l_j[j][1]-l_j[j][0]));
       dist[i][1] = hypot(dist_temps,dist_duree);
       if((dist[i][0] < dist[i-1][0]) && (dist[i][0] < dist[i-1][1])){
          dist[i][1] = dist[i][1] + dist[i][0];
          mat_ch[i][j] = VERTICAL;
          }
       else if((dist[i-1][1] < dist[i-1][0]) && (dist[i-1][1] < dist[i][0])){
          dist[i][1] = dist[i][1] + dist[i-1][1];
          mat_ch[i][j] = HORIZONTAL;
          }
       else{
          dist[i][1] = dist[i][1] + dist[i-1][0];
          mat_ch[i][j] = DIAGONAL;
          }
       i++;
       }
    ++j;
    if(j > Nlev_t)break;
{
    k = 0;
    for(;;){
       if(k > Nlev_r)break;
       dist[k][0] = dist[k][1];
       k++;
       }
    i = 1;
    }
    }
{
{
i = Nlev_r;
j = Nlev_t;
if((dist[i-1][1] < dist[i][1]) && (dist[i-1][1] < dist[i][0])){
    --i;
    }
else if((dist[i][0] < dist[i-1][1]) && (dist[i][0] < dist[i][1])){
    --j;
    }
}
for(;;){
    if(sortie == VRAI)break;
    if(mat_ch[i][j] == DIAGONAL){
{
       if(ch_precede == DIAGONAL){
          ch[n][0] = i;
          ch[n++][1] = j;
          --i;
          --j;
          if(i == 0 && j == 0){
             sortie = VRAI;
             }
          }
```

```
        }
    else if(mat_ch[i][j] == VERTICAL){
{
        d_o = 1.0e+30;
        for(;;){
            dist_temps = l_i[i][0]*ratio - l_j[j][0];
            dist_duree =2*((l_i[i][1]-l_i[i][0])-(l_j[j][1]-l_j[j][0]));
            d = hypot(dist_temps,dist_duree);
            if(d < d_o){
                d_o = d;
                j_o = j;
            }
            if(mat_ch[i][j] != VERTICAL)break;
            --j;
        }
        ch[n][0] = i;
        ch[n++][1] = j_o;
        if(mat_ch[i][j] == DIAGONAL){
            --i;
            --j;
            ch_precede = DIAGONAL;
        }
        else if(mat_ch[i][j] == HORIZONTAL){
            --i;
            ch_precede = HORIZONTAL;
        }
        if(i == 0 && j == 0){
            sortie = VRAI;
        }
}
    }
    else if(mat_ch[i][j] == HORIZONTAL){
{
        d_o = 1.0e+30;
        for(;;){
            dist_temps = l_i[i][0]*ratio - l_j[j][0];
            dist_duree=2*((l_i[i][1]-l_i[i][0])-(l_j[j][1]-l_j[j][0]));
            d = hypot(dist_temps,dist_duree);
            if(d < d_o){
                d_o = d;
                i_o = i;
            }
            if(mat_ch[i][j] != HORIZONTAL)break;
            --i;
        }
        ch[n][0] = i_o;
        ch[n++][1] = j;
        if(mat_ch[i][j] == DIAGONAL){
            --i;
            --j;
            ch_precede = DIAGONAL;
        }
        else if(mat_ch[i][j] == VERTICAL){
            --j;
            ch_precede = HORIZONTAL;
        }
        if(i == 0 && j == 0){
            sortie = VRAI;
        }
```

```
        )
            )
        )
    ch[0][0] = n-1;
    )
)
/* Listing -> file acqui.c */ include "vds.h"
extern char mode_vsl;

struct SIG *acqui_sig(Mode,Fa)
int         Mode;
struct FA   *Fa;
{
struct SIG *Sig;
if((Sig = (struct SIG *)calloc(1,sizeof(struct SIG))) == NULL){
    printf("Erreur à l'allocation de sig\n");
    return(NULL);
    )
{
if(Mode == PENCEPT || Mode == SUMMA){
    efface();
    printf("\033[6;30H\033[1mPROCEDURE POUR SIGNER\033[0m");
    printf("\033[9;10H1. Prendre le crayon et signer votre signature.");
    printf("\033[11;10H");
    printf("2. Lorsque vous aurez terminé, presser l'interrupteur");
    printf("\033[12;10H   du crayon.");
    printf("\033[14;10H");
    printf("3. Un signal sonore, se fera entendre pour signifier la fin"
);
    printf("\033[15;10H   de l'acquisition de la signature");
    printf("\033[17;10H4. Un message sera alors affiché à l'écran.");
    printf("\033[22;5H\033[7m COMMENCER LA PROCEDURE ! \033[0m");
    )
)
if(acquisition(Mode,Sig,Fa)){
    free((char *)Sig);
    return(NULL);
    )
conver(Sig);
param_sp(Sig);
seg_dyn(Sig);
pretraite_i(Sig);
{
if(Mode == PENCEPT || Mode == SUMMA){
    efface();
    printf("\033[1;4m\033[12;31HS I G N A T U R E");
    printf("\033[14;29HE N R E G I S T R E E\033[0m");
    printf("\a");
    )
)
return(Sig);
)

int acquisition(Mode,Sig,Fa)
int         Mode;
struct SIG *Sig;
```

```c
struct FA *Fa;
{
int     i;
int     Proxi;
int     Commut;
int     Etat_pointe;
int     Dx;
int     Dy;
int     Angx;
int     Angy;
int     Desynchro;
char    Date[10];
char    Heure[10];
char    Ligne[81];
double  Coor[NB_PT_MAX][2];
FILE    *Ptr;
if(Mode == PENCEPT || Mode == SUMMA){
{
    for(;;){
        synchronise(Mode,&Proxi,&Commut,&Etat_pointe);
        if(Proxi && Etat_pointe){
            Sig->dyn[0].pointe = Etat_pointe;
            acqui_coor(Mode,&Dx,&Dy,&Angx,&Angy);
            Coor[0][X] = (double)(Dx)*.00254;
            Coor[0][Y] = (double)(Dy)*.00254;
            break;}
    }
    for(;;){
        synchronise(Mode,&Proxi,&Commut,&Etat_pointe);
        if(Proxi){
            Sig->dyn[1].pointe = Etat_pointe;
            acqui_coor(Mode,&Dx,&Dy,&Angx,&Angy);
            Coor[1][X] = (double)(Dx)*.00254;
            Coor[1][Y] = (double)(Dy)*.00254;
            }
       if(hypot(Coor[1][X]-Coor[0][X],Coor[1][Y]-Coor[0][Y]) > 0.0127)break;
    }
    Desynchro = FAUX;
    i = 2;
    for(;;){
        if(synchronise(Mode,&Proxi,&Commut,&Etat_pointe)){
            Desynchro = VRAI;
            }
        if(Proxi){
{
            acqui_coor(Mode,&Dx,&Dy,&Angx,&Angy);
            if(Desynchro == VRAI){
               ++i;
                Sig->dyn[i].pointe   = Etat_pointe;
                Sig->dyn[i-1].pointe = Etat_pointe;
                Coor[i][X]           = (double)(Dx)*.00254;
                Coor[i][Y]           = (double)(Dy)*.00254;
                Coor[i-1][X]         = (Coor[i][X] + Coor[i-2][X]) / 2.;
                Coor[i-1][Y]         = (Coor[i][Y] + Coor[i-2][Y]) / 2.;
                Desynchro = FAUX;
                filtre(i-1,Coor,Sig);
                filtre(i  ,Coor,Sig);
                derive(i-1,Coor,Sig);
                derive(i  ,Coor,Sig);
                }
```

```
            else{
                Sig->dyn[i].pointe = Etat_pointe;
                Coor[i][X]         = (double)(Dx)*.00254;
                Coor[i][Y]         = (double)(Dy)*.00254;
                filtre(i,Coor,Sig);
                derive(i,Coor,Sig);
                }
            }
            ++i;
            }
        if((Commut && i > 50) || (i >= 990))break;
        }
    for(;;){
        --i;
        if(Sig->dyn[i].pointe || i < 51)break;
        }
    Sig->info.nb_point = i+1;
    }
{
    sprintf(Fa->fich,"%s%03d%03d.a%02d\0",Fa->source,Fa->n_sig,
                                Fa->n_imi ,Fa->n_essai);
    if((Ptr = fopen(Fa->fich,"w+")) == NULL){
        printf("\nErreur a l'ouverture de %s\n",Fa->fich);
        }
    else{
        _strdate(Date);
        _strtime(Heure);
        fprintf(Ptr,"@ %03d %03d A%02d %04d %s %s\n",Fa->n_sig,
Fa->n_imi,Fa->n_essai,Sig->info.nb_point,Date,Heure);
        }
    i = 0;
    for(;;){
        if(i == Sig->info.nb_point)break;
        fprintf(Ptr," %ld %05d %05d\n",Sig->dyn[i].pointe,
                            (int)Coor[i][X],(int)Coor[i][Y]);
        ++i;
        }
    fclose(Ptr);
    }
    }
else if(Mode == FICHIER){
{
    sprintf(Fa->fich,"%s%03d%03d.a%02d\0",Fa->source,Fa->n_sig,
                                Fa->n_imi ,Fa->n_essai);
    if((Ptr = fopen(Fa->fich,"r+")) == NULL){
        return(1);
        }
    else{
        fgets(Ligne,80,Ptr);
        }
    }
{
    for(;;){
        if(fscanf(Ptr,"%d %d %d\n",&Etat_pointe,&Dx,&Dy) == EOF)break;
        if(Etat_pointe){
            Sig->dyn[0].pointe = Etat_pointe;
            Coor[0][X]         = (double)(Dx)*.00254;
            Coor[0][Y]         = (double)(Dy)*.00254;
            break;}
        }
```

```c
    for(;;){
        if(fscanf(Ptr,"%d %d %d\n",&Etat_pointe,&Dx,&Dy) == EOF)break;
        Sig->dyn[1].pointe = Etat_pointe;
        Coor[1][X]         = (double)(Dx)*.00254;
        Coor[1][Y]         = (double)(Dy)*.00254;
        if(hypot(Coor[1][X]-Coor[0][X],Coor[1][Y]-Coor[0][Y]) > 0.0127)break;
        }
    i = 2;
    for(;;){
        if(fscanf(Ptr,"%d %d %d\n",&Etat_pointe,&Dx,&Dy) == EOF || i >
990)break;
        Sig->dyn[i].pointe = Etat_pointe;
        Coor[i][X]         = (double)(Dx)*.00254;
        Coor[i][Y]         = (double)(Dy)*.00254;
        filtre(i,Coor,Sig);
        derive(i,Coor,Sig);
        ++i;
        }
    for(;;){
        --i;
        if(Sig->dyn[i].pointe)break;
        }
    Sig->info.nb_point = i+1;
    fclose(Ptr);
    }
    }
return(0);
} void conver(Sig)
struct SIG *Sig;
{
int    i;
int    n;
double a[2];
double b[2];
n = Sig->info.nb_point - LF_FD;
i = LF_FD;
for(;;){
   if(i == n)break;
   Sig->dyn[i].vi[CURVI]=hypot(Sig->dyn[i].vc[X],Sig->dyn[i].vc[Y]);
   a[0] = Sig->dyn[i-1].vc[X];
   a[1] = Sig->dyn[i-1].vc[Y];
   b[0] = Sig->dyn[i].vc[X];
   b[1] = Sig->dyn[i].vc[Y];
   Sig->dyn[i].vi[ANG] = var_angle(a,b);
   ++i;
   }
} void seg_dyn(Sig)
struct SIG *Sig;
{
int i;
int n;
int Nb_ch=1;
int Nbpt_ch=1;
int Nbpt_lv=0;
Sig->info.nb_composante = 0;
i = Sig->ch[Nb_ch][0] = LF_FD;
```

```
n = Sig->info.nb_point - LF_FD;
for(;;){
   if(i == n)break;
   if(Sig->dyn[i-1].pointe > 0 && Sig->dyn[i].pointe > 0){
{
      if( Sig->dyn[i].vi[CURVI] <= (Sig->info.vit_moy/S_VIT_CURVI)){
         if(fabs(Sig->dyn[i].vi[ANG]) >= S_VIT_ANG){
            if(Nbpt_ch >= S_NB_POINT){
               Sig->ch[Nb_ch][1] = i-1;
               Sig->ch[++Nb_ch][0] = i;
               Nbpt_ch = 0;
               }
            }
         }
      Nbpt_ch++;
}
      }
   else if(Sig->dyn[i-1].pointe > 0 && Sig->dyn[i].pointe == 0){
{
      Nbpt_lv = 1;
}
      }
   else if(Sig->dyn[i-1].pointe == 0 && Sig->dyn[i].pointe == 0){
{
      if(++Nbpt_lv == 3){
         ++(Sig->info.nb_composante);
         if(Nbpt_ch >= S_NB_POINT){
            Sig->ch[Nb_ch++][1] = i-4;
            }
         }
}
      }
   else if(Sig->dyn[i-1].pointe == 0 && Sig->dyn[i].pointe > 0){
{
      if(Nbpt_lv >= 3){
         Sig->ch[Nb_ch][0] = i;
         Nbpt_ch = 1;
         }
      else{
         Nbpt_ch += Nbpt_lv;
         }
}
      }
   ++i;
   }
{
if(Nbpt_ch >= S_NB_POINT){
   Sig->ch[Nb_ch][1] = i-1;
   }
else{
   Nb_ch--;
   }
Sig->info.nb_chaine = Sig->ch[0][0] = Sig->ch[0][1] = Nb_ch;
}
} void param_sp(Sig)
struct SIG *Sig;
{
```

```
int i;
int n;
Sig->info.Dlv = Sig->info.Dar = Sig->info.Dap = 0.0;
Sig->info.vit_moy = 0.0;
i = LF_FD;
n = Sig->info.nb_point - LF_FD;
for(;;){
   if(i == n)break;
   if(Sig->dyn[i].pointe == 0){
      Sig->info.Dlv += 1.;
   }
   if(Sig->dyn[i].vi[CURVI] < 0.8){
      Sig->info.Dar += 1.;
   }
   if(Sig->dyn[i].vi[ANG] >= 0.0){
      Sig->info.Dap += 1.;
   }
   Sig->info.vit_moy += Sig->dyn[i].vi[CURVI];
   ++i;
}
Sig->info.Dtot = (Sig->info.nb_point - Sig->info.Dlv - 2 * LF_PB)/100.;
Sig->info.Dlv /= (double)(Sig->info.nb_point - 2 * LF_PB);
Sig->info.Dar /= (double)(Sig->info.nb_point - 2 * LF_FD);
Sig->info.Dap /= (double)(Sig->info.nb_point - 2 * LF_FD);
Sig->info.vit_moy /= (double)(Sig->info.nb_point - 2 * LF_FD);
} void pretraite_i(Sig)
struct SIG *Sig;
{
int i;
int j;
int n;
int Nb_min=1;
int Nb_pt=1;
int Recherche=MIN;
double Vect[100][2];
double Xmin;
double Xmax;
double Del_x;
double Angle;
double Angle_o=3.0;
double m;
double b;
double Cos_angle;
double Sin_angle;
double X_rot;
double Y_rot;
double X_temp;
double Y_temp;
{
j = 0;
for(;;){
   if(j == 2)break;
   {
      i = LF_PB;
      n = Sig->info.nb_point - LF_PB ;
      for(;;){
         if(Recherche == MIN){
            for(;;){
```

```
            if(Sig->dyn[i+1].cc[Y] > Sig->dyn[i].cc[Y]
&& Nb_pt > 5 && Sig->dyn[i].pointe){
                Recherche = MAX;
                if(Nb_min < 100){
                Vect[Nb_min][X] = Sig->dyn[i].cc[X];
                Vect[Nb_min++][Y] = Sig->dyn[i].cc[Y];
                Nb_pt = 1;
                }
                i++;
                break;)
            i++;
            Nb_pt++;
            if(i == n)break;
            }
        }
        if(i == n)break;
        if(Recherche == MAX){
            for(;;){
                if(Sig->dyn[i+1].cc[Y] < Sig->dyn[i].cc[Y] &&
Sig->dyn[i].pointe){
                    if(Nb_pt > 5){
                    Nb_pt = 1;
                    }
                    else{
                    Nb_min--;
                    }
                    Recherche = MIN;
                    i++;
                    break;)
                i++;
                if(i == n)break;
                }
            }
        if(i == n)break;
        }
    if(Nb_min < 2){
        Vect[0][X] = Sig->dyn[LF_PB].cc[X];
        Vect[0][Y] = Sig->dyn[LF_PB].cc[Y];
        Vect[1][X] = Sig->dyn[n].cc[X];
        Vect[1][Y] = Sig->dyn[n].cc[Y];
        Nb_min = 2;
        }
}
{
    if(reg_lin(Vect,Nb_min,&m,&b)){
        printf("\nErreur suite au calcul de la ligne de base\n");
        }
    X_rot = Sig->dyn[LF_PB].cc[X];
    Y_rot = m * X_rot + b;
    Angle = -atan(m);
    if(fabs(Angle) < fabs(Angle_o)){
        Angle_o = Angle;
        if(fabs(Angle) < 1.0){
            Cos_angle = cos(Angle);
            Sin_angle = sin(Angle);
            i = LF_PB;
            for(;;){
                if(i == n)break;
                X_temp = Sig->dyn[i].cc[X] - X_rot;
```

```
      Y_temp = Sig->dyn[i].cc[Y] - Y_rot;
      Sig->dyn[i].cc[X] = X_temp * Cos_angle - Y_temp * Sin_angle;
      Sig->dyn[i].cc[Y] = X_temp * Sin_angle + Y_temp * Cos_angle;
      ++i;
      }
   }
      }
   }
      ++j;
      }
   }
{
Xmin =  20000.;
Xmax = -20000.;
i = LF_PB;
for(;;){
   if(i == n)break;
   if(Sig->dyn[i].cc[X] < Xmin){
      Xmin = Sig->dyn[i].cc[X];
      }
   if(Sig->dyn[i].cc[X] > Xmax){
      Xmax = Sig->dyn[i].cc[X];
      }
   ++i;
   }
Del_x = Xmax - Xmin;
i = LF_PB;
for(;;){
   if(i == n)break;
   Sig->dyn[i].cc[X] = (Sig->dyn[i].cc[X]-Xmin)*10000./Del_x;
   Sig->dyn[i].cc[Y] =  Sig->dyn[i].cc[Y]*5000./Del_x;
   ++i;
   }
}
} void filtre(i,Coor,Sig)
int         i;
double      Coor[][2];
struct SIG *Sig;
{
int Indice;
int Depha;
int k;
int Nb_coef;
static double Coef[]={
 0.03704,  0.11111,  0.22222,
 0.25926,
 0.03704,  0.11111,  0.22222};
Nb_coef = 2 * LF_PB + 1;
if(i >= Nb_coef-1){
   Indice = i - (Nb_coef - 1) / 2;
   Depha  = Indice - (Nb_coef - 1) / 2;
   Sig->dyn[Indice].cc[X] = Sig->dyn[Indice].cc[Y] = 0.0;
   k = 0;
   for(;;){
      if(k == Nb_coef)break;
      Sig->dyn[Indice].cc[X] += (Coef[k] * Coor[Depha+k][X]);
```

```
            Sig->dyn[Indice].cc[Y] += (Coef[k] * Coor[Depha+k][Y]);
            ++k;
            }
      }
} void derive(i,Coor,Sig)
int        i;
double     Coor[][2];
struct SIG *Sig;
{
int Indice;
int Depha;
int k;
int Nb_coef;
static double Coef[]={
-0.00459, -0.01316,  0.00504,
 0.04514,  0.03514, -0.07201,
-0.19204, -0.17550,  0.,
 0.17550,  0.19204,  0.07201,
-0.03514, -0.04514, -0.00504,
 0.01316,  0.00459};
Nb_coef = 2 * LF_FD + 1;
if(i >= Nb_coef-1){
    Indice = i - (Nb_coef - 1) / 2;
    Depha  = Indice - (Nb_coef - 1) / 2;
    Sig->dyn[Indice].vc[X] = Sig->dyn[Indice].vc[Y] = 0.0;
    k = 0;
    for(;;){
        if(k == Nb_coef)break;
        Sig->dyn[Indice].vc[X] += (Coef[k] * Coor[Depha+k][X]);
        Sig->dyn[Indice].vc[Y] += (Coef[k] * Coor[Depha+k][Y]);
        ++k;
        }
    Sig->dyn[Indice].vc[X] *= 100.;
    Sig->dyn[Indice].vc[Y] *= 100.;
    }
} int synchronise(Mode,Proxi,Commut,Etat_pointe)
int  Mode;
int *Proxi;
int *Commut;
int *Etat_pointe;
{
int i;
int Octet;
if(Mode == PENCEPT){
{
    i = 0;
    for(;;){
        Octet = recoie();
        if((Octet & 0x40))break;
        if(++i == 9)break;
        }
    if(i != 9){
        *Proxi       = Octet & 0x01;
        *Commut      = Octet & 0x02;
        *Etat_pointe = Octet & 0x04;
```

```
            return(0);
            }
        else{
            return(i);
            }
        }
    }
else if(Mode == SUMMA){
{
    i = 0;
    for(;;){
        Octet = recoie();
        if((Octet & 0x80))break;
        if(++i == 6)break;
        }
    if(i !=  6){
        *Proxi        = !(Octet & 0x40);
        *Commut       =  Octet & 0x02;
        *Etat_pointe  =  Octet & 0x01;
        return(0);
        }
    else{
        return(i);
        }
    }
    }
} void acqui_coor(Mode,Dx,Dy,Ax,Ay)
int  Mode;
int  *Dx;
int  *Dy;
int  *Ax;
int  *Ay;
{
int Octet;
if(Mode == PENCEPT){
{
    Octet = recoie();
    *Dx    = (Octet & 0x3f) | ((Octet & 0x80) >> 1);
    Octet = recoie();
    *Dx   |= (((Octet & 0x3f) | ((Octet & 0x80) >> 1)) << 7);
    Octet = recoie();
    *Dy    = (Octet & 0x3f) | ((Octet & 0x80) >> 1);
    Octet = recoie();
    *Dy   |= (((Octet & 0x3f) | ((Octet & 0x80) >> 1)) << 7);
    Octet = recoie();
    *Ax    = (Octet & 0x3f) | ((Octet & 0x80) >> 1);
    Octet = recoie();
    *Ay    = (Octet & 0x3f) | ((Octet & 0x80) >> 1);
    Octet = recoie();
    *Ax    = (((Octet & 0x07) << 7) | *Ax ) & 0x03ff;
    *Ay    = (((Octet & 0x38) << 4) | *Ay ) & 0x03ff;
}
    }
else if(Mode == SUMMA){
{
    Octet = recoie();
    *Dx    = Octet & 0x7f;
    Octet = recoie();
```

```
    *Dx    |= ((Octet & 0x7f) << 7);
    Octet  = recoie();
    *Dy    = Octet & 0x7f;
    Octet  = recoie();
    *Dy    |= ((Octet & 0x7f) << 7);
    }
        }
} int recoie()
{
int    Octet;
int    Drapeau;
for(;;){
    Drapeau = inp(0x3FD);
    if(Drapeau & 0x01)break;
    }
Octet = inp(0x3F8);
return(Octet);
} double var_angle(v1,v2)
double v1[2];
double v2[2];
{
double Theta;
double Prod_norme;
double Prod_scal;
double Prod_vect;
Prod_scal = v1[0]*v2[0] + v1[1]*v2[1];
Prod_norme = hypot(v1[0],v1[1])*hypot(v2[0],v2[1]);
if(Prod_norme == 0.0){
    return(0.0);
    }
if((Prod_scal / Prod_norme) > 1.0){
    return(0.0);
    }
else{
    Theta = acos(Prod_scal / Prod_norme);
    }
Prod_vect = v1[0]*v2[1] - v1[1]*v2[0];
if(Prod_vect < 0.0){
    return(-Theta);
    }
else{
    return(Theta);
    }
} int reg_lin(Vect,n,m,b)
double   Vect[][2];
int      n;
double  *m;
double  *b;
{
int     i;
double  Som_x;
double  Som_y;
double  Som_x_carre;
double  Som_x_y;
```

```
double  Det;
Som_x = Som_y = Som_x_carre = Som_x_y = 0.0;
i = 0;
for(;;){
   if(i == n)break;
   Som_x        += Vect[i][X];
   Som_y        += Vect[i][Y];
   Som_x_carre  += (CARRE(Vect[i][X]));
   Som_x_y      += (Vect[i][X]*Vect[i][Y]);
   i++;
   }
Det = n * Som_x_carre - CARRE(Som_x);
if(Det == 0.0){
   *m = *b = 0.0;
   return(1);
   }
else{
   *m = (n * Som_x_y - Som_x * Som_y) / Det;
   *b = (Som_x_carre * Som_y - Som_x_y * Som_x) / Det;
   return(0);
   }
}

/* Listing -> file lib.c */ include "vds.h"

void efface(void)
{
int i;
printf("\033[0m");
i = 5;
for(;;){
   if(i > 19)break;
   printf("\033[%d;2H                                              ",i);
   printf("                                              ");
   ++i;
   }
printf("\033[21;2H                                                           ");
printf("                                              ");
printf("\033[22;2H                                                           ");
printf("                                              ");
printf("\033[23;2H                                                           ");
printf("                                              ");
printf("\033[1m\033[23;1H║\033[22;80H║\033[0m");
} void cadre(void)
{
int j;
printf("\033[0m\033[2J\033[1m");
j = 1;
for(;;){
   if(j > 2)break;
   printf("═══════════════════════════════════");
   printf("═══════════════════════════════════\033[24;1H");
   ++j;
   }
printf("╚\033[1;1H╔\033[1;80H╗\033[24;80H╝\033[2;1H");
j = 2;
```

```c
for(;;){
   if(j > 23)break;
   printf("|\033[%d;80H|",j);
   ++j;
   }
} void delai(duree)
double duree;
{
time_t start, fini;
time(&start);
for(;;){
   time(&fini);
   if(difftime(fini,start) > duree)break;
   }
} int acceptation(void)
{
int rep;
for(;;){
   rep = getch();
   if(rep == 'o' || rep == 'O'){
      return(1);
      break;}
   else if(rep == 'n' || rep == 'N'){
      return(0);
      break;}
   if(rep == 27){
      return(rep);
      break;}
   }
} void cls(void)
{
printf("\033[0m\033[2J");
}
```

Although the present invention has been explained hereinabove by way of a preferred embodiment thereof, it should be pointed out that any modifications to this preferred embodiment, within the scope of the appended claims is not deemed to alter or change the nature and scope of the present invention.

The embodiments of the invention in which an exclusive property or privilege is claimed are defined as follows:

1. Apparatus for comparing a test handwritten signature with a reference signature where each of said test and reference signatures have been acquired by:

means for generating three electrical digital position signals characterizing a trajectory of a handwritten signature by means of a pencil provided with a point and an analog-to-digital tablet, said three signals being $D_x(t)$, $D_y(t)$ and $D_z(t)$, where $D_x(t)$ and $D_y(t)$ are respectively position signals according to X and Y axes of a cartesian reference with respect to time, and $D_z(t)$ is a discrete signal indicating whether or not said point is contacting said tablet;

means for low-pass filtering said $D_x(t)$ and $D_y(t)$ electrical signals;

means for taking the derivative of said $D_x(t)$ and $D_y(t)$ electrical signals for generating $V_x$ and $V_y$ electrical components which represent respectively speeds of said point according to X and Y axes of a cartesian reference;

means for calculating $V_\sigma$ and $V_\theta$ values from $V_x$ and $V_y$ components where:

$$V_\sigma = \sqrt{\|V_x\|^2 + \|V_y\|^2}, \text{ and}$$

$$V_\theta = \pm \cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

means for calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and where said $V_\sigma$ value is lower than a predetermined curvilinear speed value, said handwritten strings and components having beginnings and ends defining temporal marks along said trajectory by which duration of said handwriting signature is determined;

means for calculating simple dynamic parameters characterizing said test and reference signatures;

means for applying respectively a first predetermined rotating operator and a second predetermined rotating operator to said $D_x(t)$ and $D_y(t)$ signals for correcting inclination of said trajectory and aligning a base line of said trajectory with a horizontal base line; and means for scaling said $D_x(t)$ signal according to said X cartesian axis, and scaling said $D_y(t)$ signal according to said Y cartesian axis, said apparatus comprises:

means for calculating variations of said simple dynamic parameters of said test signature with respect to said simple dynamic parameters of said reference signature, by calculating a first evaluating function C1 where:

$$C1 = \sum_{i=1}^{4} p_i FC1_i (RC1_i) \in [0,1]$$

$FC1_i(RC1_i)$ is a function representative of the variations of a particular dynamic parameter where i indicates the parameter in question, and $p_i$ is a weight given to a particular parameter of said simple dynamic parameters;

means for comparing C1 with a first threshold value, and rejecting said test signature if C1 passes said first threshold value;

means for calculating a classifying function $C_a$ where:

$$C_a = a1 \cdot C1$$

where a1 is a weight given to said first evaluating function C1;

means for comparing said classifying function $C_a$ with a second threshold value, and rejecting said test signature if $C_a$ passes said second threshold value;

first means for comparing durations of said test and reference signatures, and effectuating temporal expansion of the temporal marks of the signature having the shortest duration so that its duration matches the duration of the other signature;

second marks for comparing sequences of said temporal marks of said test and reference signatures and for coupling temporal marks of said test and reference signatures if and only if two corresponding temporal marks have between them a minimal temporal distance which is reciprocally the shortest between the sequences in question, and said minimal distance is shorter than a predetermined distance so that coupled temporal marks form a pair of characteristic segments of said test and reference signatures;

means for processing in an iterative manner remaining temporal marks, that have not been coupled, of said test and reference signatures for forming additional pairs of characteristic segments by means of said first and second means for comparing until not characteristic segment is coupled;

means for calculating local intrinsic correlations of said $V_\sigma$ and $V_\theta$ values of said test and reference signatures for each of said pairs of characteristic segments, by calculating a second evaluating function C2 where:

$$C2 = \sum_{i=1}^{2} p_i FC2_i (RC2_i), \epsilon [-1,1]$$

where $FC2_i(RC2_i)$ is a function representative of the local intrinsic correlation of either said $V_\sigma$ or $V_\theta$ values for said pairs of characteristic segments where i indicates the component in question, and $p_i$ is a weight given to the particular component in question;

means for comparing C2 with a third threshold value, and rejecting said test signature if C2 passes said third threshold value;

means for calculating a classifying function $C_b$ where:

$$C_b = a_1 C1 + a_2 C2$$

where $a_2$ is a weight given to said second evaluating function C2; and means for comparing said classifying function $C_b$ with a fourth threshold value, and rejecting said test signature if $C_b$ passes said fourth threshold value.

2. Apparatus according to claim 1, wherein said simple dynamic parameters consist of:
   a first simple dynamic parameter $P_1$ consisting of a period of time of said trajectory during which said point of said pencil is contacting said tablet;
   a second simple dynamic parameter $P_2$ consisting of a percentage representative of a period of time of said trajectory during which said point is lifted;
   a third simple dynamic parameter $P_3$ consisting of a percentage representative of a period of time of said trajectory during which said point is stopped; and
   a fourth simple dynamic parameter $P_4$ consisting of a percentage representative of a period of time of said trajectory during which said $V_\theta$ value is positive.

3. Apparatus according to claim 2, comprising means for comparing said simple dynamic parameters of said test signature with the corresponding simple dynamic parameters of the reference signature, and rejecting said test signature if said simple dynamic parameters are the same.

4. Apparatus according to claim 1, further comprising:
   means for calculating variations of $D_x$ and $D_y$ components of said test and reference signatures for each of said pairs of characteristic segment, by calculating a third evaluating function C3 where:
   $$C3 = FC3(RC3), \epsilon [-1,1]$$

where FC3(RC3) is a function representative of variations of $D_x$ and Dy components for said pairs of characteristic segments:
   means for comparing C3 with a fifth threshold value, and rejecting said test signature if C3 passes said fifth threshold value;
   means for calculating a classifying function $C_c$ where:

$$C_c a_1 C1 + a_2 C2 + a_3 C3$$

where $a_3$ is a weight given to said third evaluating function C3; and
   means for comparing said classifying function $C_c$ with a sixth threshold value REJ, and either rejecting said test signature if $C_c$ is higher than said sixth threshold value REJ, or emitting a signal indicating that no conclusive result has been achieved if $C_c$ is within a range of values limited by REJ and a threshold value UNC, or accepting said test signature if $C_c$ is lower than UNC.

5. Apparatus according to claim 4, comprising means for calculating $RC1_1$, $RC1_2$, $RC1_3$ and $RC1_4$ where:
   $RC1_1 = (P_1$ of said test signature $P_1$ of said reference signature$)/P_1$ of said reference signature;
   $RC1_2 = P_2$ of said test signature $- P_2$ of said reference signature;
   $RC1_3 = P_3$ of said test signature $- P_3$ of said reference signature; and
   $RC1_4 = P_4$ of said test signature $- P_4$ of said reference signature.

6. Apparatus according to claim 5, comprising:
   means for calculating $FC1_i(RC1_i)$ for each of said four dynamic parameters where $RC1_i$ is the variation of a particular dynamic parameter, where:
   $FC1_i(RC1_i) = 0$ if $RC1_i < SC1_{Ei}$ where $SC1_{Ei}$ is a seventh predetermined threshold value for a particular dynamic parameter,
   $$FC1_i(RC1_i) = ((e^{h(RC1_i)} - 1)/(e-1))^{Ni}$$

if $SC1_{Ei} < RC1_i < SC1_{Ri}$ where $SC1_{Ri}$ is an eighth predetermined threshold value for a particular dynamic paramater, or
   $FC1_i(RC1_i) = 1$ if $SC1_{Ri} \leq RC1_i$, where $h(RC1_i) = (RC1_i - SC1_{Ei})/(SC1_{Ri} - SC1_{Ei})$, and where Ni is a growth factor for a particular dynamic parameter; and
   means for generating a signal indicative of a rejection of said test signature if $FC1_i(RC1_i) = 1$.

7. Apparatus according to claim 6, comprising means for calculating $RC2_1$ and $RC2_2$ where:

$$RC2_1 = \frac{1}{T_r} \cdot \sum_{j=1}^{N} CV_{\sigma j} \cdot l_j, \epsilon [-1, 1]$$

$$RC2_2 = \frac{1}{T_r} \cdot \sum_{j=1}^{N} CV_{\theta j} \cdot l_j, \epsilon [-1, 1]$$

where N is the number of pairs of characteristic segments, $l_r$ is the number of samples used for acquiring said reference signature, j identifies a particular pair of said pairs of characteristic segments, $l_j$ is the number of samples used for acquiring a particular segment of said reference signature, $CV_{\sigma j}$ is a partial intrinsic local correlation of said $V_\sigma$ value for a particular pair of said pairs of characteristic segments, and $CV_{\theta j}$ is a partial intrinsic local correlation of said $V_\theta$ component for a particular pair of said pairs of characteristic segments.

8. Apparatus according to claim 7, comprising:
means for calculating $FC2_i(RC2i)$ for each of said $V_\theta$ and $V_\theta$ values of said pairs of characteristic segments where RC2i is an intrinsic local correlation of either said $V_\sigma$ or $V_\theta$ value for said pairs of characteristic segments, where:
$FC2_i(RC2i) = 1$ if $RC2_i < SC2_{Ri}$ where $SC2_{Ri}$ is a ninth predetermined threshold value, $$FC2_i(RC2_i) = ((e^{h1(RC2_i)} - 1)/(e-1))^{N1i}$$

if $SC2_{Ri} < RC2_i < SC2_{Ei}$ where $SC2_{Ei}$ is a tenth predetermined threshold value, $$FC2_i(RC2_i) = (((e^{h2(RC2_i)} - 1)/(e-1))^{N2i} - 1)$$

if $SC2_{Ei} \leq RC2i$, or
$FC2i(RC2i) = 0$ if $SC2_{Ai} RC2_i$ where $SC2_{Ai}$ is an eleventh threshold value; where $h1(RC2_i) = (SC2_{Ei} - RC2_i)/(SC2_{Ei} - SC2_{Ri})$, $h2(RC2_i) = (SC2_{Ai} - RC2_i)/(SC2_{Ai} - SC2_{Ei})$, and N1i and N2i are predetermined growth factors;
means for generating a signal indicative of a rejection of said test signature if $FC2_i(RC2_i) = 1$; and
means for generating a signal indicative of an acceptation of said test signature if $FC2_i(RC2_i) = 0$.

9. Apparatus according to claim 8, comprising means for calculating RC3 where:

$$RC3 = \frac{1}{l_r} \cdot \sum_{j=1}^{N} RC3_{ii} \cdot l_{ii} \in [0, \infty]$$

where $RC3_{ii}$ is a minimal residual distance of said $D_x$ and $D_y$ components between the characteristic segments of a particular pair of said pairs of characteristic segments $$RC3_{ii} = \text{MIN} \begin{bmatrix} q(i,j-1) & + & d(i,j) \\ q(i-1,j-1) & + & d(i,j) \\ q(i-1,j) & + & d(i,j) \end{bmatrix}$$

where $$d(i,j) = \sqrt{(\Delta D_{xT} - \Delta D_{xR})^2 + (\Delta D_{yT} - \Delta D_{yR})^2} \ ;$$

$q(1,1) = d(1,1)$;
$D_{xT}$ and $D_{xR}$ are respectively said $D_x$ component of said test and reference signatures of a particular pair of characteristic segments;
$D_{yT}$ and $D_{yR}$ are respectively said Dy components of said test and reference signatures of a particular pair of characteristic segments; and
$\Delta$ is a linear operator of difference.

10. Apparatus according to claim 9, comprising: means for calculating FC3(RC3) for each of said $D_x$ and $D_y$ components of said pairs of characteristic segments where RC3 is representative of a minimal residual distance of said $D_x$ and $D_y$ components between said characteristic segments of each of said pairs of characteristic segments, where:
$FC3(RC3) = 1$ if $RC3 > SC3R$ where SC3R is a twelfth threshold value,
$$FC3(RC3) = ((e^{h1(RC3)} - 1)/(e-1))^{N1}$$

if $SC3_E < RC3 < SC3_R$ where $SC3_E$ is a thirteenth threshold value,
$$FC3(RC3) = (((e^{h2(RC3)} - 1)/(e-1))^{N2} - 1)$$

if $SC3_A < RC3 < SC3_E$ where $SC3_A$ is a fourteenth threshold value, or
$FC3(RC3) = 0$ if $RC3 < SC3_A$; where $h1(RC3) = (RC3 - SC3_E)/(SC3_R - SC3_E)$, $h2(RC3) = (SC3_A - RC3)/(SC3_A - SC3_E)$, and N1 and N2 are predetermined growth factors;
means for generating a signal indicative of a rejection of said test signature if $FC3(RC3) = 1$; and
means for generating a signal indicative of an acceptation of said test signature if $FC3(RC3) = 0$.

11. Apparatus according to claim 10, wherein more than one reference signatures are acquired, and compared among themselves, taken two by two, to obtain several groups of $RC1_1$, $RC1_2$, $RC1_3$, $RC1_4$, $RC2_1$, $RC2_2$ and RC3 values, said apparatus further comprising:
means for comparing each of said $RC1_1$, $RC1_2$, $RC1_3$, $RC1_4$ and RC3 values with other corresponding values of its own group, and determining maximum values of each group which constitutes respectively personalized threshold values $SP1_1$, $SP1_2$, $SP1_3$, $SP1_4$ and SP3; and
means for comparing each of said $RC2_1$ and $RC2_2$ values with other corresponding values of its own group, and determining minimum values of each group which constitutes respectively personalized threshold values $SP2_1$ and $SP2_2$;
means for calculating $SC1_{Ei} = \text{MAX}$ (cte,$p(SC1_{pi})$) $\epsilon[0\%, SC1_{Ri}[$, and $SC1_{Ri}$'MAX (cte,$q(SC1_{pi})$) $\epsilon ]SC1_{Ei}, \infty]$, where $p(SC1_{pi})$ and $q(SC1_{pi})$ are linear functions of the type $y = a \cdot SC1_{pi} + b$, where $SC1_{pi}$ is the personalized threshold value "i" which is respectively $SP1_1$, $SP1_2$, $SP1_3$ or $SP1_4$, a, b and cte being predetermined constants;
means for calculating $SC2_{Ei} = \text{MAX}$ (cte,$p(SC2_{pi})$) $\epsilon ]SC2_{Ri}$, $SC2_{Ai}[$, $SC2_{Ri} = \text{MIN}$ (cte,$q(SC2_{pi})$)$\epsilon[8\%, SC2_{Ei}[$, and $SC2_{Ai} = \text{MIN}$ (cte,$r(SC2_{pi})$) $\epsilon ]SC2_{Ei}$, 100%], where $p(SC2_{pi})$, $q(SC2_{pi})$ and $r(SC2_{pi})$ are linear functions of the type $y = a \cdot SC2_{pi} + b$, where $SC2_{pi}$ is the personalized threshold value "i" which is respectively $SP2_1$ or $SP2_2$, a, b and cte being predetermined constants; and
means for calculating $SC3_E = \text{MIN}$ (cte,$p(SC3_p)$) $\epsilon ]SC3_A$, $SC3_R[$, $SC3_R = \text{MAX}$ (cte,$q(SC3_p)$) $\epsilon ]SC3_E, \infty]$, and $SC3_A = \text{MAX}$ (cte,$r(SC3_p)$) $\epsilon[0, SC3_E[$, where $p(SC3_p)$, $q(SC3_p)$ and $r(SC3_p)$ are linear functions of the type $y = a \cdot SC3p + b$, where $SC3_p$ is the personalized threshold value SP3, a, b and cte being predetermined constants.

12. Apparatus according to claim 1, comprising means for rejecting said test signature when said first evaluating function C1 equals zero and said second evaluating function C2 equals 1.

13. Apparatus according to claim 4, comprising means for rejecting said test signature when said first evaluating function C1 equals zero and said third evaluating function C3 equals zero.

14. Method for comparing a test handwritten signature with a reference signature where each of said test and reference signatures have been acquired by:

generating three electrical digital position signals characterizing a trajectory of a handwritten signature by means of a pencil provided with a point and an analog-to-digital tablet, said three signals being $D_x(t)$, $D_y(t)$ and $D_z(t)$ where $D_x(t)$ and $D_y(t)$ are respectively position signals according to X and Y axes of a cartesian reference with respect to time, and $D_z(t)$ is a discrete signal indicating whether or not said point is contacting said table;

low-pass filtering said $D_x(t)$ and $D_y(t)$ electrical signals;

taking the derivative of said $D_x(t)$ and $D_y(t)$ electrical signals for generating $V_x$ and $V_y$ electrical components which represent respectively speeds of said point according to X and Y axes of a cartesian reference;

calculating $V_\sigma$ and $V_\theta$ values from $V_x$ and $V_y$ components where:

$$V_\sigma = \sqrt{\|V_x\|^2 + \|V_y\|^2}, \text{ and}$$

$$V_\theta = \pm \cos^{-1}\left[\frac{V_x \cdot V_y}{\|V_x\| \cdot \|V_y\|}\right],$$

where $V_\theta$ has a sign determined by:

$$\text{sign} = \left[\sin^{-1}\left[\frac{V_x \times V_y}{\|V_x\| \cdot \|V_y\|}\right]\right]; \text{ and}$$

calculating handwritten components and handwritten strings, where each of said handwritten components is delimited by two successive liftings of said point along said trajectory, and each of said handwritten strings is delimited by two successive portions of said trajectory where said $V_\theta$ value is higher than a predetermined angular speed value and where said $V_\sigma$ value is lower than a predetermined curvilinear speed value, said handwritten strings and components having beginnings and ends defining temporal marks along said trajectory by which duration of said handwriting signature is determined;

calculating simple dynamic parameters characterizing said test and reference signatures;

applying respectively a first predetermined rotating operator and a second predetermined rotating operator to said $D_x(t)$ and $D_y(t)$ signals for correcting inclination of said trajectory and aligning a base line of said trajectory with a horizontal base line; and scaling said $D_x(t)$ signal according to said X cartesian axis, and scaling said $D_y(t)$ signal according to said Y cartesian axis, said apparatus comprises steps of:

calculating variations of said simple dynamic parameters of said test signature with respect to said simple dynamic parameters of said reference signature, by calculating a first evaluating function C1 where:

$$C1 = \sum_{i=1}^{4} p_i FC1_i (RC1_i) \in [0,1]$$

$FC1_i(RC1_i)$ is a function representative of the variations of a particular dynamic parameter where i indicates the parameter in question, and $p_i$ is a weight given to a particular parameter of said simple dynamic parameters;

comparing C1 with a first threshold value, and rejecting said test signature if C1 passes said first threshold value;

calculating a classifying function $C_a$ where:

$$C_a = a1 \cdot C1$$

where a1 is a weight given to said first evaluating function C1;

comparing said classifying function $C_a$ with a second threshold value, and rejecting said test signature if $C_a$ passes said second threshold value;

comparing durations of said test and reference signatures, and effectuating temporal expansion of the temporal marks of the signature having the shortest duration so that its duration matches the duration of the other signature;

comparing sequences of said temporal marks of said test and reference signatures and coupling temporal marks of said test and reference signatures if and only if two corresponding temporal marks have between them a minimal temporal distance which is reciprocally the shortest between the sequences in question, and said minimal distance is shorter than a predetermined distance so that coupled temporal marks form a pair of characteristic segments of said test and reference signatures;

processing in an iterative manner remaining temporal marks, that have not been coupled, of said test and reference signatures for forming additional pairs of characteristic segments by repeating said steps of comparing durations and comparing until not characteristic segment is coupled;

calculating local intrinsic correlations of said $V_\sigma$ and $V_\theta$ values of said test and reference signatures for each of said pairs of characteristic segments, by calculating a second evaluating function C2 where:

$$C2 = \sum_{i=1}^{2} p_i FC2_i (RC2_i), \in [-1,1]$$

where $FC2_i(RC2_i)$ is a function representative of the local intrinsic correlation of either said $V_\sigma$ or $V_\theta$ values for said pairs of characteristic segments where i indicates the component in question, and $p_i$ is a weight given to the particular component in question;

comparing C2 with a third threshold value, and rejecting said test signature if C2 passes said third threshold value;

calculating a classifying function $C_b$ where:

$$C_b = a_1 C1 + a_2 C2$$

where $a_2$ is a weight given to said second evaluating function C2; and comparing said classifying function $C_b$ with a fourth threshold value, and rejecting said test signature if $C_b$ passes said fourth threshold value.

15. Method according to claim 14, wherein said simple dynamic parameters consist of:

a first simple dynamic parameter $P_1$ consisting of a period of time of said trajectory during which said point of said pencil is contacting said tablet;

a second simple dynamic parameter $P_2$ consisting of a percentage representative of a period of time of said trajectory during which said point is lifted;

a third simple dynamic parameter $P_3$ consisting of a percentage representative of a period of time of said trajectory during which said point is stopped; and a fourth simple dynamic parameter $P_4$ consisting of a percentage representative of a period of time of said trajectory during which said $V_\theta$ *l value is positive*;

16. Method according to claim 15, comprising steps of comparing said simple dynamic parameters of said test signature with the corresponding simple dynamic parameters of the reference signature, and rejecting said test signature if said simple dynamic parameters are the same.

17. Method according to claim 14, further comprising steps of:

calculating variations of $D_x$ and $D_y$ components of said test and reference signatures for each of said pairs of characteristic segment, by calculating a third evaluating function C3 where:

$$C3 = FC3(RC3), \epsilon [-1,1]$$

where FC3(RC3) is a function representative of variations of $D_x$ and $D_y$ components for said pairs of characteristic segments;

comparing C3 with a fifth threshold value, and rejecting said test signature if C3 passes said fifth threshold value;

calculating a classifying function $C_c$ where:

$$C_c = a_1C_1 + a_2C_2 + a_3C_3$$

where $a_3$ is a weight given to said third evaluating function C3; and comparing said classifying function $C_c$ with a sixth threshold value REJ, and either rejecting said test signature if $C_c$ is higher than said sixth threshold value REJ, or emitting a signal indicating that no conclusive result has been achieved if $C_c$ is within a range of values limited by REJ and a threshold value UNC, or accepting said test signature if $C_c$ is lower than UNC.

18. Method according to claim 17, comprising a step of calculating $RC1_1$, $RC1_2$, $RC1_3$ and $RC1_4$ where:

$RC1_1 = (P_1$ of said test signature $- P_1$ of said reference signature$)/P_1$ of said reference signature;

$RC1_2 = P_2$ of said test signature $- P_2$ of said reference signature;

$RC1_3 = P_3$ of said test signature $- P_3$ of said reference signature; and $RC1_4 = P_4$ of said test signature $- P_4$ of said reference signature.

19. Method according to claim 18, comprising steps of: calculating $FC1_i(RC1_i)$ for each of said four dynamic parameters where $RC1_i$ is the variation of a particular dynamic parameter, where:

$FC1_i(RC1_i) = 0$ if $RC1_i < SC1_{Ei}$ where $SC1_{Ei}$ is a seventh predetermined threshold value for a particular dynamic parameter, $$FC1_i(RC1_i) = ((e^{h(RC1_i)} - 1)/(e - 1))^{Ni}$$

if $SC1_{Ei} < RC1_i < SC1_{Ri}$ where $SC1_{Ri}$ is an eighth predetermined threshold value for a particular dynamic paramater, or $FC1_i(RC1_i) = 1$ if $SC1_{Ri} \leq RC1_i$, where $h(RC1_i) = (RC1_i - SC1_{Ei})/(SC1_{Ri} - SC1_{Ei})$, and where Ni is a growth factor for a particular dynamic parameter; and means for generating a signal indicative of a rejection of said test signature if $FC1_i(RC1_i) = 1$.

20. Method according to claim 19, comprising a step of calculating $RC2_1$ and $RC2_2$ where:

$$RC2_1 = \frac{1}{l_r} \cdot \sum_{j=1}^{N} CV_{\sigma j} \cdot l_j, \epsilon [-1, 1]$$

$$RC2_2 = \frac{1}{l_r} \cdot \sum_{j=1}^{N} CV_{\theta j} \cdot l_j, \epsilon [-1, 1]$$

where N is the number of pairs of characteristic segments, $l_r$ is the number of samples used for acquiring said reference signature, j identifies a particular pair of said pairs of characteristic segments, $l_j$ is the number of samples used for acquiring a particular segment of said reference signature, $CV_{\sigma j}$ is a partial intrinsic local correlation of said $V_\sigma$ component for a particular pair of said pairs of characteristic segments, and $CV_\theta$ j is a partial intrinsic local correlation of said $V_\theta$ value for a particular pair of said pairs of characteristic segments.

21. Apparatus according to claim 20, comprising steps of:

calculating $FC2_i(RC2i)$ for each of said $V_\sigma$ and $V_\theta$ values of said pairs of characteristic segments where RC2i is an intrinsic local correlation of either said $V_\sigma$ or $V_\theta$ value for said pairs of characteristic segments, where:

$FC2_i(RC2i) = 1$ if $RC2_i < SC2_{Ri}$ where $SC2_{Ri}$ is a ninth predetermined threshold value, $$FC2_i(RC2_i) = ((e^{h1(RC2_i)} - 1)/(e - 1))^{N1i}$$

if $SC2_{Ri} < RC2_i < SC2_{Ei}$ where $SC2_{Ei}$ is a tenth predetermined threshold value, $$FC2_i(RC2_i) = (((e^{h2(RC2_i)} - 1)/(e - 1))^{N2i} - 1)$$

if $SC2_{Ei} \leq RC2_i$, or $FC2i(RC2i) = 0$ if $SC2_{Ai} RC2_i$ where $SC2_{Ai}$ is an eleventh threshold value; where $h1(RC2_i) = (SC2_{Ei} - RC2_i)/(SC2_{Ei} - SC2_{Ri})$, $h2(RC2_i) = (SC2_{Ai} - RC2_i)/(SC2_{Ai} - SC2_{Ei})$, and N1i and N2i are predetermined growth factors;

generating a signal indicative of a rejection of said test signature if $FC2_i(RC2_i) = 1$; and generating a signal indicative of an acceptation of said test signature if $FC2_i(RC2_i) = 0$.

22. Apparatus according to claim 21, comprising means for calculating RC3 where:

where $RC3_{ii}$ is a minimal residual distance of said $D_x$ and $D_y$ components between the characteristic segments of a particular pair of said pairs of characteristic segments where:

$$RC3_{ii} = \text{MIN} \begin{bmatrix} q(i,j-1) & + & d(i,j) \\ q(i-1,j-1) & + & d(i,j) \\ q(i-1,j) & + & d(i,j) \end{bmatrix}$$

where $$d(i,j) = \sqrt{(\Delta D_{xT} - \Delta D_{xR})^2 + (\Delta D_{yT} - \Delta D_{yR})^2} \; ;$$

$q(1,1) = d(1,1)$;

$D_{xT}$ and $D_{xR}$ are respectively said $D_x$ component of said test and reference signatures of a particular pair of characteristic segments;

$D_{yT}$ and $D_{yR}$ are respectively said Dy components of said test and reference signatures of a particular pair of characteristic segments; and $\Delta$ is a linear operator of difference.

23. Apparatus according to claim 22, comprising: means for calculating FC3(RC3) for each of said $D_x$ and $D_y$ components of said pairs of characteristic segments where RC3 is representative of a minimal residual distance of said $D_x$ and $D_y$ components between said characteristic segments of each of said pairs of characteristic segments, where:

FC3(RC3) = 1 if RC3 > SC3R where SC3R is a twelfth threshold value, $$FC3(RC3) = ((e^{h1(RC3)} - 1)/(e-1))^{N1}$$

if $SC3_E < RC3 < SC3_R$ where $SC3_E$ is a thirteenth threshold value, $$FC3(RC3) = (((e^{h2(RC3)} - 1)/(e-1))^{N2} - 1)$$

if $SC3_A < RC3 < SC3_E$ where $SC3_A$ is a fourteenth threshold value, or

FC3(RC3) = 0 if RC3 < $SC3_A$; where
h1(RC3) = (RC3 − $SC3_E$)/($SC3_R$ − $SC3_E$),
h2(RC3) = ($SC3_A$ − RC3)/($SC3_A$ − $SC3_E$), and N1 and N2 are predetermined growth factors;

generating a signal indicative of a rejection of said test signature if FC3(RC3) = 1; and means for generating a signal indicative of an acceptation of said test signature if FC3(RC3) = 0.

24. Apparatus according to claim 23, wherein more than one reference signatures are acquired, and compared among themselves, taken two by two, to obtain several groups of $RC1_1$, $RC1_2$, $RC1_3$, $RC1_4$, $RC2_1$, $RC2_2$ and RC3 values, said apparatus further comprising:

comparing each of said $RC1_1$, $RC1_2$, $RC1_3$, $RC1_4$ and RC3 values with other corresponding values of its own group, and determining maximum values of each group which constitutes respectively personalized threshold values $SP1_1$, $SP1_2$, $SP1_3$, $SP1_4$ and SP3; and comparing each of said $RC2_1$ and $RC2_2$ values with other corresponding values of its own group, and determining minimum values of each group which constitutes respectively personalized threshold values $SP2_1$ and $SP2_2$;

calculating $SC1_{Ei} = \text{MAX} (\text{cte}, p(SC1_{pi})) \epsilon [0\%, SC1_{Ri}[$, and $SC1_{Ri} = \text{MAX} (\text{cte}, q(SC1_{pi})) \epsilon ]SC1_{Ei}, \infty ]$, where $p(SC1_{pi})$ and $q(SC1_{pi})$ are linear functions of the type $y = a \cdot SC1_{pi} + b$, where $SC1_{pi}$ is the personalized threshold value "i" which is respectively $SP1_1$, $SP1_2$, $SP1_3$ or $SP1_4$, a, b and cte being predetermined constants;

calculating $SC2_{Ei} = \text{MAX} (\text{cte}, p(SC2_{pi})) \epsilon ]SC2_{Ri}, SC2_{Ai}[$, $SC2_{Ri} = \text{MIN} (\text{cte}, q(SC2_{pi})) \epsilon [8\%, SC2_{Ei}[$, and $SC2_{Ai} = \text{MIN} (\text{cte}, r(SC2_{pi})) \epsilon ]SC2_{Ei}, 100\%]$, where $p(SC2_{pi})$, $q(SC2_{pi})$ and $r(SC2_{pi})$ are linear functions of the type $y = a \cdot SC2_{pi} + b$, where $SC2_{pi}$ is the personalized threshold value "i" which is respectively $SP2_1$ or $SP2_2$, a, b and cte being predetermined constants; and means for calculating $SC3_E = \text{MIN} (\text{cte}, p(SC3_p)) \epsilon ]SC3_A, SC3_R[$, $SC3_R = \text{MAX} (\text{cte}, q(SC3_p)) \epsilon ]SC3_E, \infty]$, and $SC3_A = \text{MAX} (\text{cte}, r(SC3_p)) \epsilon [0, SC3_E[$, where $p(SC3_p)$, $q(SC3_p)$ and $r(SC3_p)$ are linear functions of the type $y = a \cdot SC3p + b$, where $SC3_p$ is the personalized threshold value SP3, a, b and cte being predetermined constants.

25. Method according to claim 17, comprising a step of rejecting said test signature when said first evaluating function C1 equals zero and said third evaluating function C3 equals zero.

26. Method according to claim 14, comprising a step of rejecting said test signature when said first evaluating function C1 equals zero and said second evaluating function C2 equals 1.

* * * * *